US010296330B2

United States Patent
Bucuvalas et al.

(10) Patent No.: US 10,296,330 B2
(45) Date of Patent: May 21, 2019

(54) MACHINE-BASED INSTRUCTION EDITING

(71) Applicant: PHASE CHANGE SOFTWARE LLC, Golden, CO (US)

(72) Inventors: Steven Bucuvalas, Golden, CO (US); Kevin Selker, Boulder, CO (US)

(73) Assignee: PHASE CHANGE SOFTWARE LLC, Golden, CO (US)

( * ) Notice: Subject to any disclaimer, the term of this patent is extended or adjusted under 35 U.S.C. 154(b) by 0 days.

(21) Appl. No.: 15/544,377

(22) PCT Filed: Feb. 9, 2016

(86) PCT No.: PCT/US2016/017160
§ 371 (c)(1),
(2) Date: Jul. 18, 2017

(87) PCT Pub. No.: WO2016/130551
PCT Pub. Date: Aug. 18, 2016

(65) Prior Publication Data
US 2018/0011706 A1   Jan. 11, 2018

Related U.S. Application Data

(60) Provisional application No. 62/113,623, filed on Feb. 9, 2015, provisional application No. 62/113,627, filed
(Continued)

(51) Int. Cl.
G06F 9/44 (2018.01)
G06F 8/72 (2018.01)
(Continued)

(52) U.S. Cl.
CPC ............. G06F 8/72 (2013.01); G06F 8/36 (2013.01); G06F 8/40 (2013.01); G06F 8/41 (2013.01); G06F 8/443 (2013.01)

(58) Field of Classification Search
CPC ... G06F 8/36; G06F 8/72; G06F 8/443; G06F 8/41; G06F 8/40
See application file for complete search history.

(56) References Cited

U.S. PATENT DOCUMENTS 9,836,283 B2 * 12/2017 Pudiyapura ............... G06F 8/33
2011/0138362 A1   6/2011 Keidar-Barner et al.
(Continued)

FOREIGN PATENT DOCUMENTS

WO   WO 2016/130542   8/2016

OTHER PUBLICATIONS

Daniel Brobe et al., Simulation-based Equivalence Checking between SystemC Models at Different Levels of Abstraction, ACM, 2011, retrieved online on Mar. 12, 2019, pp. 223-228. Retrieved from the Internet: <URL: http://delivery.acm.org/10.1145/1980000/1973054/p223-grosse.pdf?>. (Year: 2011).*
(Continued)

Primary Examiner — Hanh Thi-Minh Bui
(74) Attorney, Agent, or Firm — Jason H. Vick; Sheridan Ross, PC

(57) ABSTRACT

Computer software development has produced many advances within computer science and in most aspects of modern society. Even with modern quality control, bug finding, and other code checking applications, computer software is often less than ideal. A developer may write code that is functionally accurate but lacks security, documentation, speed, storage, reusability, or other element that may make a segment of software code less than ideal. Identifying equivalent code and, when found, replacing it with a vetted equivalent promotes the deployment of software that is more robust, secure, usable and reusable, and/or satisfies performance or other objectives.

28 Claims, 87 Drawing Sheets

Related U.S. Application Data on Feb. 9, 2015, provisional application No. 62/277,769, filed on Jan. 12, 2016, provisional application No. 62/280,965, filed on Jan. 20, 2016.

(51) Int. Cl.
*G06F 8/36* (2018.01)
*G06F 8/41* (2018.01)
*G06F 8/40* (2018.01)

(56) References Cited

U.S. PATENT DOCUMENTS

2011/0225572 A1    9/2011   Stoicescu et al.
2013/0232468 A1*   9/2013   Betouin ............... G06F 8/423
                                                        717/110

OTHER PUBLICATIONS

Berners-Lee, Tim "Weaving the Web: The Original Design and Ultimate Destiny of the World Wide Web by its Inventor" Harper Collins, 1999, 231 pages.
Bradley, Aaron et al. "The Calculus of Computation" ACM Computing Classification; 1198; 377 pages.
Brooks, Jr., Frederick P. The Mythical Man-Month: Essays on Software Engineering (20th Anniversary Edition), 1995, Addison-Wesley, pp. 1-322.
Kroening, Daniel et al. "Decision Procedures, an Algorithmic Point of View" Second Edition; Springer; 2008.
Manna, Zohar "Mathematical Theory of Computation" McGraw-Hill, New York, 1974; 453 pages.
Sipser, Michael "Introduction to the Theory of Computation" PWS Publishing Company; 1997; 3985 pages.
International Search Report for International Application No. PCT/US2016/017160, dated Jun. 3, 2016.
Written Opinion for International Application No. PCT/US2016/017160, dated Jun. 3, 2016.
Collard, Jean-Francois "Reasoning About Program Transformations: Imperative Programming and Flow of Data" Springer-Verlag; 2010; 258 pages.
International Preliminary Report on Patentability for International Application No. PCT/US2016/017160, dated Aug. 24, 2017.
Office Action for European Patent Application No. 16709845.8, dated Sep. 22, 2017.
Office Action for European Patent Application No. 16709845.8, dated Feb. 7, 2018.
Summons to Attend Oral Proceedings for European Patent Application No. 16709845.8, dated Oct. 19, 2018.
International Search Report for International Application No. PCT/US2017/064710, dated Aug. 9, 2018.
Written Opinion for International Application No. PCT/US2017/064710, dated Aug. 9, 2018.

* cited by examiner

Practical and Ugly Problems

CEO's Acquisition Problem:
I want to buy companies to absorb market share and reduce costs with increased operational efficiency Ugly Truths:
Comparing large applications and doing a functional analysis of best processing is never done
Integrating existing capabilities is never done
The "operational" efficiencies are almost never achieved Example: Bank of America and Mortgage In the new *PHASE*, how do you compare/merge two mortgage systems?

Normalize both systems into "databases"
Subtract one from the other
Use "queries" and "views" to zoom in and out on differences
Select best-of-breed capabilities without reading code for the new integrated capability
Do only limited testing to verify the result

*FIG. 7*

Intuition: "I don't believe it"

In the new *PHASE*, how do you compare/merge two mortgage systems?

Normalize both systems into "databases"
Subtract one from the other;
Use "queries" and "views" to zoom in and out on differences
Select best-of-breed capabilities without reading code for the new integrated capability
Do only limited testing to verify the result What seems *intuitively* wrong with this? Much.

Differing programming languages
Differing architectures
Opaque spaghetti source code
Project Cost
Quality
Project Duration
...

*FIG. 8*

Phase and Essence Goals

| | OLD PHASE | NEW PHASE |
|---|---|---|
| Professional Labor | Labor Intensive<br>Slow | Automation Leverages<br>100X Multiplier |
| Quality | Labor Intensive<br>Haphazard<br>Slow | Automatically Verified<br>Often Unnecessary<br>100x Faster |
| Programming Specification | Chaotically Idiosyncratic | Normalized to Coherent |
| Programming Media | Programming Language<br>Important | Programming Languages<br>Peripheral |
| Comprehending System "Knowledge" | Opaque<br>Painful Learning Curve | Transparent<br>Easy Learning Curve |
| Application Architecture | Chaotically Idiosyncratic | Normalized to Coherent |
| Leveraging Application "knowledge" for Productivity | Human Engineers<br>Experience | Application System<br>becomes Active Agent |

*FIG. 9*

AI and the Symbolic Species

- Understanding, either in human or AI starts with an elemental unit, a symbol

- In AI, this extends to the "Physical Symbol Hypothesis," adoption of which is controversial

- It is the first of the fundamental "gates" one must go through to be successful

*the*
SYMBOLIC
SPECIES

Terrence W. Deacon

*FIG. 11*

Formally: What's the Symbol Mean?

Although this sounds like a dinnertime conversation among philosophy majors,
it is the starting point

- A symbol corresponds to a function and its meaning is the function's definition, ultimately expressed in a programming language.

- A specific function corresponds to a specific number (e.g., "1") and the meaning of both is defined in set theory

- This will become clearer and deeper as we proceed

*FIG. 12*

Functional Equivalence (Gate)

- The journey starts with equality

- The core problem is variability in specification:
  - Programming language
  - Many specifications to one behavioral definition

- This variability is a huge source of chaos

1304
```
int function1 (w,x,y,z)
{
  int result = 0;
  function11 (function28b(w,x),
                        multiply(y,z));
  return(result);
}
```

1306
```
int function11a(int x, int y)
{
  int result=0;
  int fifteen=15;
  int l1bound =0;
  int l2bound=0;
  int Inc2=+x+x+x+x+x+x+x+x
          +x+x+x+x+x+x+x+x;

l1bound = y&fifteen;

for (i=0, i<li1bound, i++)
      result=result+x;

l2bound = y>>4;
  for (i=0, i<li2bound, i++)
      result=result+inc2;

return(result);
}
```

1308
```
int function28b(int x, int y)
{
  int result = 0;
  while (y>0)
  {
    result = result + x;
    y--;
  }
  return(result);
}
```

1310
```
int multiply(int x, int y)
{
  if(y == 0)
    return(0);
  else
    return(x+multiply(x, y-1));
}
```

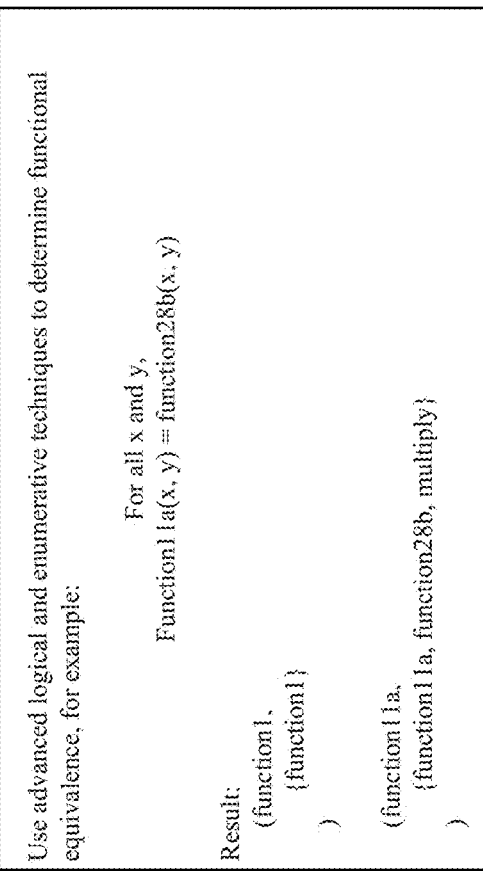
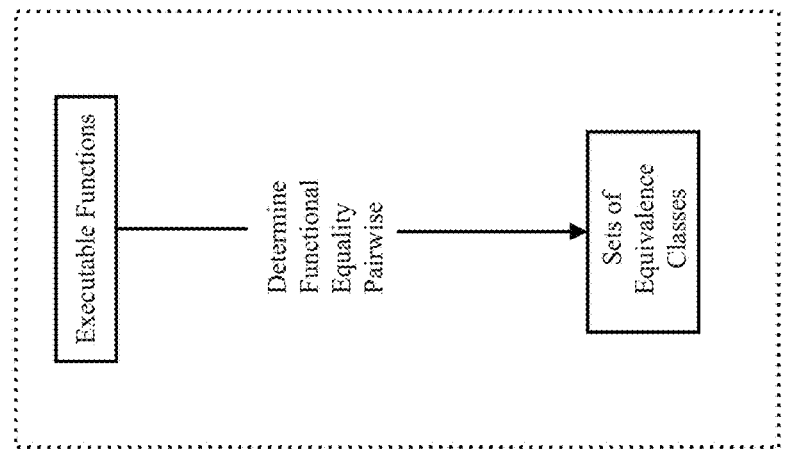
FIG. 14

Consolidate and Update Source

The function is represented as a symbol;
It means the behavior of each source specification in the equivalence class

Implications

- Problem class: Simplification
  - Code cloning, legacy bloat, "subroutine" creation
- Productivity
  - No human needs to read source code; this is a machine algorithm on functions.
  - Human reading vs. invoking algorithm classes: >>100x
- Quality
  - This is a perfect process, no errors. In math-speak: complete and correct (though potentially intractable*)

*FIG. 18*

Productivity Gain*

Any task involving Reading, Comprehension, Solving

|  | Labor Leverage |
|---|---|
| Mortgage Underwriting | 300x (30,000%) |
| Functional Equivalence | 600x (60,000%) |

*Experiments

Phase, Essence, Intuition

- Only Humans can interpret code, but here no reading required
- Programmer and multiple "specifications" are collapsed to the best specification
- In many cases, testing and verification is not necessary even when doing major changes

*FIG. 20*

Phase and Essence Goals

| | OLD PHASE | NEW PHASE |
|---|---|---|
| Professional Labor | Labor Intensive<br>Slow | Automation Leverages<br>100X Multiplier |
| Quality | Labor Intensive<br>Haphazard<br>Slow | Automatically Verified<br>Often Unnecessary<br>100x Faster |
| Programming Specification | Chaotically Idiosyncratic | Normalized to Coherent |
| Programming Media | Programming Language<br>Important | Programming Languages<br>Peripheral |
| Comprehending System<br>"Knowledge" | Opaque<br>Painful Learning Curve | Transparent<br>Easy Learning Curve |
| Application Architecture | Chaotically Idiosyncratic | Normalized to Coherent |
| Leveraging Application<br>"Knowledge" for Productivity | Human Engineers<br>Experience | Application System<br>becomes Active Agent |

*FIG. 21*

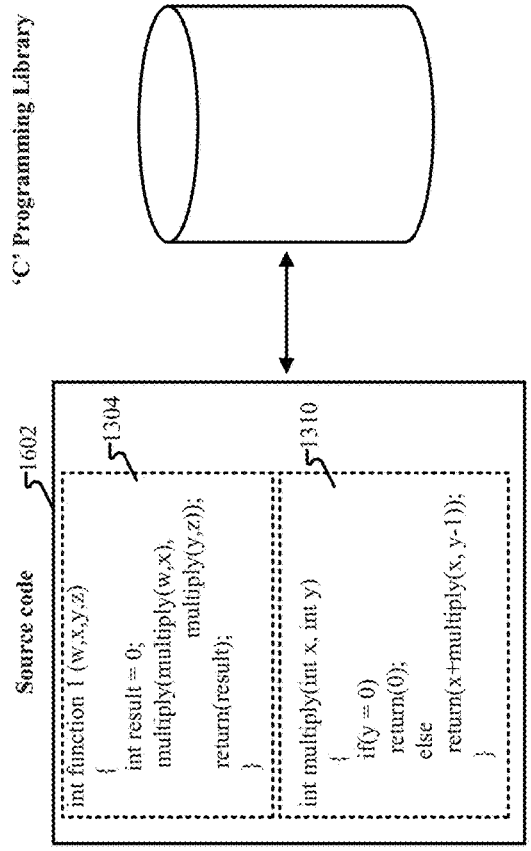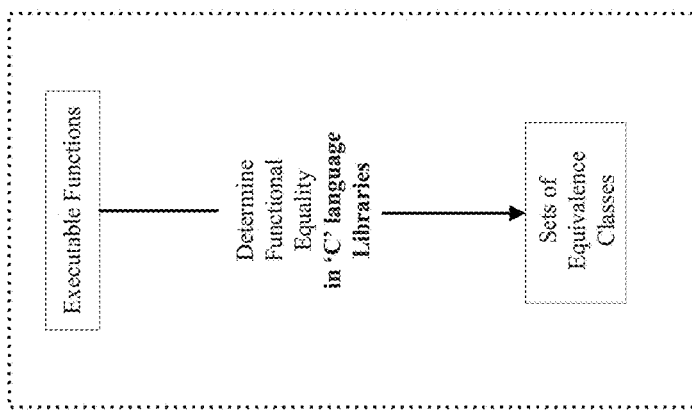
FIG. 24

Implications

- Problem Class: Reuse
  - Component assembly, application libraries, etc.
  - Envision programmer "spell checker" for reuse built into IDE

- Productivity:
  - Same as functional equivalence, >>100x

- Quality
  - Complete and correct

- Implications continue ...
  - Example: the Kernel of Social Computing: using each other's code without talking, meeting, or written documentation

*FIG. 26*

Really a "Phase Change?"

stackoverflow     July 2015

Is finding the equivalence of two functions undecidable?
Is it impossible to know if two functions are equivalent? For example, a compiler writer wants to determine if two functions that the developer has written perform the same operation, what methods can he use to figure that one out? Or what can we do to find out that two TMs are identical? Is there a way to normalize the machines?

Given an arbitrary function, $f$, we define a function $f^{-1}$ which returns $l$ on input $n$ if $f$ halts on input $n$. Now, for some number $x$ we define a function $g$ which, on input $n$, returns $l$ if $n = x$, and otherwise calls $f^{-1}(n)$.

If functional equivalence were decidable, then deciding whether $g$ is identical to $f^{-1}$ decides whether $f$ halts on input $x$. That would solve the Halting problem. Related to this discussion is Rice's theorem.

Conclusion: <u>functional equivalence is decidable.</u>

Paraphrase: we can't do reuse
because functional equivalence is undecidable

This is an Applied vs. Pure category mistake

- Aren't people already doing this?
  No.
  - Social media proof from the compiler community
  - 1000's of vicious participants
- These folks are practical; they know the math; they have enormous economic incentive to innovate ... and yet they don't see it

*FIG. 27*

Functions and Definitions

- There are multiple senses of the word function in computer science
  - The historically mathematical sense of a function
  - The programming language sense, as in a functional language
  - The pragmatic sense, as in: what is the *function* of that tool?

We define *functions* in terms of the historical mathematical sense, as developed in early $20^{th}$ century computation theory This definition gives us language independence

*FIG. 28*

Math Functions, Not Programming Languages (Gate)

- A programming language function, as in 'C' examples, is syntactic structure

- Using compiler and program analysis techniques, we extract the mathematical functions implicit in the source code

- This makes the "functional symbols" language independent

```
struct Act {
    int Act;
    int cBl;
};

struct Log {
    int fAct;
    char tranId;
    int tranAmt;
    time_t stamp;
};

void
wTran(pw,acct,amt)
    {
    bool scTk;
    int fRate=0.10;
    char withId='w';
    int fee=10;
    time_t timeStamp;
    Log logRec;
    Act acctRec;

scTk= secChk(pw,acct);
    timeStamp=time(NULL);

actHnd=getHandl("chkAcct");
    lgHnd=getHandl("chkLog");

readDirect(actHnd,acctRec);
    acctRec.cBl=acctRec.cBi-amt;
    logRec.fAct=acct;
    logRec.tranId=withId;
    logRec.tranAmt;
    memcpy (logRec, timeStamp, sizeof (time_t));

if(secTk)
        {
        writeSeq(lgHnd,logRec);
        };

fee=rRate*amt
    acctRec.cBl=acctRec.cBl-fee;
    if(secTk)
        {
        writeDirect(actHnd,acctRec);
        };
    return(NULL);
    }
```

Function: Formal Dependency Analysis

```
void
wTran(pw,acct,amt)
    {
    int fRate=0.10;
    char withId='w';
    int fee=10;
    time_t timeStamp;
    Log logRec
    Act acctRec;

scTk= secChk(pw,acct);
    timeStamp=time(NULL);

actHnd=getHandl("chkAcct");
    lgHnd=getHandl("chkLog");

readDirect(actHnd,acctRec);
    acctRec.cBl=acctRec.cBi-amt;
    logRec.fAct=acct;
    logRec.tranId-withId;
    logRec.tranAmt;
    memcpy (logRec, timeStamp, sizeof (time_t));

if(secTk)
        {
        writeSeq(lgHnd,logRec);
        };

fee=rRate*amt
    acctRec.cBl=acctRec.cBl-fee;
    if(secTk)
        {
        writeDirect(actHnd,acctRec);
        };

return(NULL);
    }
```
↳3002

*FIG. 30A*

For all functions

```
void
wTran(pw,acct,amt)
    {
    int fRate=0.10;
    char withId='w';
    int fee=10;
    time_t timeStamp;
    Log logRec
    Act acctRec;

scTk= secChk(pw,acct);
    timeStamp=time(NULL);

actHnd=getHandl("chkAcct");
    lgHnd=getHandl("chkLog");

readDirect(actHnd,acctRec);
    acctRec.cBl=acctRec.cBl-amt;
    logRec.fAct=acct;
    logRec.tranId-withId;
    logRec.tranAmt;
    memcpy (logRec, timeStamp, sizeof (time_t));

if(secTk)
        {
        writeSeq(lgHnd,logRec);
        };

fee=rRate*amt
    acctRec.cBl=acctRec.cBl-fee;
    if(secTk)
        {
        writeDirect(actHnd,acctRec);
        };

return(NULL);
    }
```
⟵ 3102

*FIG. 31A*

Refactor to Function in 'C'

```c
struct Act {
    int Act;
    int cBl;
};

struct Log {
    int fAct;
    char tranId;
    int tranAmt;
    time_t stamp;
};

void
wTran(pw,acct,amt)
    {
    bool scTk;
    int fRate=0. 10;
    char withId='w';
    int fee=10;
    time_t timeStamp;
    Log logRec;
    Act acctRec;

scTk= secChk(pw,acct);
    timeStamp=time(NULL);

actHnd=getHandl("chkAcct");
    lgHnd=getHandl("chkLog");

readDirect(actHnd,acctRec);
    acctRec.cBl=acctRec.cBl-amt;
    logRec.fAct=acct;
    logRec.tranId=withId;
    logRec.tranAmt;
    memcpy (logRec, timeStamp, sizeof (time_t));

if(secTk)
        {
        writeSeq(lgHnd,logRec);
        };
    fee=rRate*amt
    acctRec.cBl=acctRec.cBl-fee;
    if(secTk)
        {
        writeDirect(actHnd,acctRec);
        };
    return(NULL);
    }
```

FIG. 32B                    Refactor to Function in 'C'
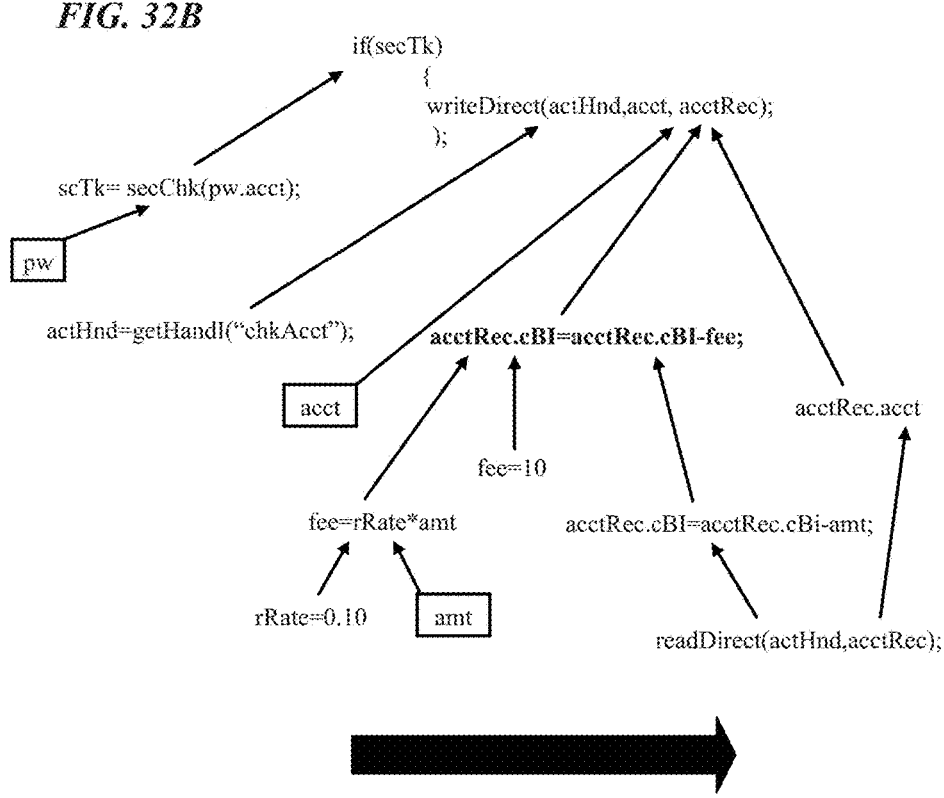
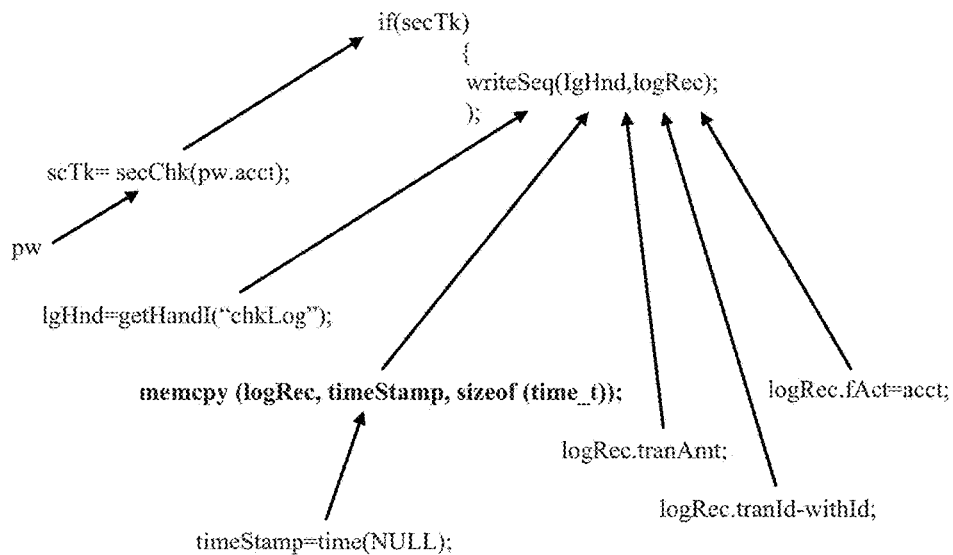

Implications

- Problem Classes: Dependency, Separation of Concerns, Comprehension, Separation of Concerns
  - Language independence!!!
  - Dependency is at the root of many engineering and evolution tasks, and they don't scale well for individual cognition, but do in the machine.
    - Logging should be a separate *concern* architecturally speaking
  - Cohesion of integral functions is easier to understand and maintain

- Productivity and Quality:
  - The same

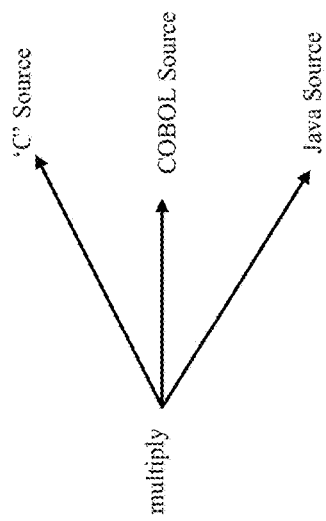

FIG. 34

Phase, Essence, Intuition

- We started with ironing out the chaos from different specification of the same solution

- Now we're saying the chaos of programming languages can be ignored and reduced to one universal representation

*FIG. 35*

Operations, Abstraction, and Source Code

- Our formal algebra, SEAL, provides a natural, intuitive, and comprehensive solution to both abstraction and operating on software without touching the programming languages

- It allows one to think of code as a symbol, and manipulate it as such, like a universal CASE tool, layered on any language

- Considering refactoring the 'C' withdrawal function

Dependency of Functions

Independence/Dependence of function is exposed by defining the elemental functions

⎡3802

```
void
logging(acct,amt,secTk)
    {
    time_t timeStamp;
    Log logRec
    timeStamp=time(NULL);

lgHnd=getHandl("chkLog");

logRec.fAct=acct;
    logRec.tranId=withId;
    logRec.tranAmt;
    memcpy (logRec, timeStamp, sizeof (time_t));

if(secTk)
        {
        writeSeq(lgHnd,logRec);
        };

return(NULL);
    }
```

⎡3202

```
void
wTran(pw,acct,amt)
    {
    bool scTk;

scTk=secChk(pw,acct);

newbie1(acct, amt, secTk);

newbie2(acct, amt, secTk);

return(NULL);
    }
```

3804⏋

```
void
withdrawal(acct, amt, secTk)
    {
    int fRate=0.10;
    char withId='w';
    int fee;
    Act acctRec;

actHnd=getHandl("chkAcct");

readDirect(actHnd,acctRec);
    acctRec.cBl=acctRec.cBl-amt;

fee=rRate*amt
    acctRec.cBl=acctRec.cBl-fee;
    if(secTk)
        {
        writeDirect(actHnd,acctRec);
        };

return(NULL);
    }
```

*FIG. 38*

Implications

- Problem Class: Software Abstraction and Manipulation
  - Replaces specialized high-level languages, design languages, etc.
  - It is both more comprehensible and operational (unlike UML, etc.) because you can change software with it
  - This the CASE di tutti CASE, the boss of all bosses
    - This provides the basis for a lingua franca of software, any programming language, any application. Enabling active communication between agents and humans.
- Productivity and Quality:
  - The same

*FIG. 43*

Phase, Essence, Intuition

- A single theoretical framework inherits hundreds of years of applicable results, e.g., solving equations for unknowns
- Reducing solving engineering problems to solving simple equations!
- Making these changes that have to be right, correct, error-free
- Universality: One abstraction for all languages, reducing the chaos of how to model to a single symbolic formulation

*FIG. 44*

Phase and Essence Goals

| | OLD PHASE | NEW PHASE |
|---|---|---|
| Professional Labor | Labor Intensive Slow | Automation Leverages 100X Multiplier |
| Quality | Labor Intensive Haphazard Slow | Automatically Verified Often Unnecessary 100x Faster |
| Programming Specification | Chaotically Idiosyncratic | Normalized to Coherent |
| Programming Media | Programming Language Important | Programming Languages Peripheral |
| Comprehending System "Knowledge" | Opaque Painful Learning Curve | Transparent Easy Learning Curve |
| Application Architecture | Chaotically Idiosyncratic | Normalized to Coherent |
| Leveraging Application "Knowledge" for Productivity | Human Engineers Experience | Application System becomes Active Agent |

*FIG. 45*

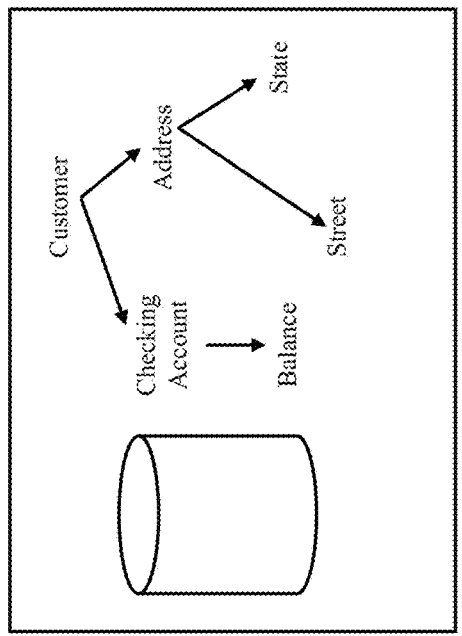
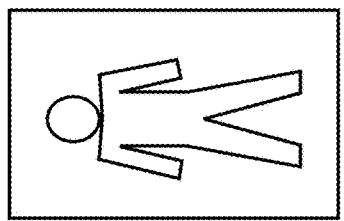
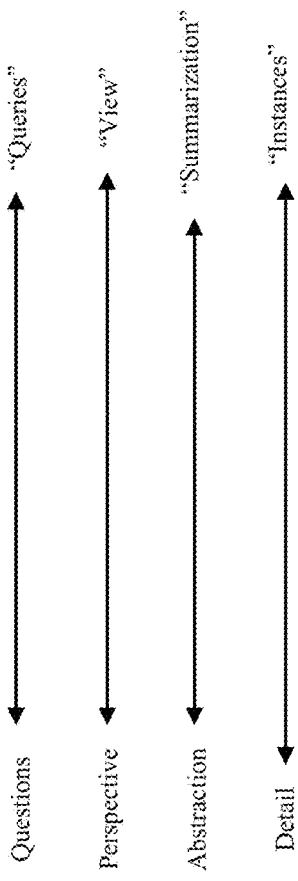
FIG. 48

Included: Simplification with Equivalence

Included: Simplification with Equivalence

Meaningful Self-Organization (Gate)

```
Act
withdrawal_calc(ACCOUNT_RECORD, BALANCE, WITHDRAWAL_AMOUNT, SECURITY)
{
int FEE_RATE=0.10;
int ATM_FEE=10;
int CHECKING_BALANCE;

FEE_AMOUNT = FEE_RATE*WITHDRAWAL_AMOUNT
AMOUNT_RECORD.BALANCE=ACCOUNT_RECORD.BALANCE
    -WITHDRAWAL_AMOUNT
    -FEE_AMOUNT;
return(ACCOUNT_RECORD);
}
```

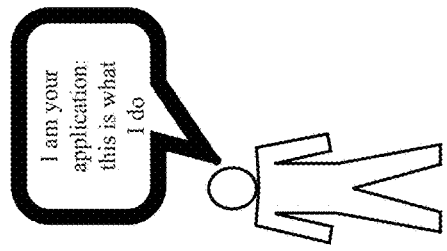

Implies self-documentation

The user creates event and the system does state transition of the model

This maps to:

<subject> <transitive-verb> <object>

*FIG. 69B*

Phase and Essence

| | OLD PHASE | NEW PHASE |
|---|---|---|
| Professional Labor | Labor Intensive<br>Slow | Automation Leverages<br>100X Multiplier |
| Quality | Labor Intensive<br>Haphazard<br>Slow | Automatically Verified<br>Often Unnecessary<br>100x Faster |
| Programming Specification | Chaotically Idiosyncratic | Normalized to Coherent |
| Programming Media | Programming Language<br>Important | Programming Languages<br>Peripheral |
| Comprehending System<br>"Knowledge" | Opaque<br>Painful Learning Curve | Transparent<br>Easy Learning Curve |
| Application Architecture | Chaotically Idiosyncratic | Normalized to Coherent |
| Leveraging Application<br>"Knowledge" for Productivity | Human Engineers<br>Experience | Application System<br>becomes Active Agent |

*FIG. 70*

Practical and Ugly Problems

CEO's Acquisition Problem:
I want to buy companies to absorb market share and increase operational efficiency Ugly Truths:
Comparing large applications and doing a functional analysis of best processing is never done
Integrating existing capabilities is never done
The "operational" efficiencies are almost never achieved Example: Bank of America and Mortgage In the new *PHASE*, how do you compare/merge two mortgage systems?
Normalize both systems into "databases"
Subtract one from the other
Use "queries" and "views" to zoom in and out on differences
Select best-of-breed capabilities without reading code for the new integrated capability
Do only limited testing to verify the result

*FIG. 71*

Phase, Essence, Intuition: Not in Kansas, Toto

We have the math and science techniques to do all this and:
- are in the process of controlling the intellectual property
- while learning/demonstrating the pragmatics of implementation

MACHINE-BASED INSTRUCTION EDITING

CROSS-REFERENCE TO RELATED APPLICATIONS

The present application is a national stage application under 35 U.S.C. 371 of PCT Application No. PCT/US2016/017160, having an international filing date of Feb. 9, 2016, which designated the United States, which PCT application claims the benefit of U.S. Provisional Patent Application No. 62/113,623, filed Feb. 9, 2015, entitled "Introduction: Jumping the Tar Pit"; U.S. Provisional Patent Application No. 62/113,627, filed Feb. 9, 2015, entitled, "Software Engineering, Software-As-Data: At Ground Zero"; U.S. Provisional Patent Application No. 62/277,769, filed Jan. 12, 2016, entitled "The Phase Change Thesis"; and U.S. Provisional Patent Application No. 62/280,965, filed Jan. 20, 2016, entitled "Software as Data, Software as Database, Software as Programming AI, Software as Modeling AI," each of which is incorporated herein by reference in their entirety.

FIELD OF THE DISCLOSURE

The present disclosure is generally directed toward machine-based pattern recognition and selective editing.

BACKGROUND

Programmable machines continue to progress as software and software writing tools advance. However, programmers may still write software that has already been written due to the time requirements associated with finding and reviewing existing software, personal preference, lack of knowledge of the presence of existing software, or other reasons. As a result, software often includes code portions that may be less than ideal, even if functionally equivalent. Previous solutions include "Software Equivalence Checking," U.S. Patent Publication 2011/0138362, incorporated herein by reference.

Compilers and interpreters convert human-readable source code into machine-readable code (e.g., object code, executable code, etc.) for execution. Compilers can negate the effects of many coding issues, but not all and not always completely. For example, a piece of software code comprising the traversal of each element of array may have different performance characteristics if the coder traverses the array by row elements and then incrementing the column, or by column elements and then incrementing the row. Object code, such as an assembler, may store values differently and require more processing steps using one technique versus another, even though the end result is the same. Similarly, the choice of a particular sorting methodology may have a significant impact on performance based on the data being sorted. For example, a bubble sort is efficient when sorting a relatively small number of elements or a large number of elements that have only a few elements that are not in sort-order. However, bubble sort is likely to be a poor choice for most other applications.

Even if two sets of software each produce the same result, not all software has the same effect, such as within an application or within a software management system. Software may have inefficiencies or other undesirable issues. As a result, computers or other machines executing software may operate in a less than ideal capacity.

SUMMARY

Certain embodiments disclosed may utilize SMT solvers and may be more readily understood with the benefit of "Decision Procedures, An Algorithmic Point of View," Kroening and Strichman, 2008, ISBN: 978-3-540-74104-6, which is incorporated herein by reference in its entirety and for all that it teaches.

Software or "code" refers to instructions written by a human for use by a machine, such as a microprocessor (or, more commonly, "processor"), once the code is put into a machine-readable form. Software has many attributes beyond the functionality for which it was written or the result it produces. For example, software requires space, requires machine cycles, is read by humans who may or may not have written the software, may have security vulnerabilities, may require updating, may require porting to a different platform, and/or other aspects. Often an ideal or preferred function, which has previously been reviewed, vetted, and identified as preferred, is available. As a general introduction and in one embodiment, a machine-based instruction is provided to automatically identify a candidate function source code, determine whether the candidate function is functionally equivalent (e.g., produces the same result) to a preferred function source code that was previously vetted and identified as an authorized source code and, if equivalent, transform the candidate source code into a preferred source code by substituting the preferred function for the candidate function and saving or otherwise making the transformed source code available for future access and/or processing.

A "function" as used herein, includes software functions, subroutines, procedures, (machine executable) methods, predicate, sequences of instructions or rules within a larger computer program, a relation that associates an input to a single output according to a rule. The single output may comprise a primitive data type or a more complex data type such as a composite or abstract data type.

In one embodiment, two portions of source code are considered: a candidate function and a preferred function. As will be discussed in more detail herein, the determination is made that the candidate function and the preferred function produce identical results. For example, over all inputs provided, the output from the candidate function and the preferred function is equivalent. In another embodiment, a logic equation is determined for the candidate function and the preferred function and then provided to an automated theorem prover, such as a Satisfiability Modulo Theories ("SMT") solver, operable to determine equivalence of the functions over a finite set of inputs. However, differences may still exist. The candidate function may have been vetted for one or more factors, such as storage efficiency, execution performance, readability, maintainability, security, and/or other functionally agnostic differences. In one embodiment, the difference comprises the programming language. In another embodiment, the difference comprises compactness of code. For example, "C=2A+2B" may be preferred over "C=A+A+B+B" and C=2*(A+B) may be preferred over "C=2A+2B." In another embodiment, the difference comprises readability. For example, "RectanglePerimeter=2(sideA+sideB)" may be preferred over "X=2A+2B." In another embodiment, the difference may comprise resource efficiency. For example, it may be more efficient to access the entirety of a record from a remote database and hold the record in memory, even if not all fields within the record will be needed, versus accessing the remote database repeatedly to retrieve only the needed fields. The foregoing provides an introduction to functionally agnostic differences that may exist between a candidate function and a preferred function and is not meant to be an exhaustive list.

In another embodiment, the candidate function is different from the preferred function; however, the difference is confined to members (e.g., inputs and/or outputs) within the same equivalence class. For example, one equivalence class may be the binary value pairs (e.g., {(1,0), (TRUE, FALSE), (ON, OFF)}) or numeric equivalents (e.g., {"0.1", "0.1", "0.1000"}).

If the candidate function and the preferred function, given the same input(s), produce different outputs, but the different outputs are each within the same equivalence class, then the preferred function and the candidate function may be determined to be functionally equivalent. For example, if the same inputs are provided to the preferred and candidate functions and the preferred function outputs "TRUE" and the candidate function produces "1" (of a binary data type) then functional equivalence may be provided, even with non-identical outputs. Alternatively, if given the same input, the preferred function produces "ON" and the candidate function produces "0," then equivalence has been disproven.

With respect to certain embodiments disclosed herein, the problems created by prior art computer systems and software development may be mitigated. Computer programming industry has been able to ignore many issues related to finite processing, bandwidth, and storage capabilities. Hardware has become ever cheaper and smaller. The investment required to make adequate software code, code that performs the function for which it was developed, into efficient code is often solved with hardware. Improving the software, beyond its functionality, has been largely abandoned in favor of developing adequate functionality and, once done, moving on to other tasks—a tradeoff readily accepted by prior art development practices.

In the early days of programming, succinct programming was an artifact of the language. Languages like Assembly left little opportunity to do more than what was essential to the processor to provide the required functionality. Today, there are many functional and object-oriented languages that allow ample opportunity for programmers to embellish their programming and documentation. However, if the program performs its functional task, it is rare than anything more is provided.

Providing software that merely performs a required function is no longer enough. Certain computer implementations remain highly sensitive to code storage requirements, processing time, and power requirements. While desktop and other fixed-location computer systems often solve any processing or storage constraint with additional hardware, mobile computing remains particularly sensitive to storage, processing, and power requirements. Even a very modest improvement in any one of storage, processing, and power may represent an epic breakthrough, whereby a previously impractical device is now a viable product. Additionally, factors such as reusability are always touted, but as a practical matter are rarely deployed and when they are, require a significant investment by a human programmer to ensure functional equivalence. However, with benefit of the disclosure provided herein, the computing sciences may benefit from machine-provided editing of software to provide more robust, secure, and reusable code.

As a further benefit of the embodiments disclosed herein, testing and verification can be reduced or even eliminated as functional equivalence is guaranteed. A significant portion of any software development project utilizing the prior art involves confirmation that the functional objectives are satisfied by the program. However, with benefit of the disclosure herein, once a function is approved, any functionally equivalent subsequent code encountered may be replaced with the approved code and functional equivalence is guaranteed without the need to perform subsequent testing on the approved code.

The phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium," as used herein, refers to any tangible storage that participates in providing instructions to a processor for execution. Such a medium may take many forms, including, but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, an EPROM, a FLASH-EPROM, a solid-state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

While machine-executable instructions may be stored and executed locally to a particular machine (e.g., personal computer, mobile computing device, laptop, etc.), it should be appreciated that the storage of data and/or instructions and/or the execution of at least a portion of the instructions may be provided via connectivity to a remote data storage and/or processing device or collection of devices, commonly known as "the cloud," but may include a public, private, dedicated, shared and/or other service bureau, computing service, and/or "server farm."

The terms "determine," "calculate," and "compute," and variations thereof, as used herein, are used interchangeably and include any type of methodology, process, mathematical operation, or technique.

The term "module," as used herein, refers to any known or later-developed hardware, software, firmware, artificial intelligence, fuzzy logic, or combination of hardware and software that is capable of performing the functionality associated with that element. Also, while the disclosure is described in terms of exemplary embodiments, it should be appreciated that other aspects of the disclosure can be separately claimed.

The term "human-readable" as applied to source code, code, software, or equivalents, as used herein, refers to computer instructions utilizing a human-readable format that, without interpreting or compiling, is unable to be read by a machine for the purposes of execution of the instructions. Source code may comprise symbolic representations, such as named variables, functions (e.g., float payment (int principle, float interest)") which may comprise spoken language representations (e.g., "if," "return," "get," "fetch," etc.) and spoken language character representations (e.g., "=", ".", "(", ")", etc.), which may be known as "reserved words." The programming language utilized to embody the human-readable source code may have specific rules as to what is and is not a reserved word or equivalent symbol. Generally, source code is the human output of a developed programming instruction and commonly known by the source code language (e.g., Python, C, C++, FORTRAN, BASIC, etc.).

The term "machine-readable" as applied to machine code, code, software, or equivalents, as used herein, refers to human-readable code that has been processed via a compiler or interpreter to comprise a machine-readable and executable form of the human-readable source code. In one embodiment, machine-readable code is Assembler. In another embodiment, machine-readable code is machine code (e.g., binary). The machine-readable code may utilize standardized identifier naming translation of symbolic representations of human-readable source code (e.g., "principle" and "interest" become "$01" and $02", "sales" and "tax" become "$03" and "$04", etc.) such as to completely or partially remove differences between similar functionality provided by different source code languages and may also become more hardware platform (e.g., Intel x86, Motorola 8000x, CISC, RISC, etc.) specific to accommodate the instruction set for processors or processor families. Machine-readable code may not require further processing to be readable by a machine, such as a microprocessor, but may require additional processing (e.g., linking) to executable by the machine. While a skilled programmer may be able to "read" machine-code, such a form of the software omits language-based symbols, such machine-code is considered to be outside of the realm of human-readable.

The term "data repository," as used herein, is any one or more of a device, media, component, portion of a component, collection of components, and/or other structure capable of storing data accessible to a processor. Examples of data repositories contemplated herein include, but are not limited to, processor registers, on-chip storage, on-board storage, hard drives, solid state devices, fix media devices, removable media devices, logically attached storage, networked storage, distributed local and/or remote storage (e.g., server farms, "cloud" storage, etc.), media (e.g., solid state, optical, magnetic, etc.), and/or combinations thereof. The data repository is accessible to at least one processor but may be logically and/or physically detached from the processor during times when no processor has a present need for access. The data repository may be directly accessible or via one or more intervening components, including but not limited to, a cache and/or buffer. In certain embodiments, the data repository may be organized into a database, file, record, or other logical storage structure and/or portion or collection thereof.

BRIEF DESCRIPTION OF THE DRAWINGS

The present disclosure is described in conjunction with the appended figures:

FIGS. 7-73 depict a solution in accordance with embodiments of the present disclosure.

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising an element number, without a subelement identifier when a subelement identifier exists in the figures, when used in the plural, is intended to reference any two or more elements with a like element number. When such a reference is made in the singular form, it is intended to reference one of the elements with the like element number without limitation to a specific one of the elements. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices that may be shown in block diagram form and are well known or are otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
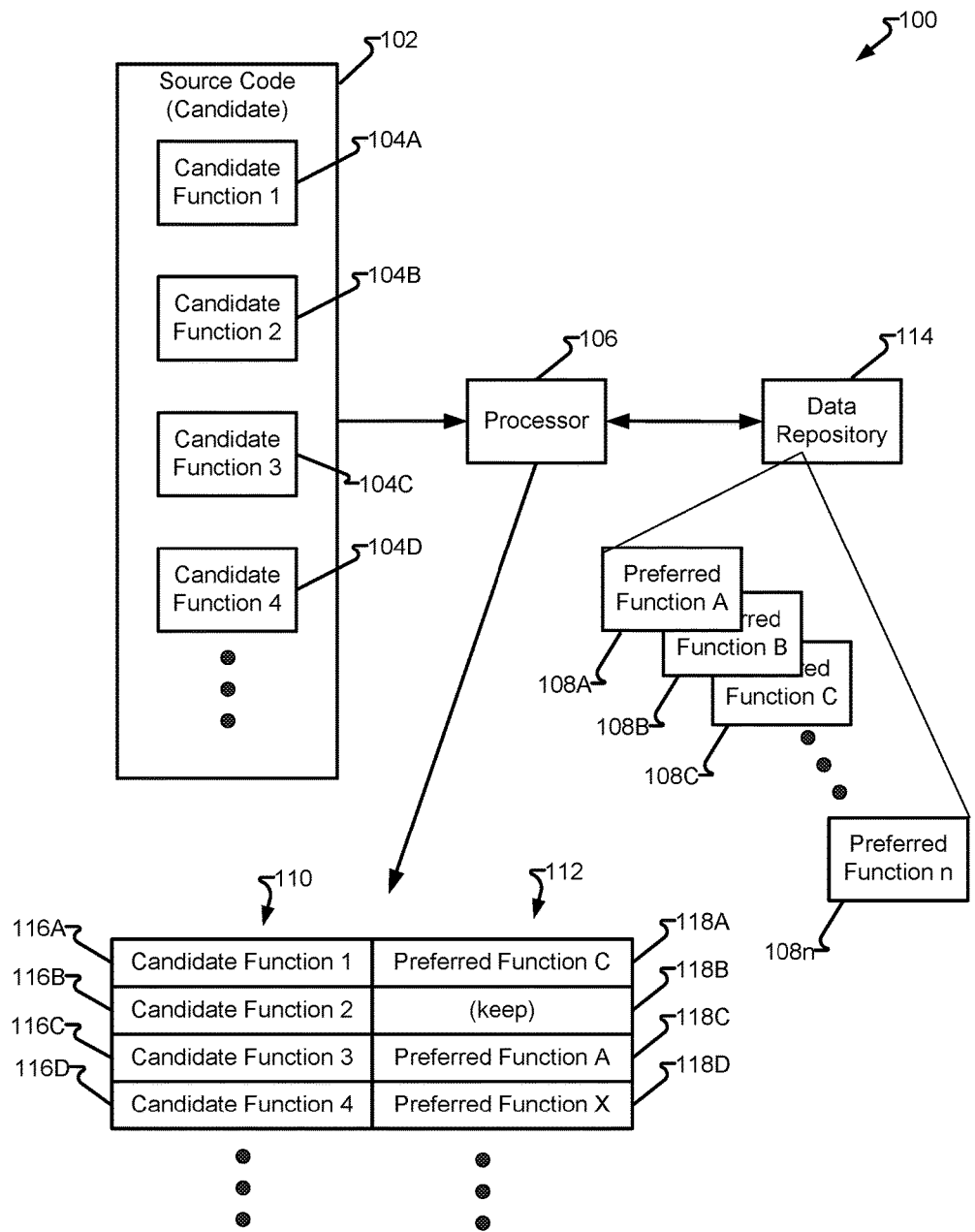
FIG. 1 depicts a first system in accordance with embodiments of the present disclosure.

FIG. 1 depicts system 100 in accordance with embodiments of the present disclosure. System 100 comprises processor 106 accessing source code 102 having therein candidate functions 104A-104D. In one embodiment, at least one of candidate functions 104 comprises a function receiving at least one input to produce at least one output. In another embodiment, at least one of the input and the output may be a function parameter, input from a human input device, memory address, register, port, or other data source. In another embodiment, the output may be a function output, written to an address, presented on an output device, written to a memory address or register, output on a port, and/or any other input and/or output means known in the electronic computing arts.

In one embodiment, source code 102 may comprise candidate functions 104 as written by a programmer, such as by using an integrated development environment or other software authoring tool. Source code 102 is illustrated with a plurality of functions 104 in one embodiment. In another embodiment, source code 102 may comprise a single function 104, such as 104A.

Processor 106 accesses a source code 102 and functions 104 and compares ones of candidate function 104 to ones of preferred functions 108A-108n maintained in data repository 114. Processor 106 may then identify ones of candidate functions 104 to be replaced by ones of preferred functions 108 and processor 106 may then create records, such as those comprising function identifiers 110 associated with indicia 112 to provide an association between ones of candidate function identifiers 116A-116D and ones of replacement indicia 118A-118-D. For example, function identifier 116A ("Candidate Function 1") identifying a particular function, Candidate Function 1 (104A), is associated with function indicia 118A indicating replacement by preferred function 108C (identified as "Preferred Function C"). In another embodiment, replacement indicia 118B associated with function identifier 116B may indicate associated function Candidate Function 2 (104B) is to be maintained. For example, Candidate Function 2 (104B) may not have a counterpart or an identifiable counterpart within data repository 114 or otherwise not functionally equivalent to any one of preferred functions 108. In another embodiment, a recommendation or teaching may be implemented in addition or alternatively to performing the replacement. For example, a message may be presented to a programmer to indicate a function wrote by the programmer (e.g., "Candidate Function 1") may be improved, and optionally present the improvement criterion, to be more like another function (e.g., "Preferred Function C").

Indicia 112 is illustrated as comprising human-readable English data entries as one embodiment selected, in part, for descriptive clarity. Other embodiments contemplated herein include a data value, such as an entry in a data element (e.g., binary, enumerated data type, data structure, etc.) and/or presence of a data element (e.g., flag/no flag, record/no record, object/no object, etc.) maintained in a volatile memory, non-volatile memory, media, data repository 114, other data repository, media, and/or other data storing component, collection of components, or portions thereof and may be implemented in the embodiments disclosed herein without departing from the scope of the disclosure.

Figure 2:
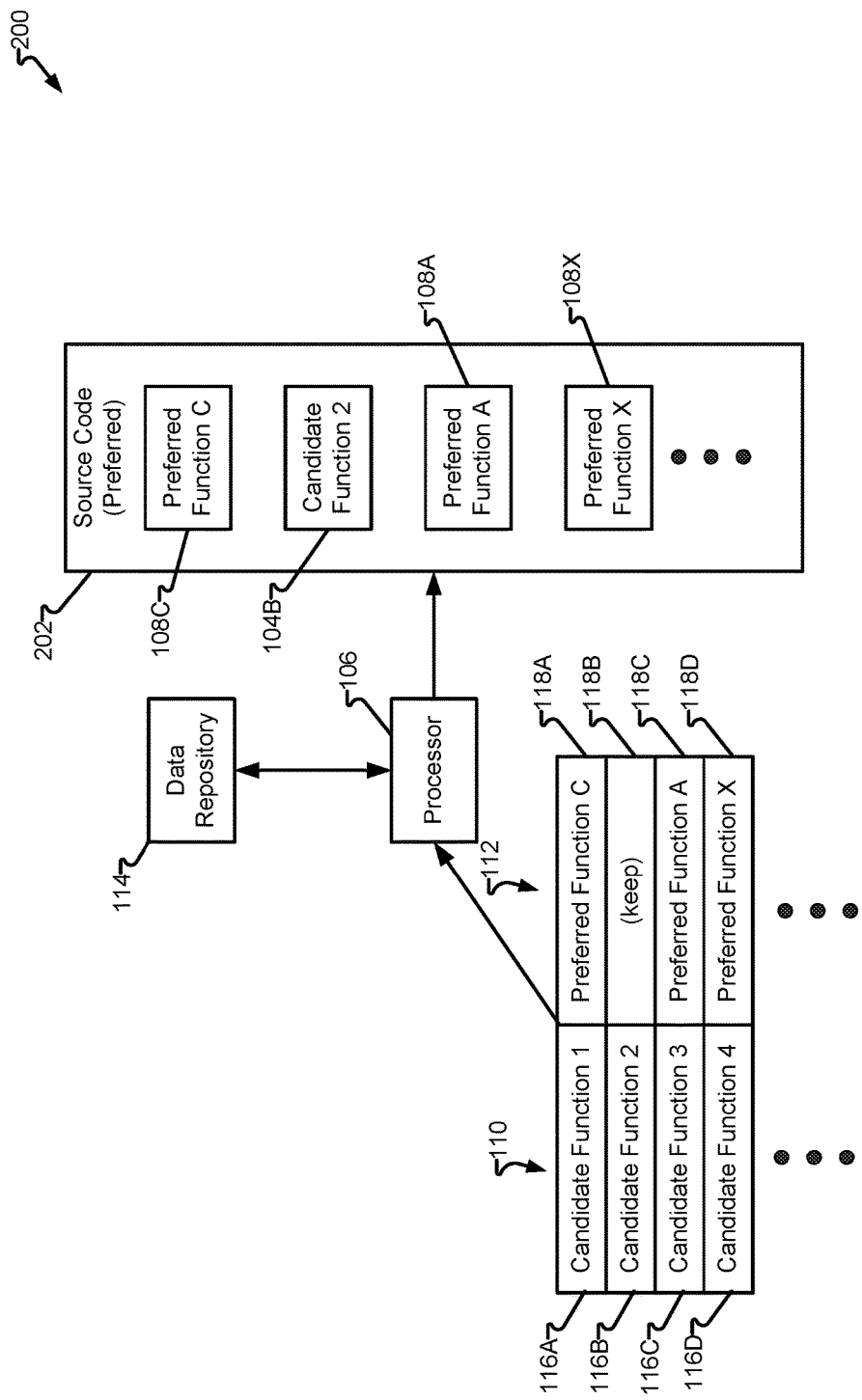
FIG. 2 depicts a second system in accordance with embodiments of the present disclosure.

FIG. 2 depicts system 200 in accordance with embodiments of the present disclosure. In one embodiment, FIG. 2 illustrates system 200 transforming source code 102 (see FIG. 1) to preferred source code 202 via utilization of function indicia 112. Processor 106 accesses function indicia 112 comprising entries 118 and associated with respective function identifiers 110 comprising entries 116. Processor 106 then accesses source code 102 to produce preferred source code 202, a functionally equivalent source code to source code 102 albeit with substitutions provided wherein at least one candidate function 104 is replaced with a functionally equivalent preferred function 108. Processor 106 accesses preferred functions 108 indicated in function indicia 112 from data repository 114 and provides automatic substitution to produce preferred source code 202.

In one embodiment, Candidate Function 1 (104A) is replaced by Preferred Function C (108C), Candidate Function 2 (104B) is maintained, Candidate Function 3 (104C) is replaced by Preferred Function A (108A), and Candidate Function 4 (104D) is replaced by Preferred Function X (108X). Preferred source code 202 may then be saved and identified as preferred source code and further provided for additional development, compiling or interpreting, linking, execution, and/or saving to be accessible at a future time.

Figure 3:
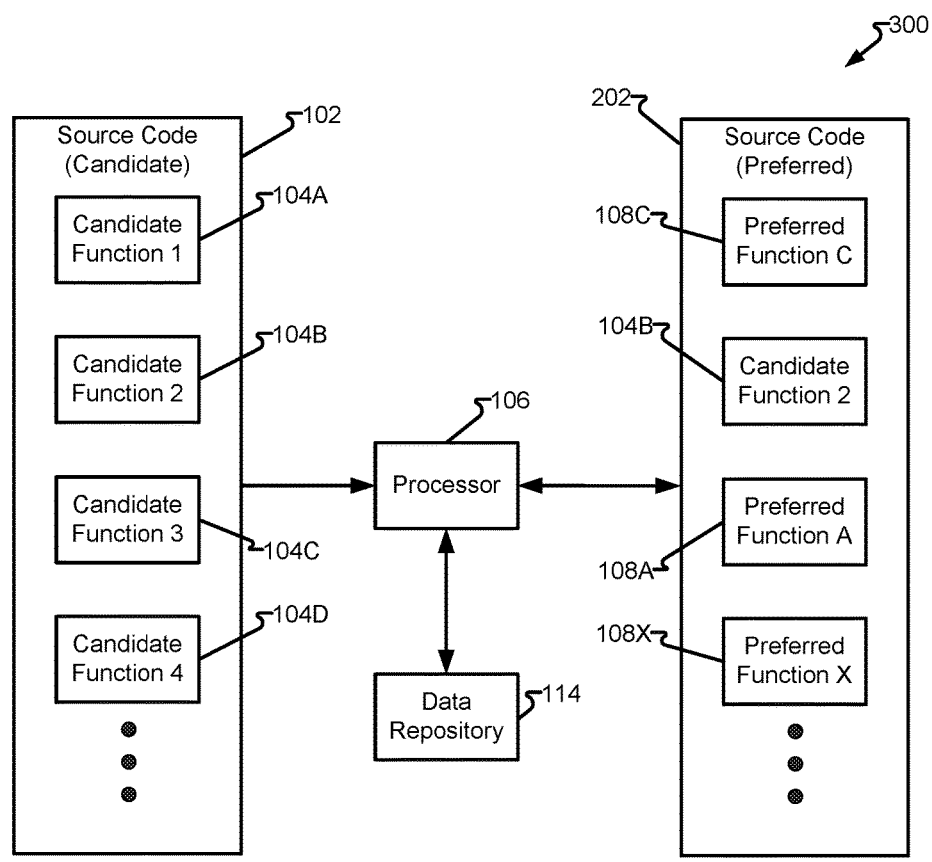
FIG. 3 depicts a third system in accordance with embodiments of the present disclosure.

FIG. 3 depicts system 300 in accordance with embodiments of the present disclosure. In one embodiment, system 300 illustrates source code 102 transforming into preferred source code 202 wherein the indicia of functional equivalence is maintained solely by processor 106 allowing for processor 106 to directly output preferred source code 202. For example, processor 106 may access source code 102 and determine Candidate Functions 1 (104A), 3 (104C), 4 (104D) are to be replaced by Preferred Functions 108 (see FIG. 1) maintained by data repository 114. As a result, processor 106 may directly output preferred source code 202 comprising Preferred Function C (108C), maintaining Candidate Function 2 (104B), Preferred Function A (108A), and Preferred Function X (108X).

Figure 4:
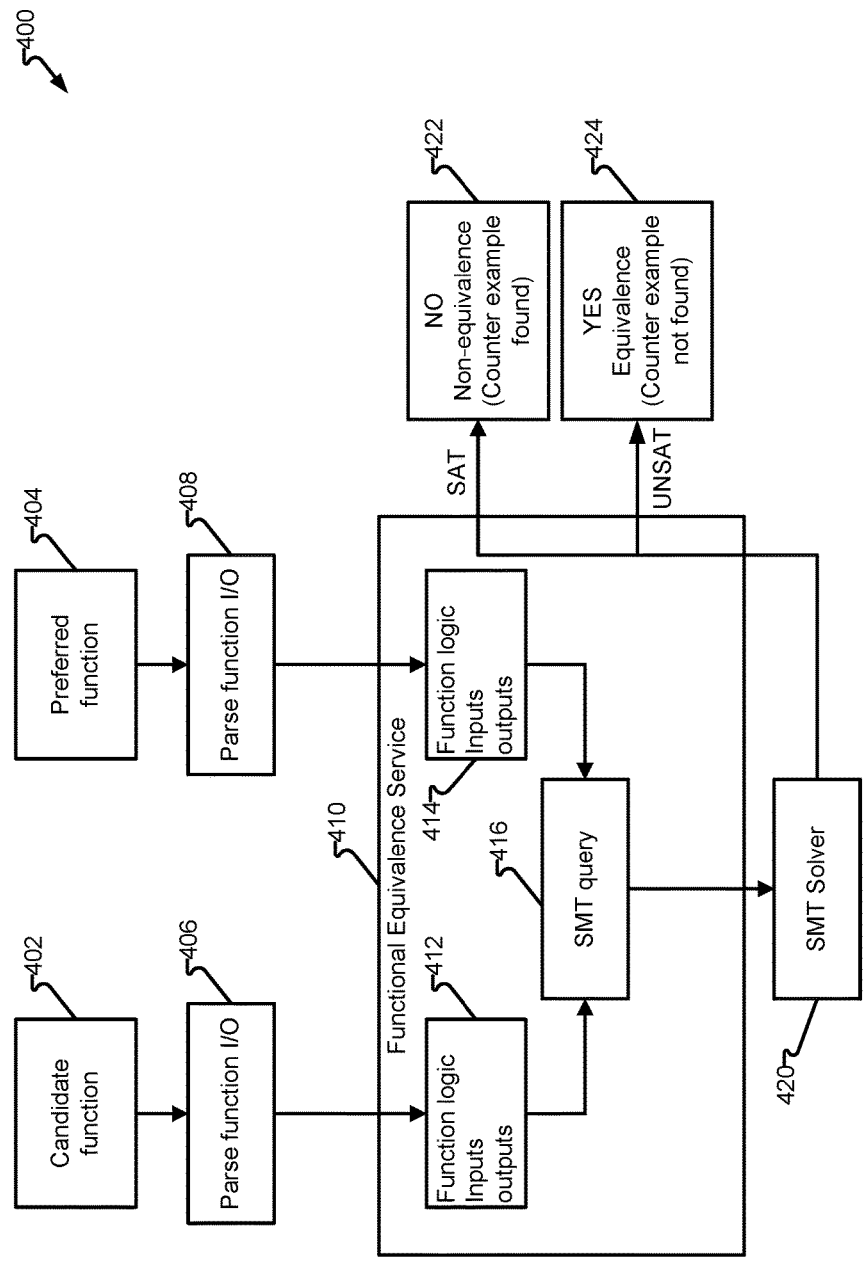
FIG. 4 depicts a fourth system in accordance with embodiments of the present disclosure.

FIG. 4 depicts system 400 in accordance with embodiments of the present disclosure. In one embodiment, the determination of whether two funtions are equivalent, for example Candidate Function 1 (104A) is functionally equivalent to Preferred Function C (108C), is via the application of a logic. The logic is variously embodied. In one embodiment, the logic comprises a first-order logic, in another embodiment, the logic equation comprises a second-order logic. In one embodiment, a single candidate function 402 is considered to determine equivalence to a single preferred function 404. In other embodiments, candidate function 402 may comprise a plurality of functions, such as a plurality of candidate functions 104 and/or preferred function 404 may comprise a plurality of functions, such as a plurality of preferred functions 108. While a logic equation may demonstrate equivalence with identical values, for example, "A or B" is identical, and therefore equivalent to "A or B." However, non-identical but functionally equivalent representations may also indicate equivalence, for example, "A or B" is non-identical, but functionally equivalent to "B or A." Additionally, symbolic representations may be utilized to represent at least a portion of an equation, for example, "A or B" is non-identical, but functionally equivalent to "A or (X and Y nor Z)," when "B" represents "X and Y nor Z."

In another embodiment, functional equivalence is determined by non-equivalence with all but one member of an enumerated set, for which candidate function 402 is a known member. For example, candidate function 402 may be known to perform a basic mathematical function, one of addition, subtraction, multiplication, and division. Preferred function 404 may be determined to be functional equivalent to candidate function 402 when, preferred function 404 is a member of the set of four basic mathematical functions and non-equivalence is determined for three other functions, thereby leaving preferred function 404 as the only function for which non-equivalence is determined and, therefore, functionally equivalent.

Candidate function 402 has an input/output signature parsed via parse function I/O 406. Similarly, preferred function 404 has an input/output signature parsed via parse function I/O 408. Table 1 provides one example of candidate function 402:

TABLE 1

```
int sum_mod (int x, int y) {
    if (y == 0) {
        throw domain_error ("Modulus cannot be 0.");
    }
    if (y<0) {
```

TABLE 1-continued

```
        int pos_y = -y;
        return sum_mod(x, pos_y);
    }
    if (x<0) {
        while (x<0) {
            x += y;
        }
        return x;
    }
    while (x>=0) {
        x -= y;
    }
    return (x+y)
}
```

Table 2 provides one example function of preferred function 404:

TABLE 2

```
int div_mod (int x, int y) {
    if (y==0) {
        throw domain_error ("Modulus cannot be 0.");
    }
    int div = x/y;
    int rem = x - (div*y);
    return rem;
}
```

In one embodiment, preferred function 404 has been vetted and identified as preferred, such as due to conciseness of the human-readable code therein. Conciseness may be provided by an abstract syntactic structure, such as an Abstract Syntax Tree (AST). For example, few nodes, fewer leaf nodes, depth of nodes, width of nodes, may provide a conciseness metric. Functional equivalence service 410 then determines whether the equivalence is true. In one embodiment, functional equivalence service derives first-order logic 412 for parsed candidate function 402 and first-order logic 414 for parsed preferred function 404 to derive a first-order logic, which, in one embodiment, comprises SMT query 416.

Table 3 illustrates one example of a function decomposed into logic, inputs, and outputs.

TABLE 3 f1-sum_mod:
[...f1 Logic ...]
Inputs:
[f1(x), f1(y)]
Outputs:
[f1(retVal)]

Table 4 illustrates another example of a function decomposed into logic, inputs, and outputs.

TABLE 4 f2-div_mod:
[...f2 Logic ...]
Inputs:
[f2(x), f2(y)]
Outputs:
[f2(retVal)]

Table 5 illustrates one example of an SMT query.

TABLE 5

(f1 Logic)∧(f2 Logic)∧(f1(x)=f2(x))∧
(f1(y)=f2(y))∧(¬ (f1(retVal)=f2(retVal)))

In another embodiment, SMT query 416 is provided to SMT solver 420 to produce an output indicating satisfied ("SAT") non-equivalence result or NO result 422 or unsatisfiable ("UNSAT") equivalence result or YES result 424.

Figure 5:
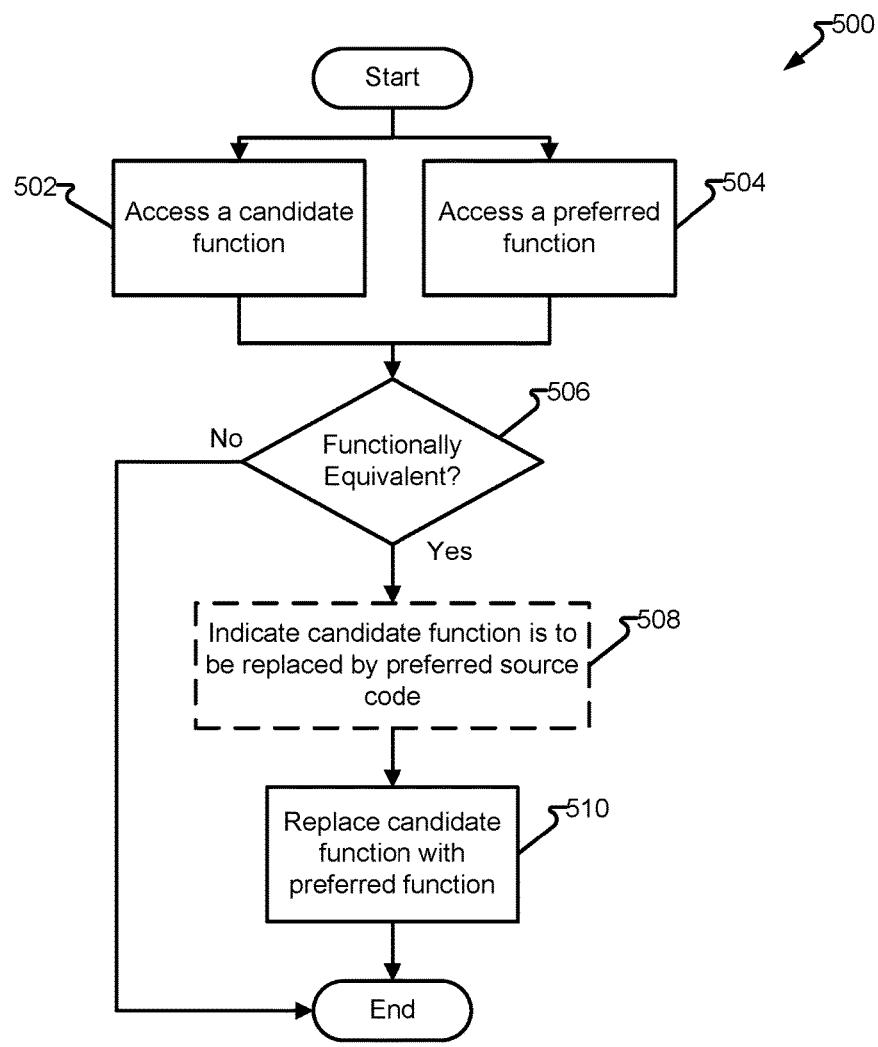
FIG. 5 depicts a process in accordance with embodiments of the present disclosure.

FIG. 5 depicts process 500 in accordance with embodiments of the present disclosure. In one embodiment, process 500 is executed, such as by processor 106. Process 500 may begin with one or both of steps 502, 504, wherein step 502 accesses a candidate function, such as from a candidate source code 102, which may comprise a plurality of functions 104. Step 504 accesses a preferred function, such as comprising one or more preferred functions 108 within preferred source code 202.

Next, step 506 determines if the functions are functionally equivalent (e.g., produce the same results when given the same inputs) and, if yes, process 500 continues to optional step 508 to provide indicia of the replacement or, if step 508 is not implemented, to provide the indicia externally to process 500. Otherwise processing continues to step 510. Step 510 replaces candidate function 502 with preferred function 504. If step 506 is determined in the negative, then no substitution is required and process 500 may end. Optionally, following step 510 the source code comprising the, now replaced, preferred function 504 may be saved to a media or otherwise maintained for additional or future processing and/or reference.

As provided herein, preferred source code, such as comprising one or more preferred functions 108, may be provided by automatically replacing a functionally equivalent, but not preferred, candidate source code, such as comprising one or more candidate functions 104. The preferred source code may be determined to be preferred based upon a prior vetting wherein the preferred source code becomes authorized for use. The preferred source code may be determined to be preferred due to storage requirements of the human-readable form and/or machine-readable form, performance metric, security, presences of internal documentation, presences of a particular volume of internal documentation, use of verbose variable names, conciseness of instructions, error handling, and/or other attribute. In another embodiment, the source code is preferred due to a prior vetting. In a further embodiment, the candidate source code has not been subject to a prior vetting. In a still further embodiment, the preferred source code has been vetted by a higher authority as compared to the candidate source code, which may have been vetted by a lower authority, such as the developer of the candidate source code. In yet another embodiment, the determination of a preferred source code may be determined in accord with a criterion, for example, any one or more of fewer lines of code, fewer procedural calls, more comments, longer variable names, etc.

Figure 6:
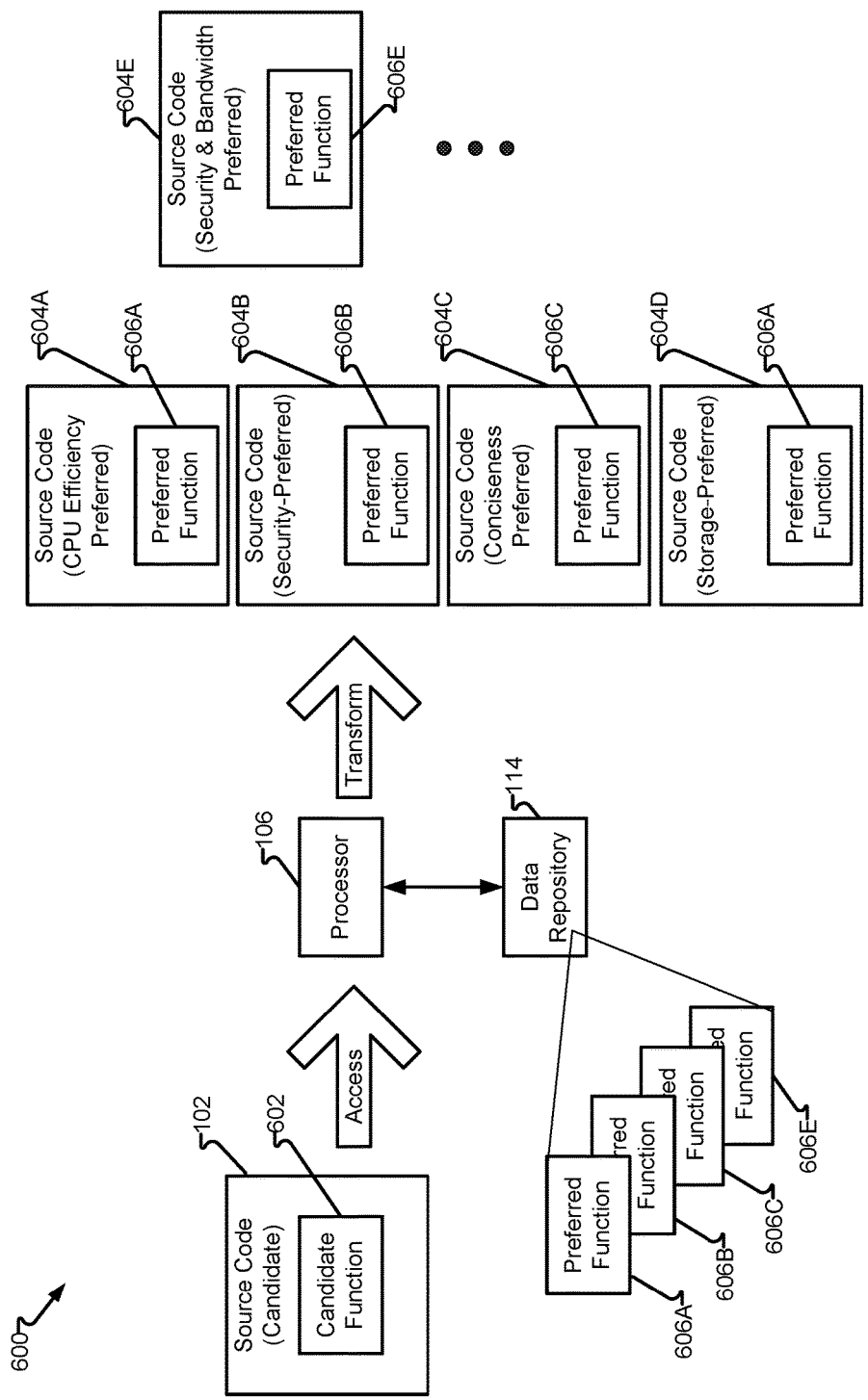
FIG. 6 depicts a fifth system in accordance with embodiments of the present disclosure.
Figure 10:
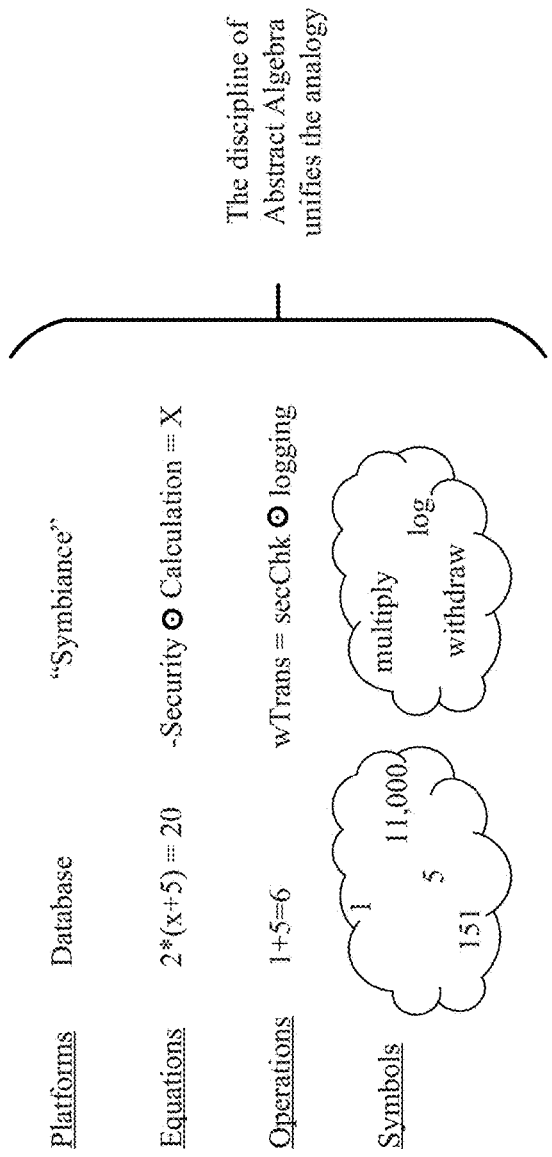
Figure 15:
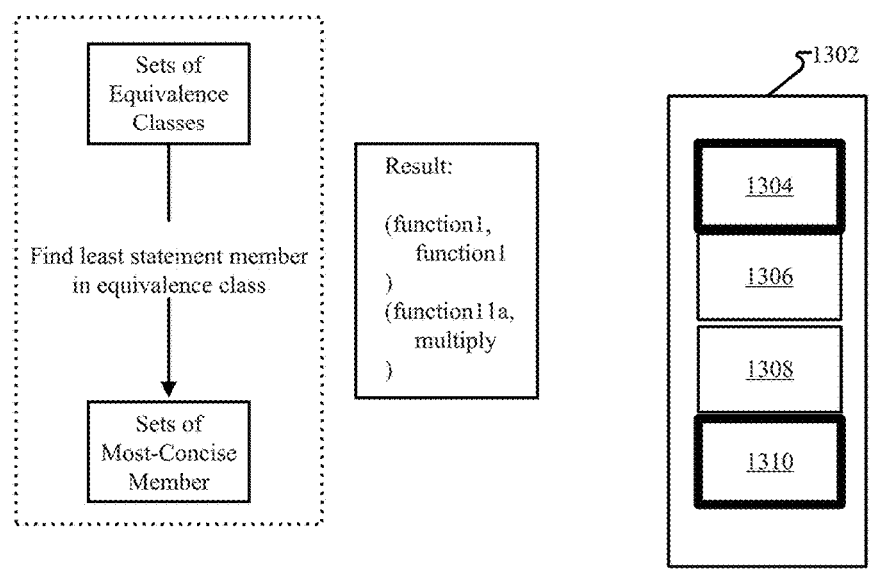

FIG. 6 depicts system 600 in accordance with embodiments of the present disclosure. System 600 depicts processor 106 accessing candidate source code 102 comprising candidate function 602. In one embodiment, processor 106 determines that candidate function 602 is functionally equivalent to at least one preferred function 606A-606*n* maintained in data repository 114.

In one embodiment, processor 106 transforms candidate source code into one of preferred source codes 604A-606E. In another embodiment, processor 106 transforms candidate source code into two or more of preferred source codes 604A-604E. Processor 106 transforms source code 102 into one or more of preferred source codes 604A-604E to output source code, such as a source code file, satisfying at least one preferred aspect. The preferred source code may result in a more optimal operation of a machine or component of a machine, such as by performing fewer operations, faster operations, less storage requirements, performing an operation with fewer resource demands, utilizing less expensive (e.g., power, response, etc.) resource, performing more secure operations, etc. The preferred aspect is variously embodied and includes, but is not limited to, security, CPU efficiency, bandwidth efficiency, storage requirement, conciseness of code, database accesses, or a combination of two or more.

In one embodiment, processor 106 determines that candidate function 602 is functionally equivalent to the preferred function 606A, which has been identified as being preferred in terms of CPU usage (e.g., clock cycles, operations, etc.) Accordingly, processor 106 transforms source code 102 into preferred source code 604A, comprising preferred function 606A in place of candidate function 602. As a result source code 102 is transformed into source code 604A.

In another embodiment, processor 106 determines that candidate function 602 is functionally equivalent to the preferred function 606B, which has been identified as being preferred in terms of security. For example, function 606B may utilize a previously approved communication encryption protocol, approved communication port, approved error-handling routine, etc.

In another embodiment, processor 106 determines that candidate function 602 is functionally equivalent to the preferred function 606C, which has been identified as being preferred in terms of conciseness of code. For example, function 606C may utilize human-readable source code that has been determined to be more concise, such as to promote readability and optionally machine efficiency. For example, it may be preferred to utilize source code that uses fewer operators, such as "X++" over "X=X+1."

In another embodiment, processor 106 determines that candidate function 602 is functionally equivalent to the preferred function 606D, which has been identified as being preferred in terms of storage. Even with modern data storage technology, data storage may still be an issue, particularly with embedded systems and mobile technology where chip and board "footprint" are more critical. For example, function 606D may utilize source code that requires less storage space, such as "i=r*b" may be preferred over the more verbose "interest=rate*balance."

In another embodiment, processor 106 determines that candidate function 602 is functionally equivalent to the preferred function 606E, which has been identified as being preferred in terms of both security and bandwidth. For example, preferred function 606E may utilize fewer network-dependent operations and a preferred port and/or security protocol.

Figure 16A:
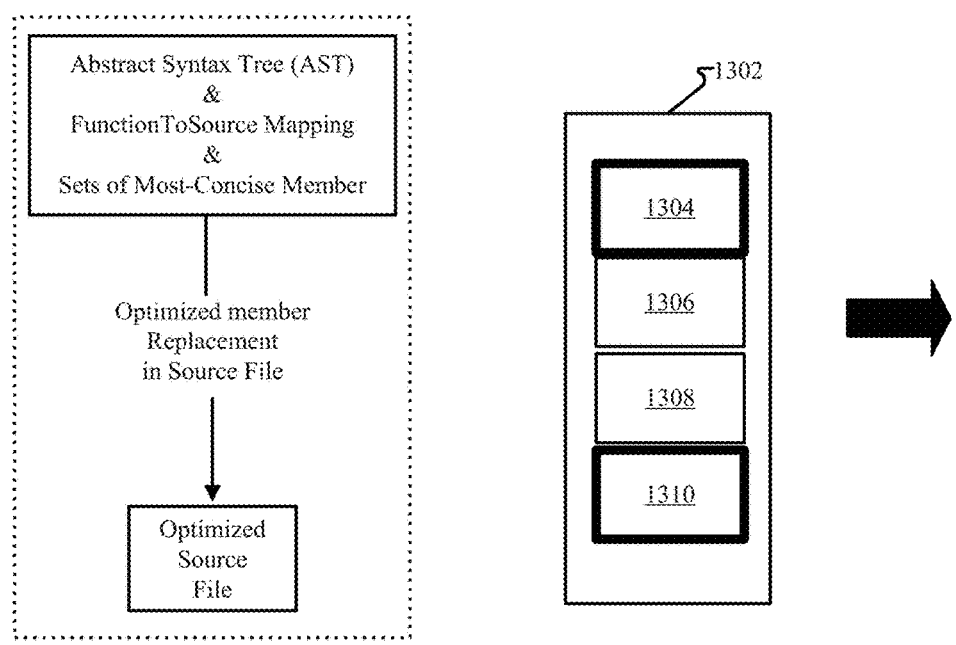
Figure 16B:
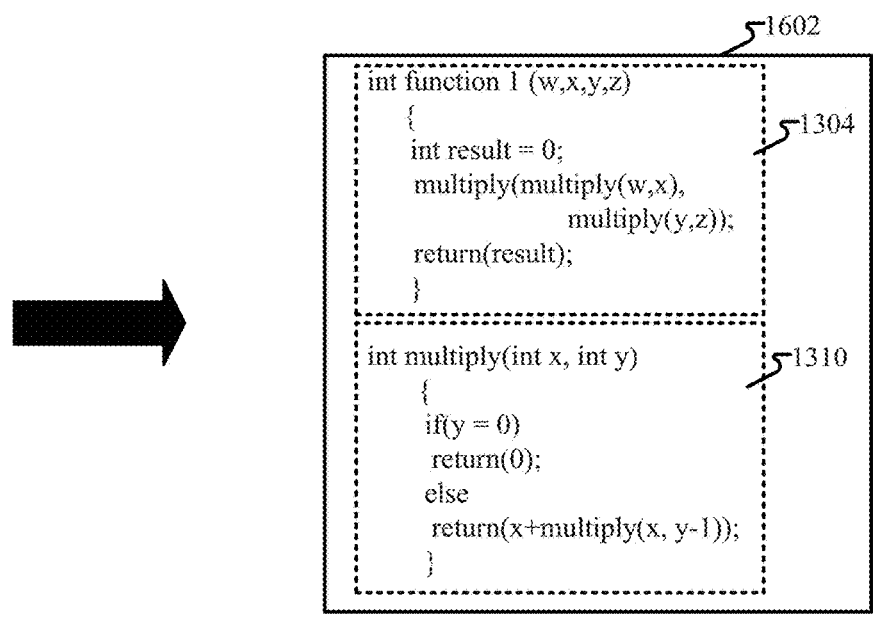
Figure 17:
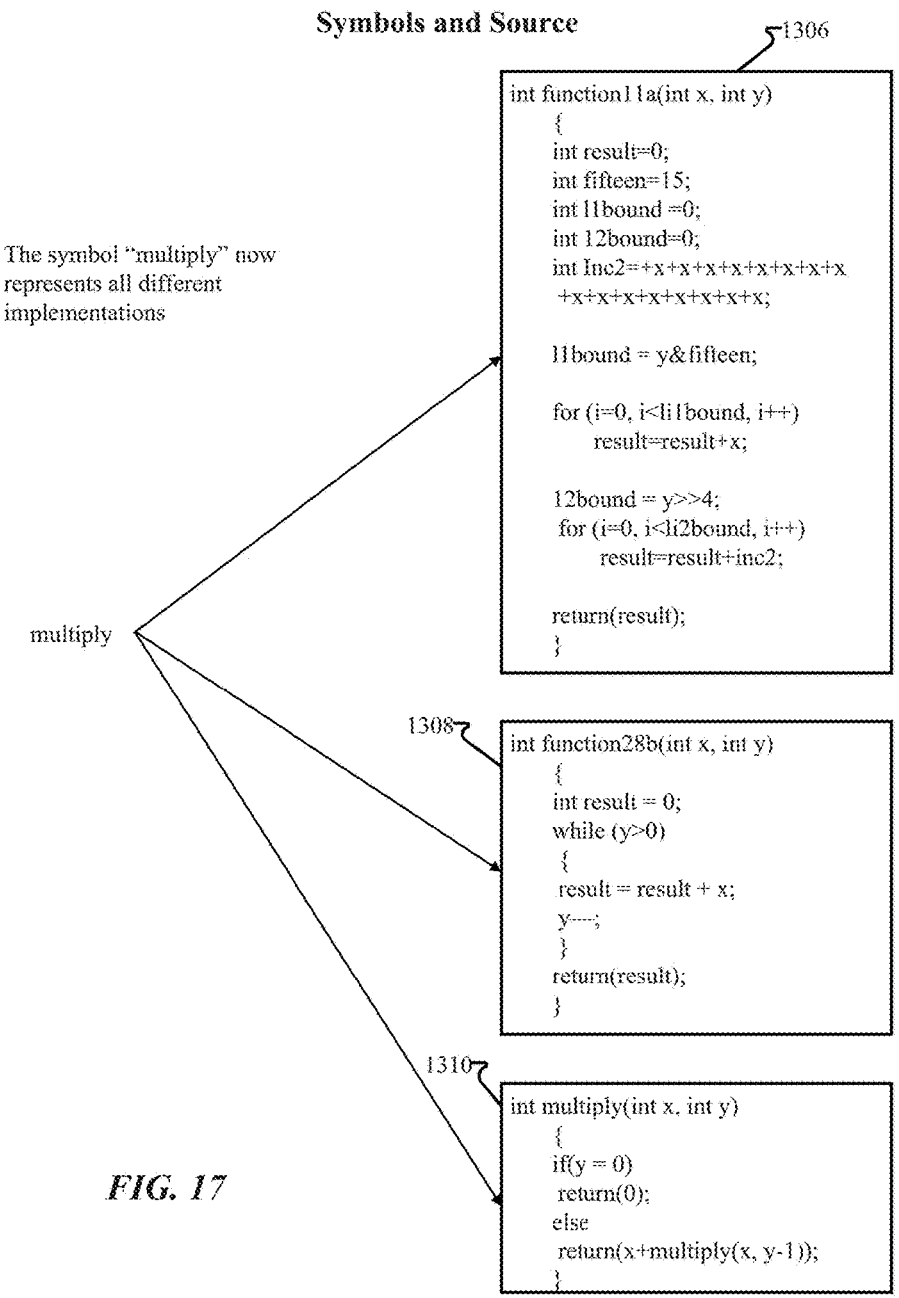
Figure 19:
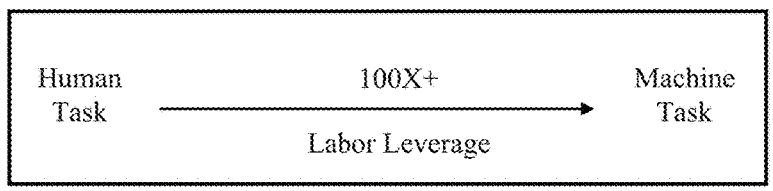
Figure 22:
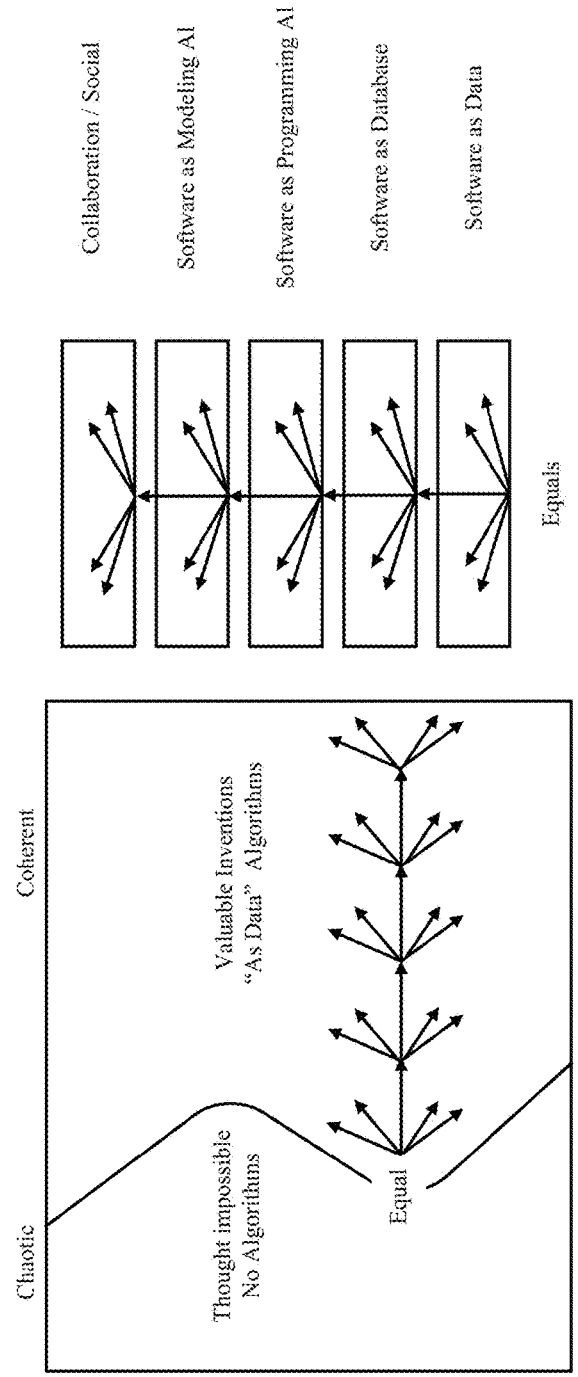
Figure 23:
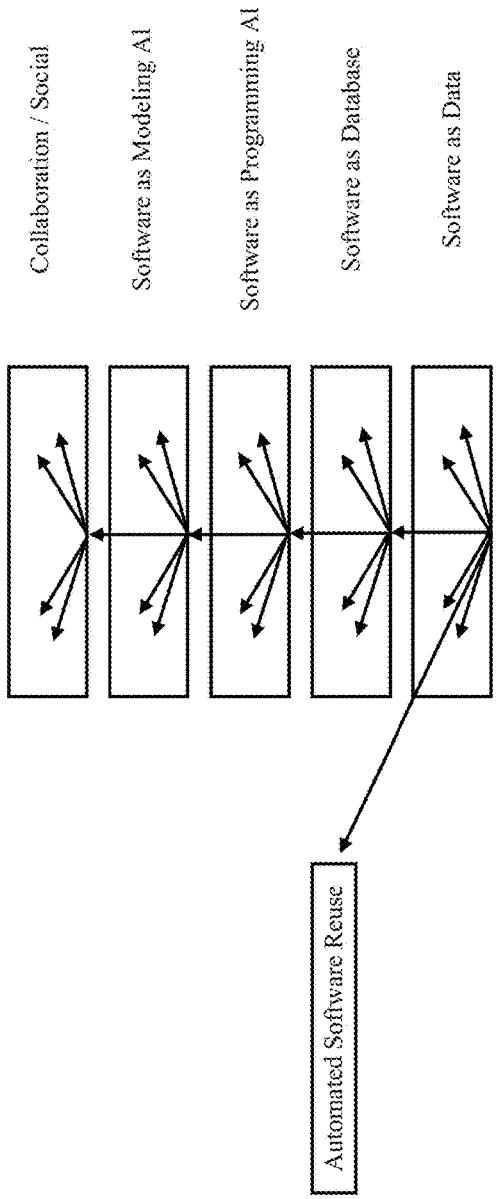
Figure 25:
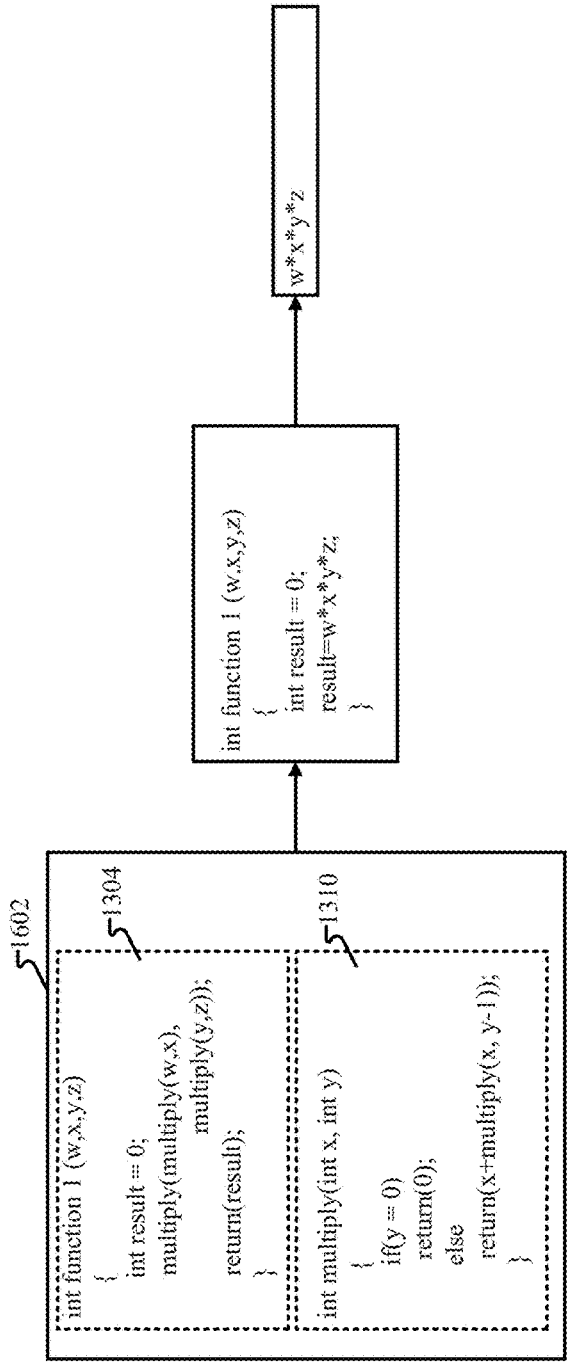
Figure 30B:
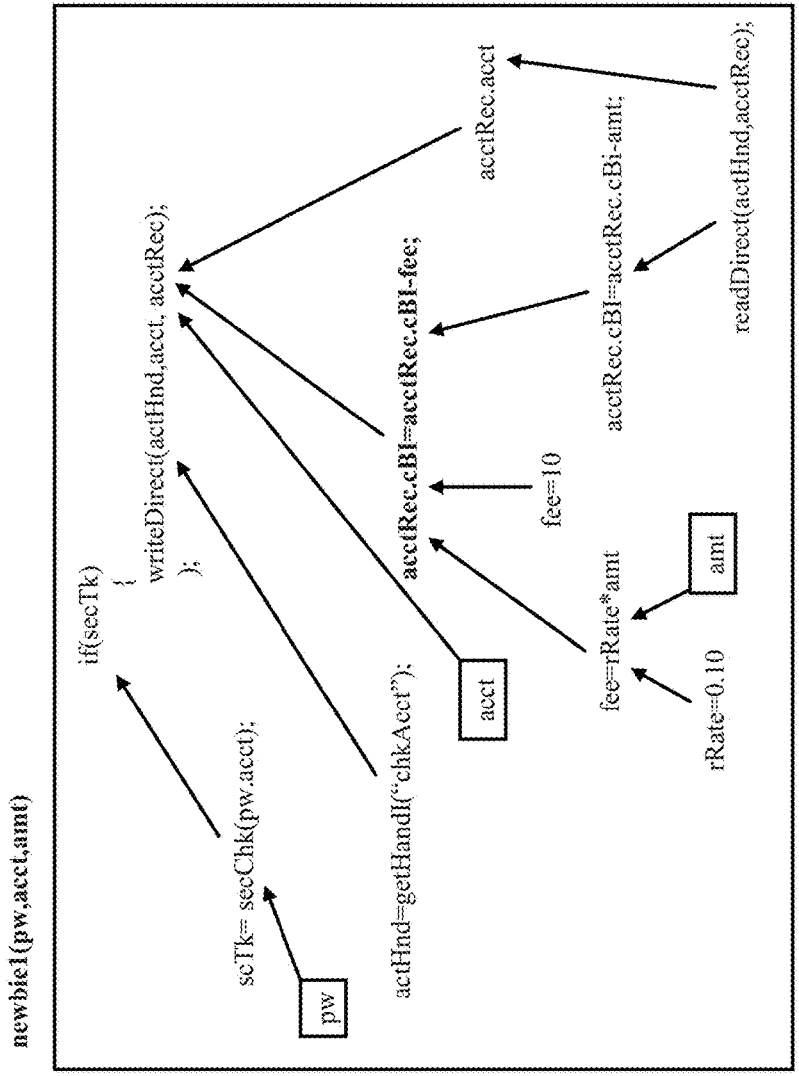
Figure 31B:
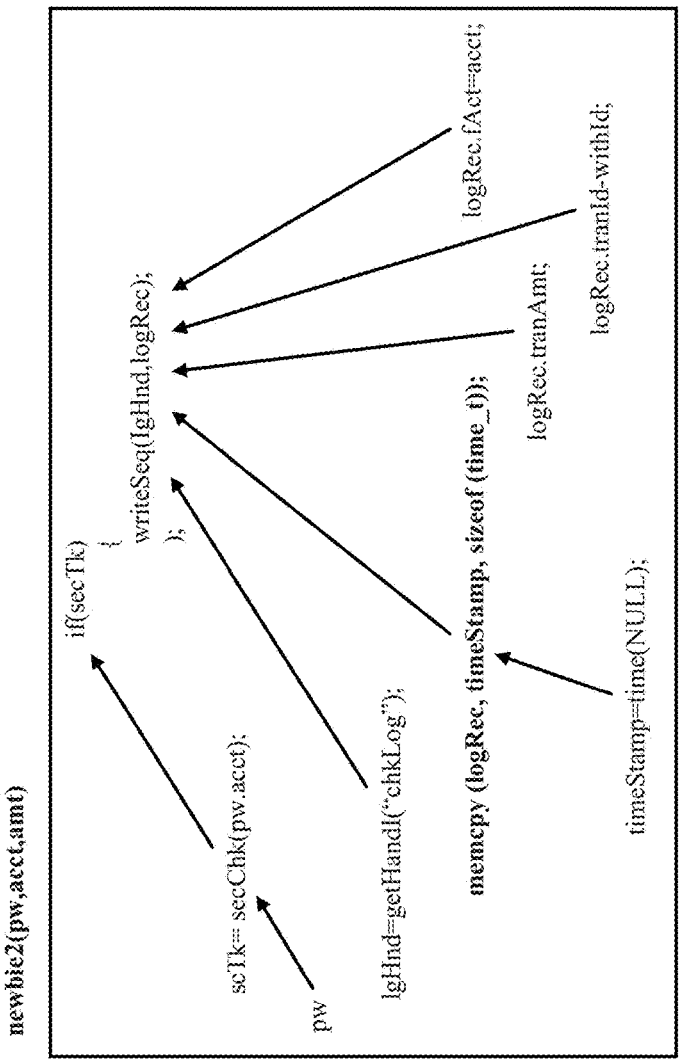
Figure 32C:
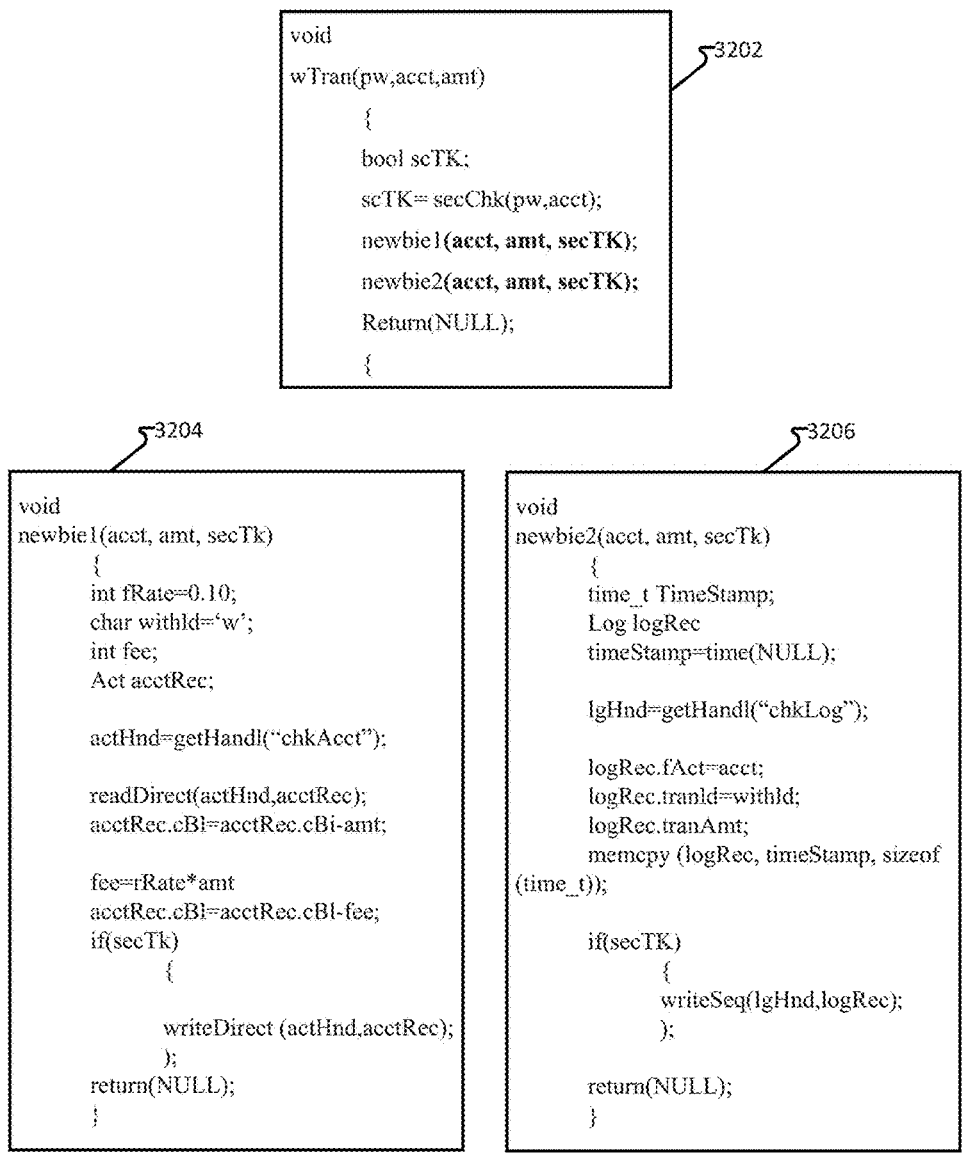
Figure 33:
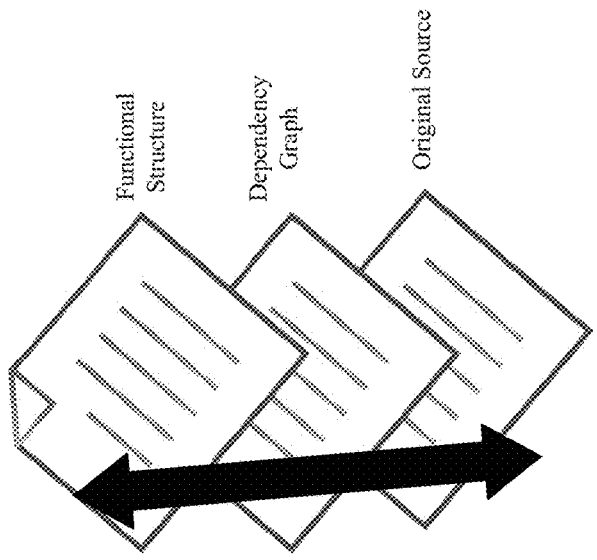
Figure 36:
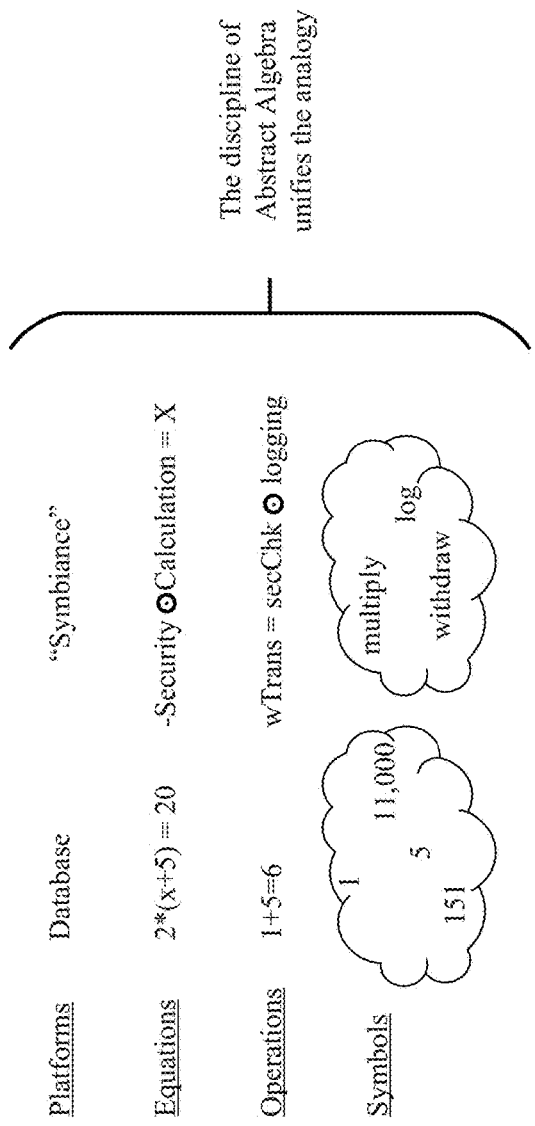
Figure 39:
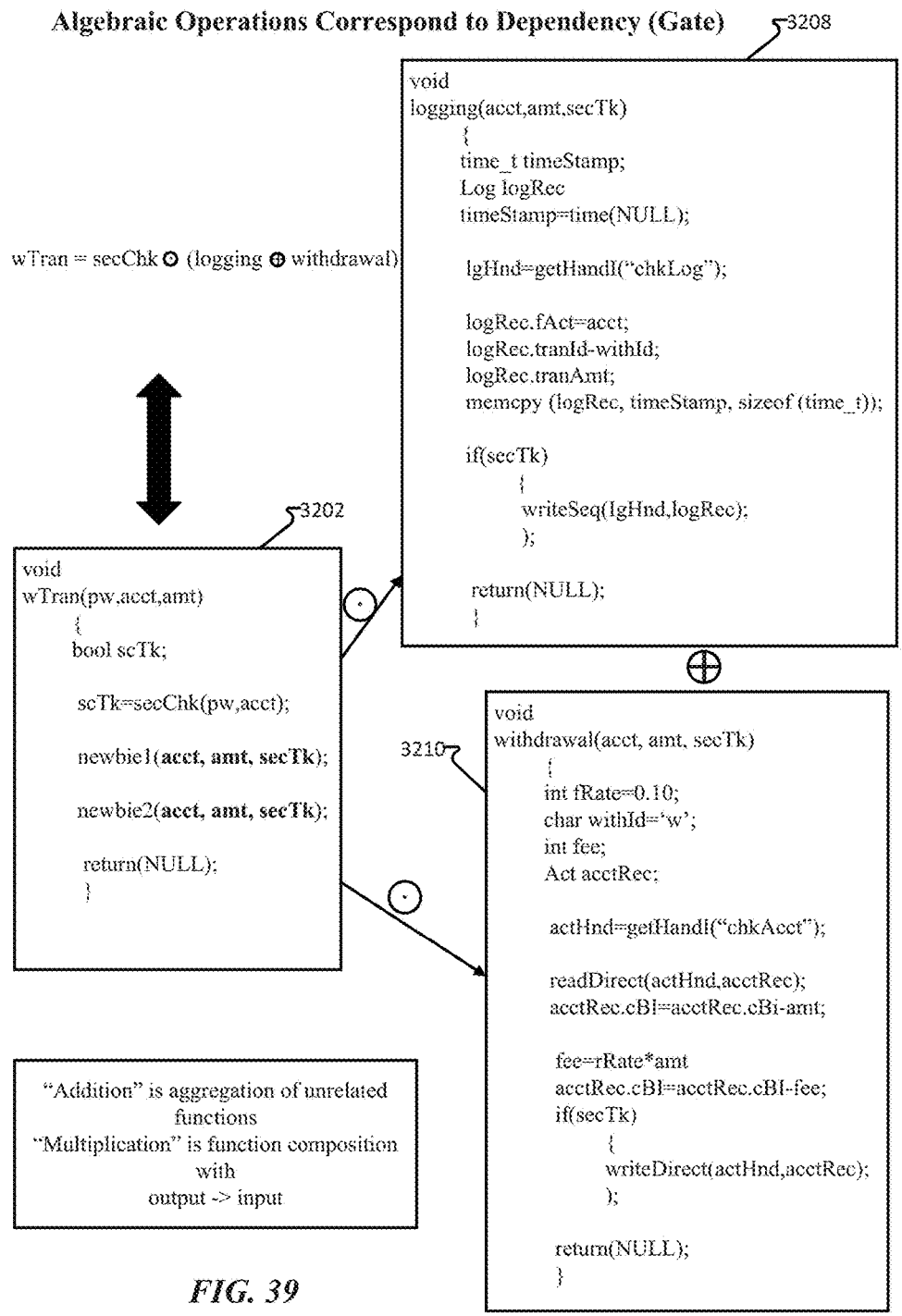
Figure 40:
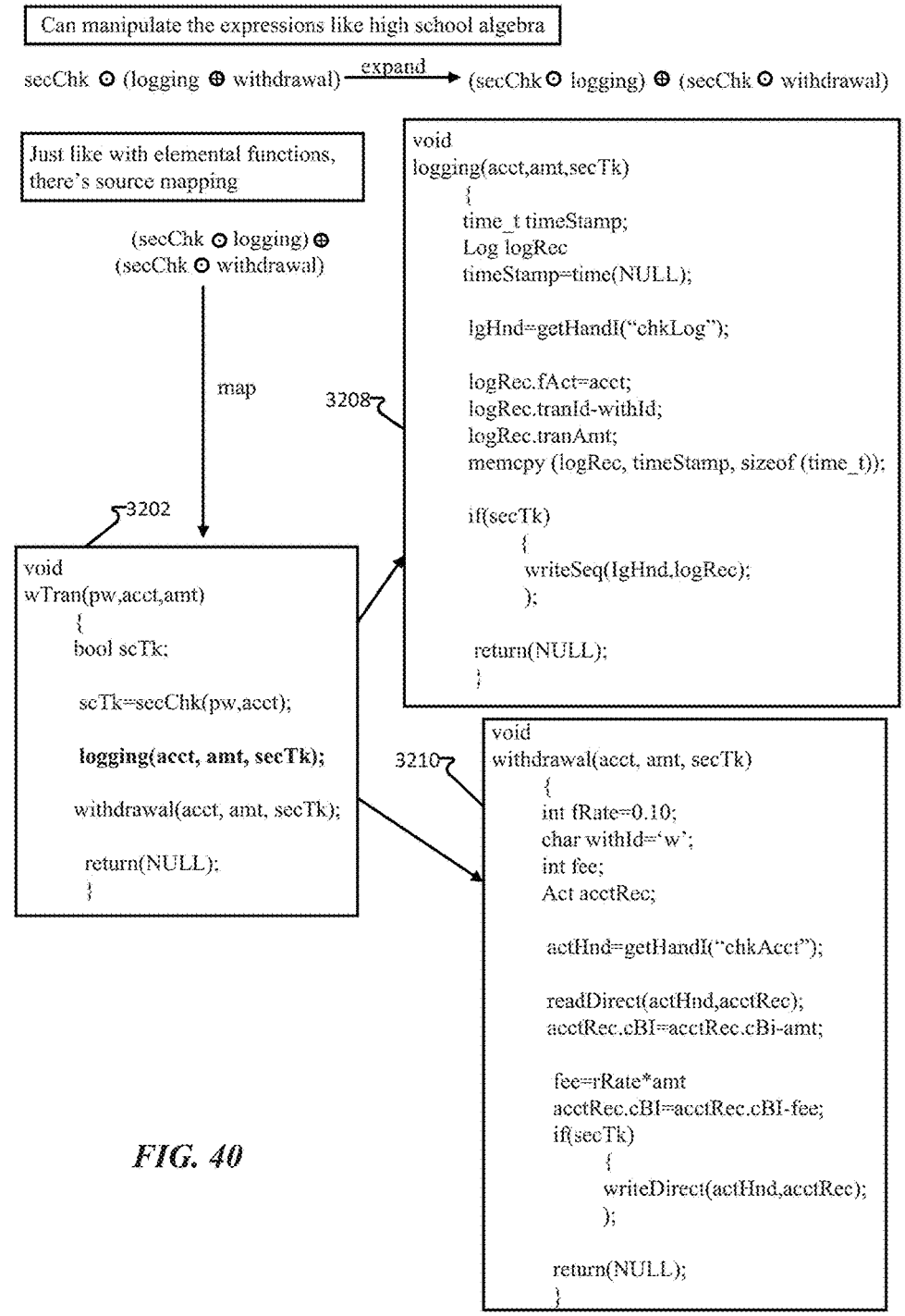
Figure 41:
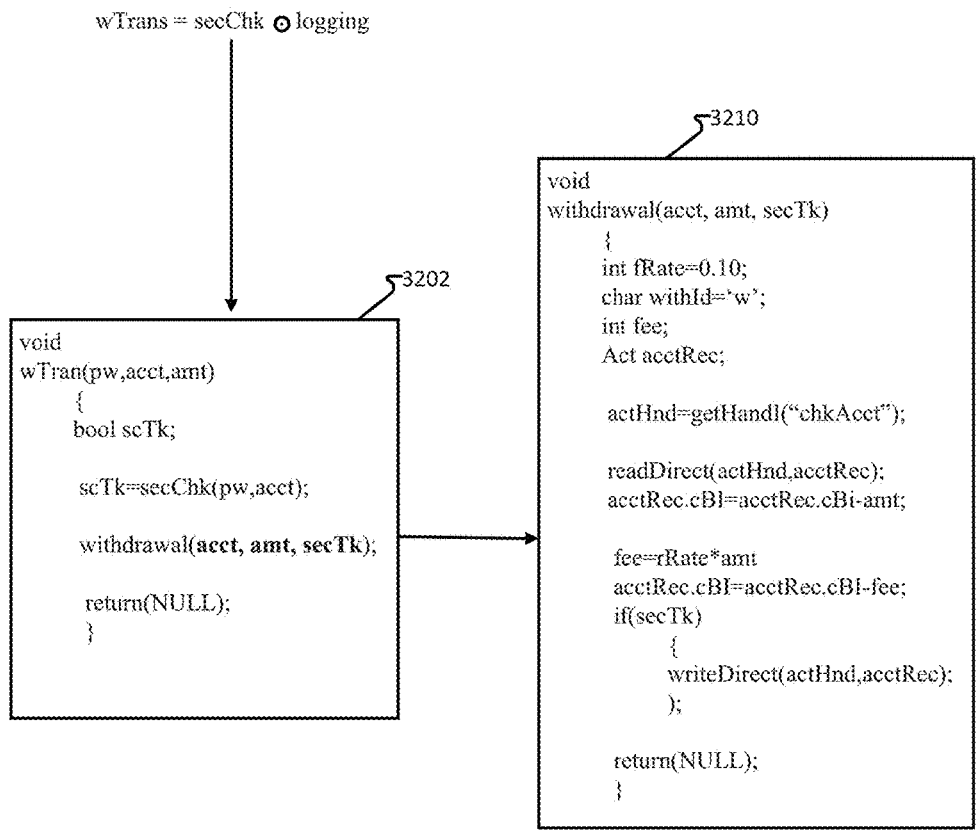
Figure 42:
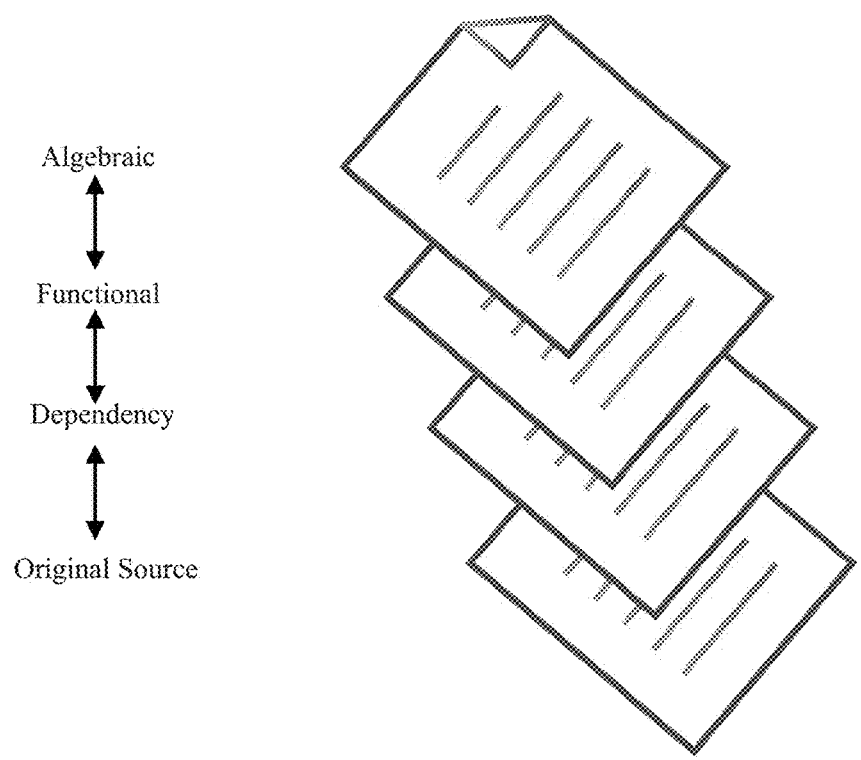
Figure 46:
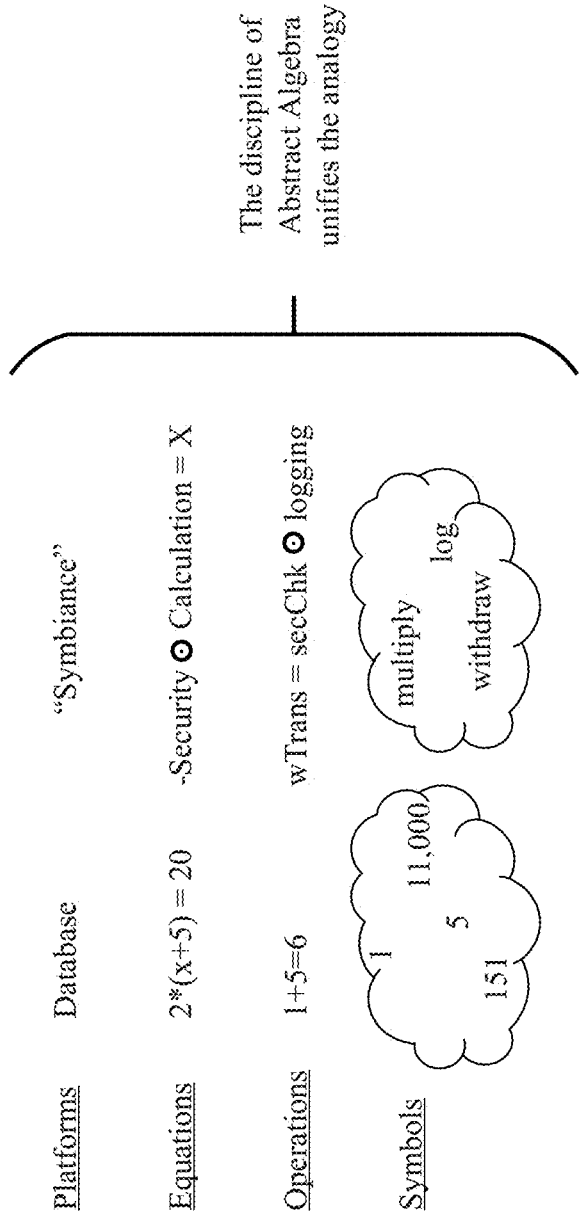
Figure 47:
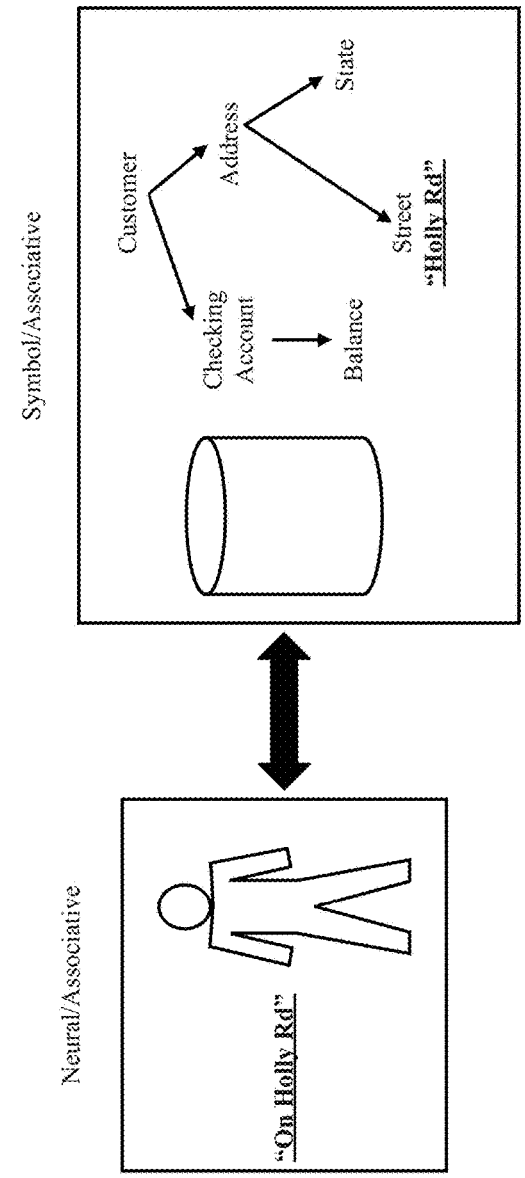
Figure 49A:
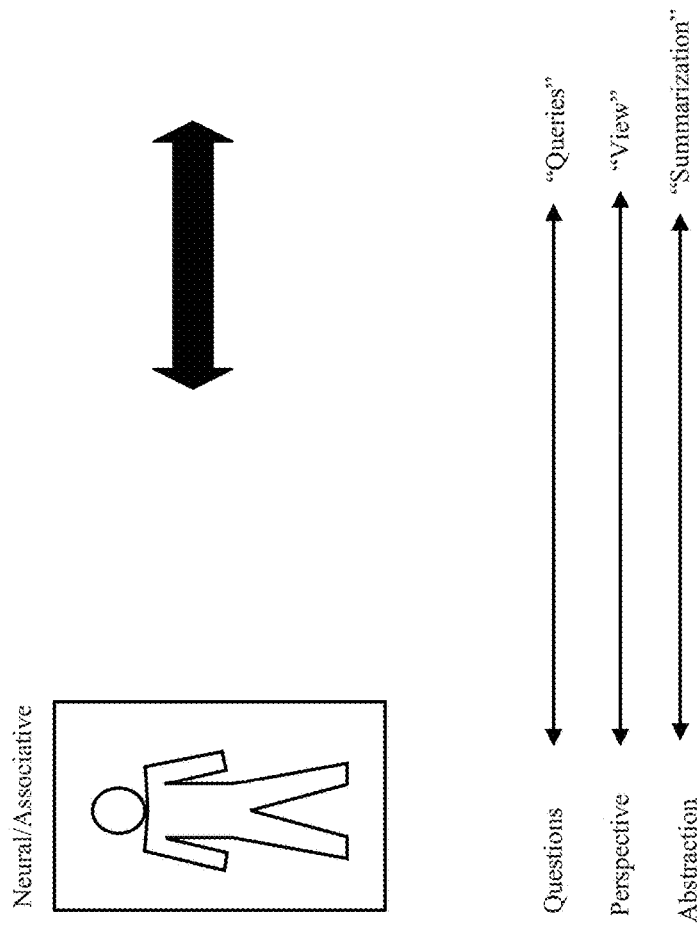
Figure 49B:
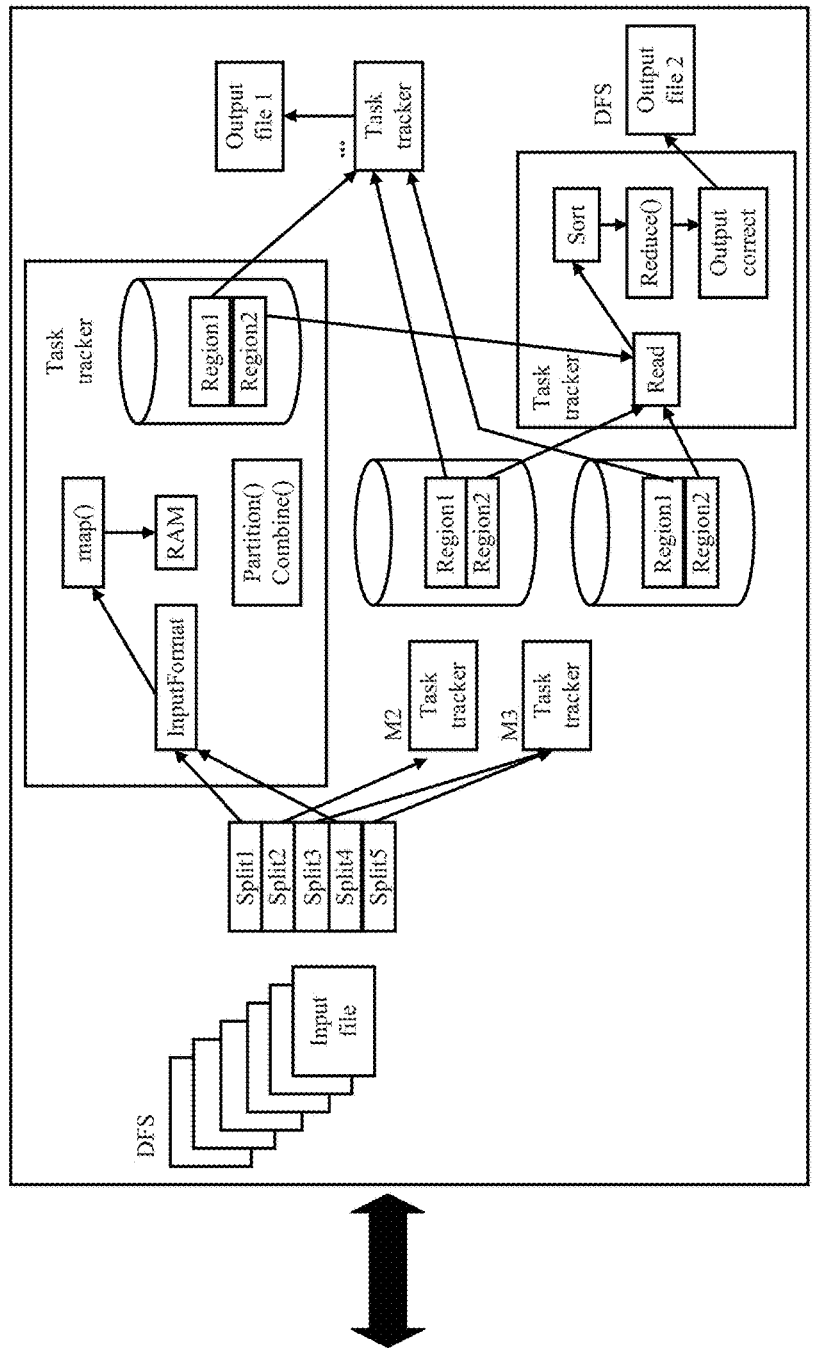
Figure 50:
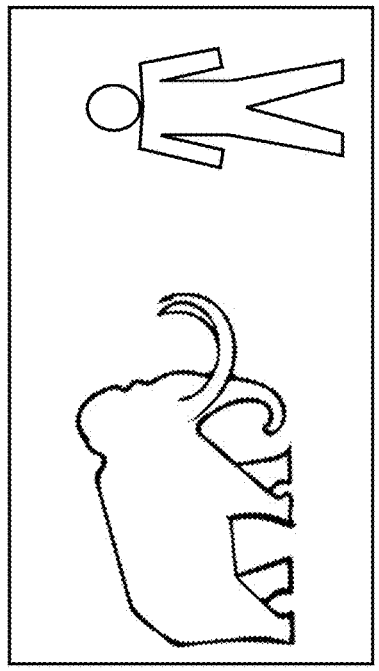
Figure 51:
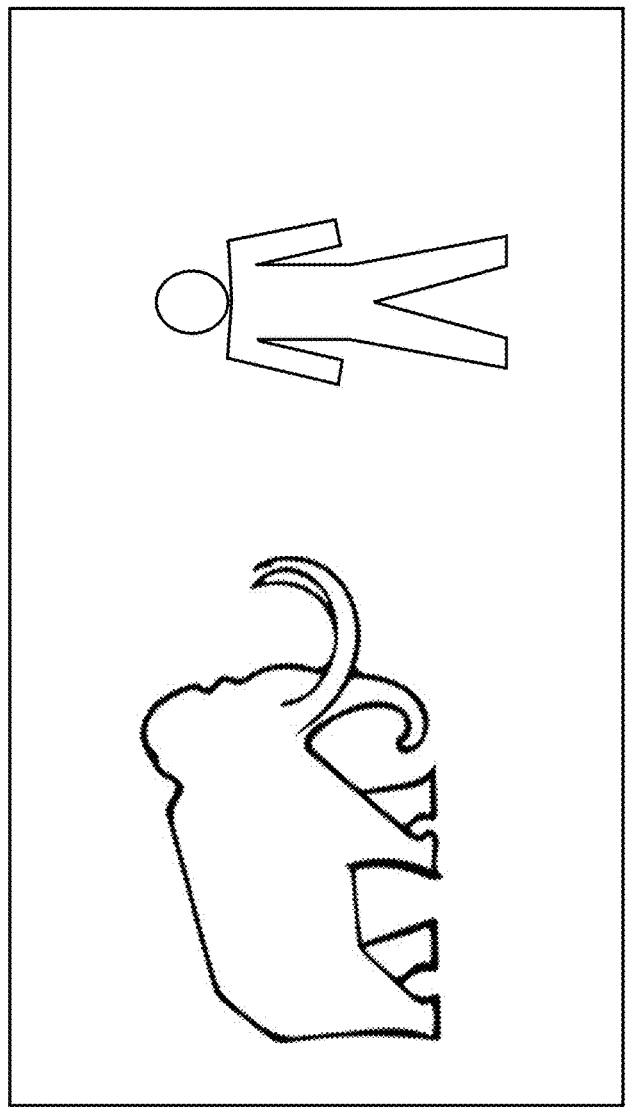
Figure 52:
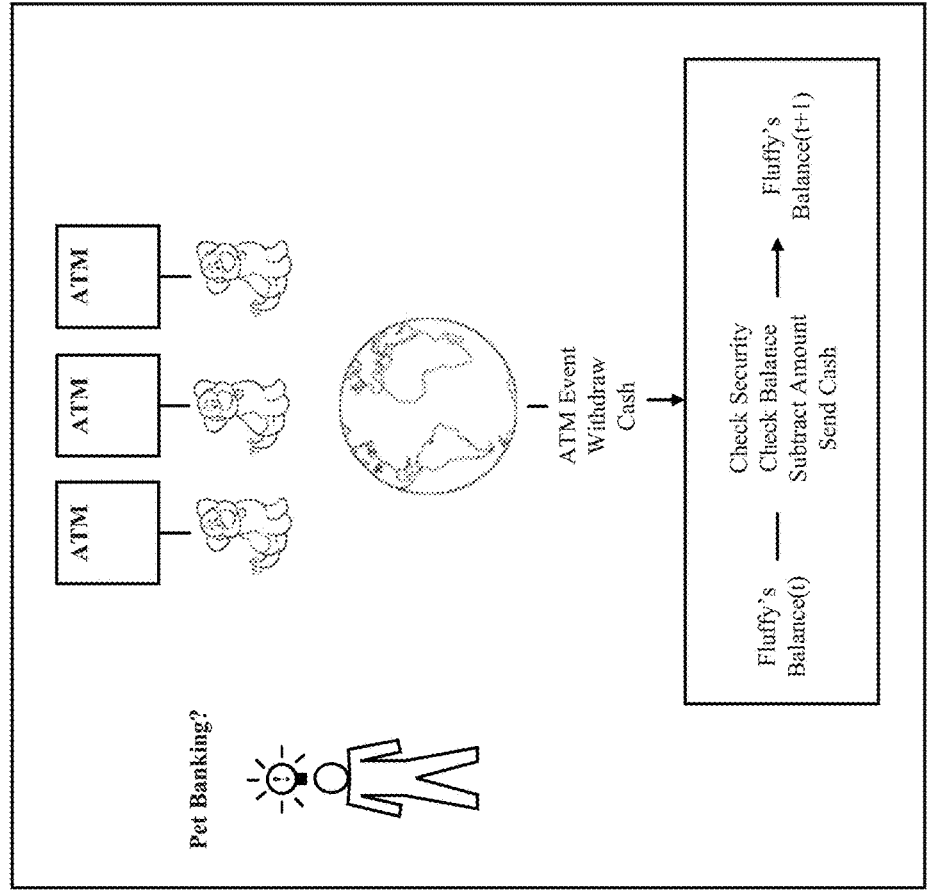
Figure 53:
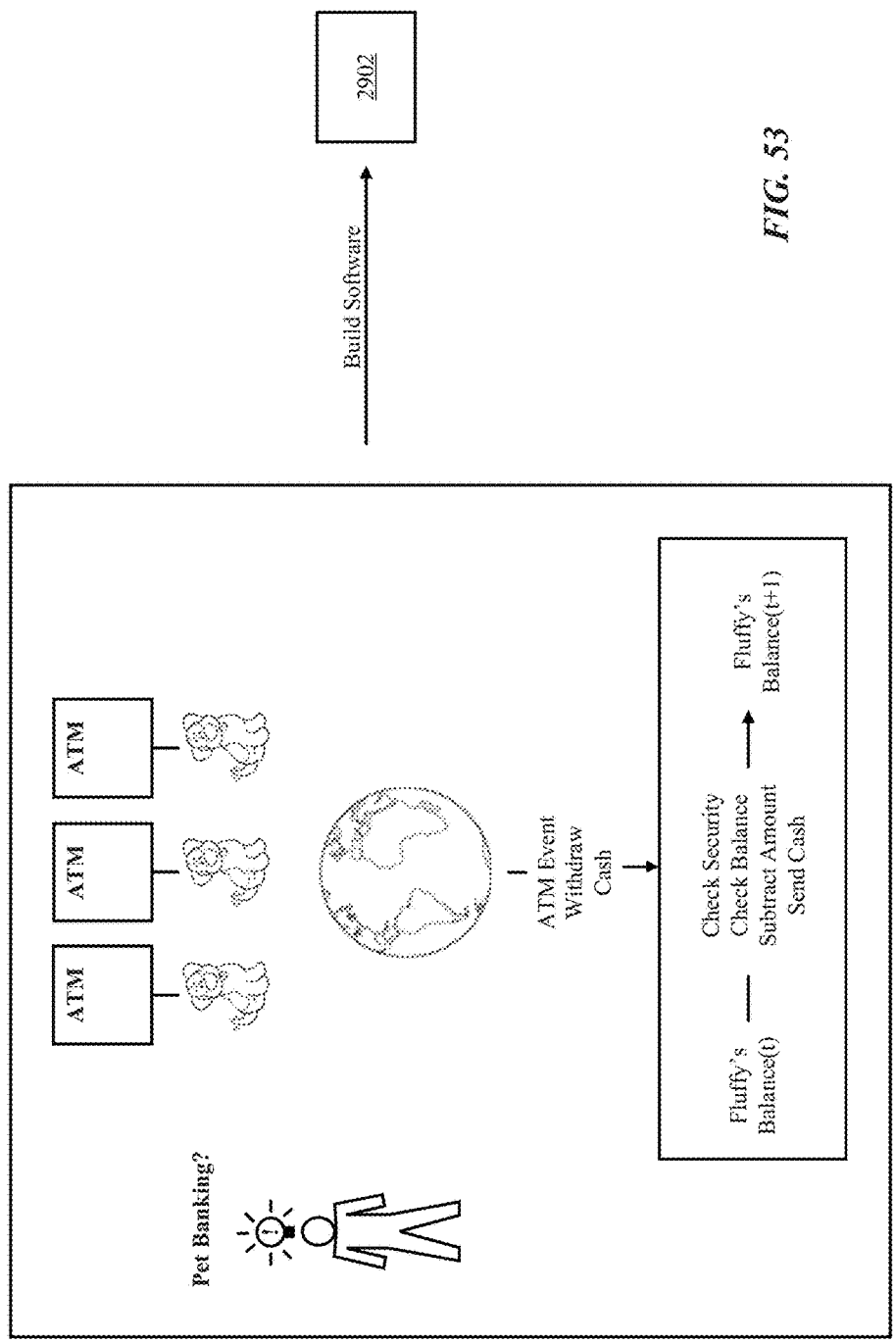
Figure 54A:
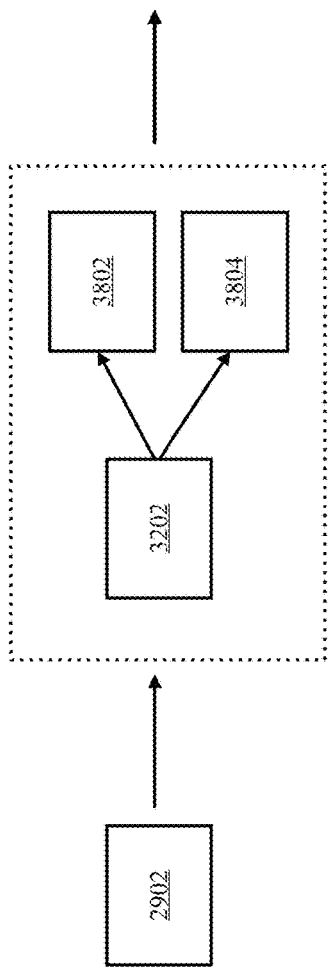
Figure 54B:
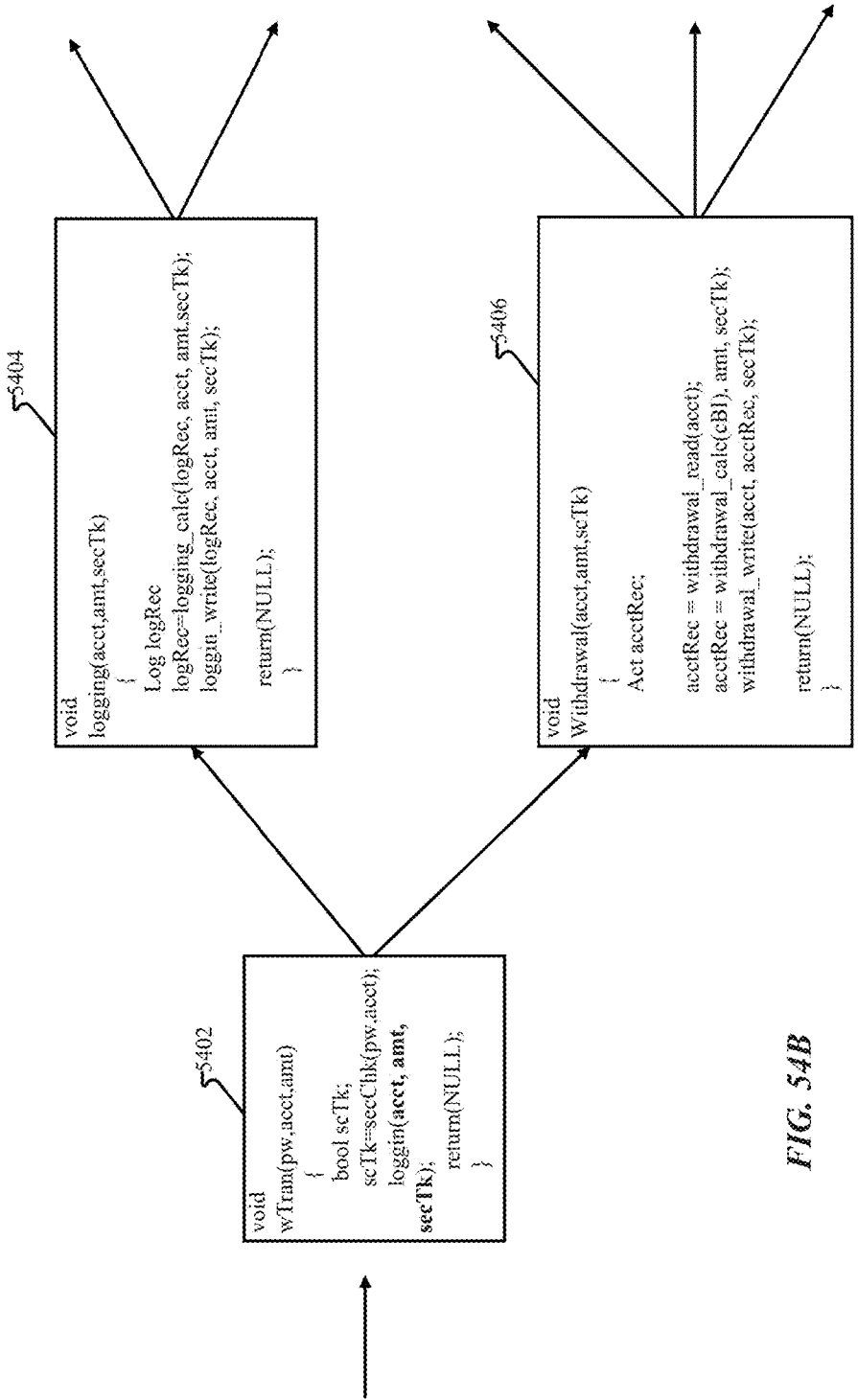
Figure 54C:
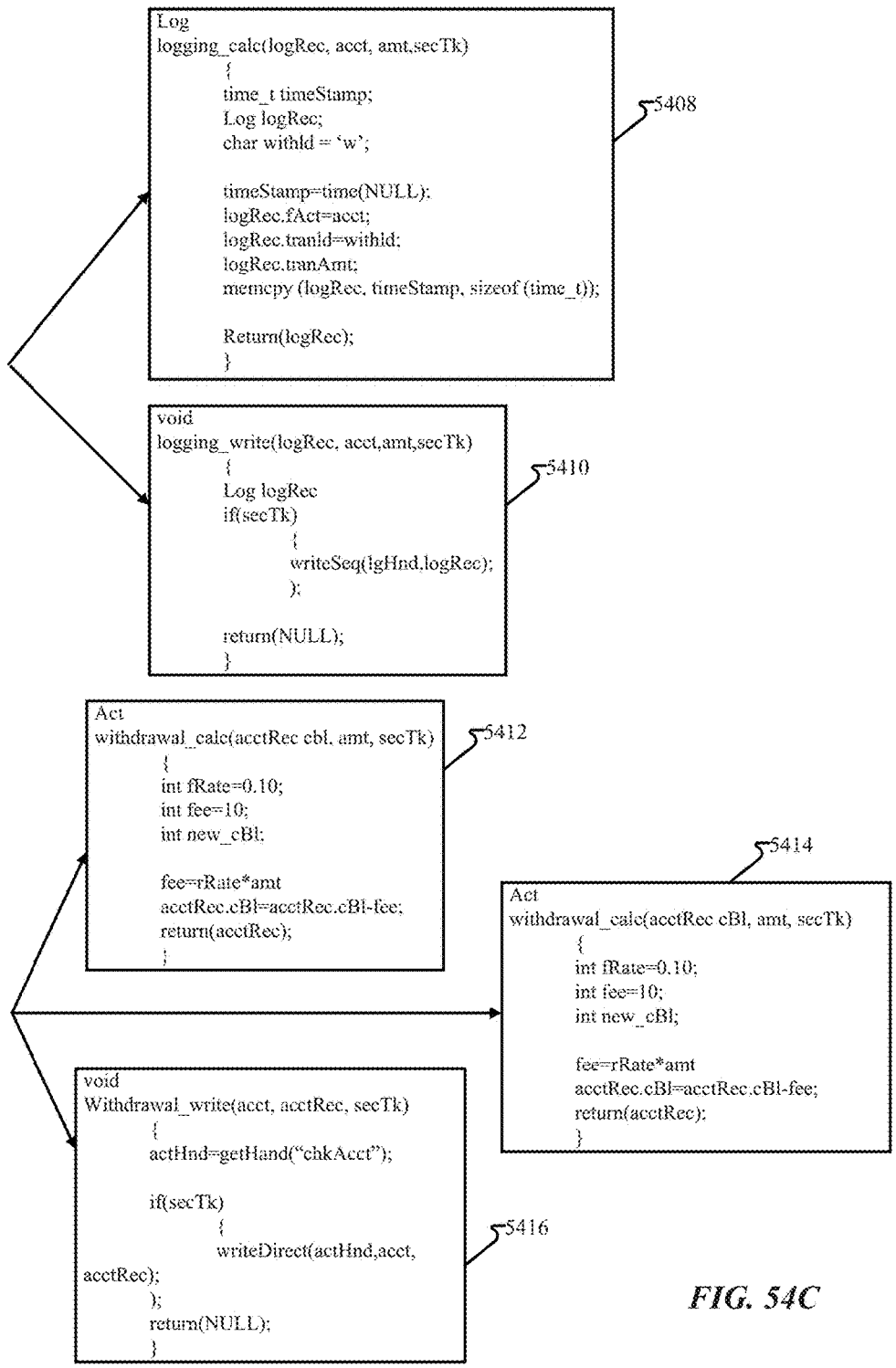
Figure 55:
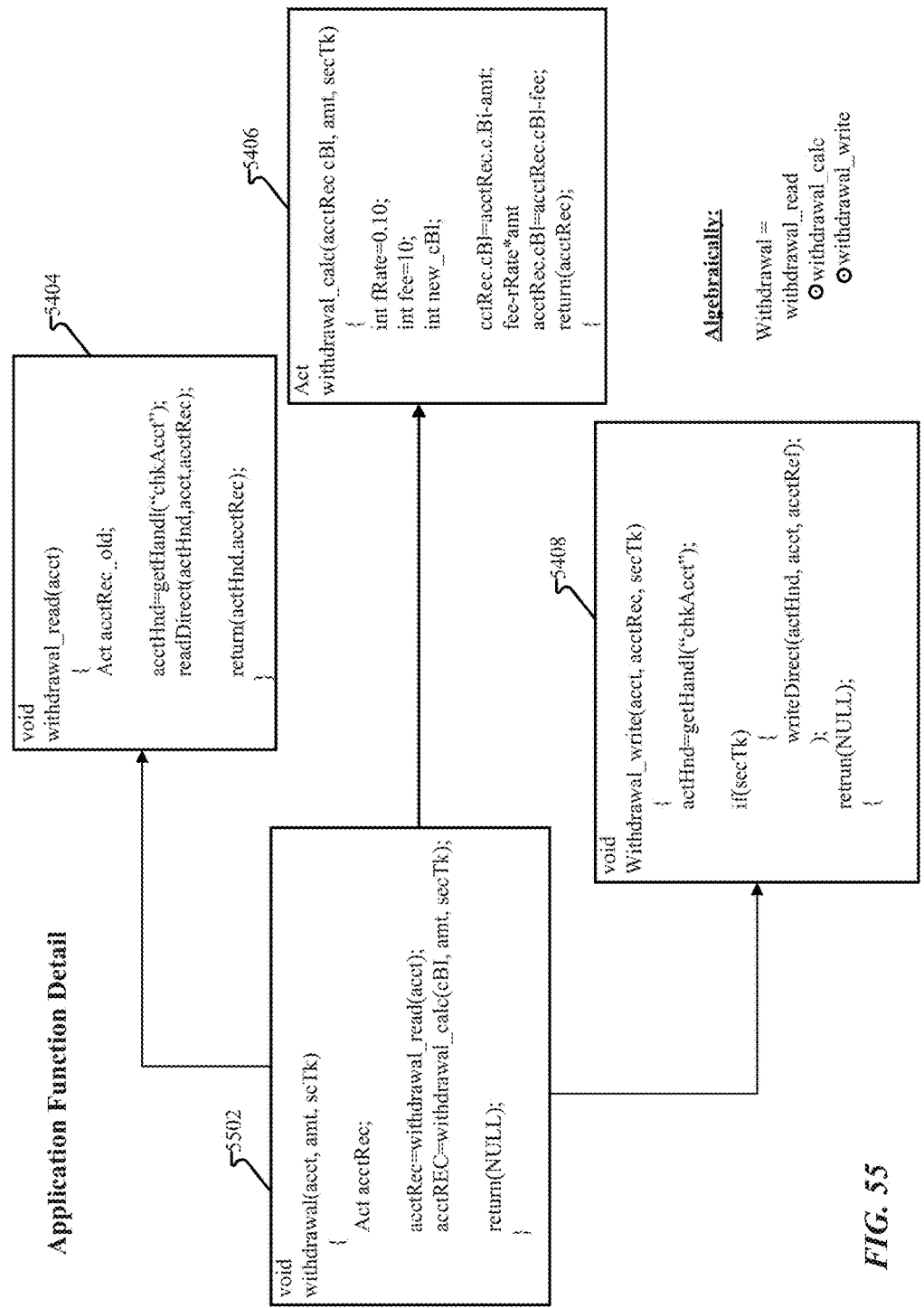
Figure 56:
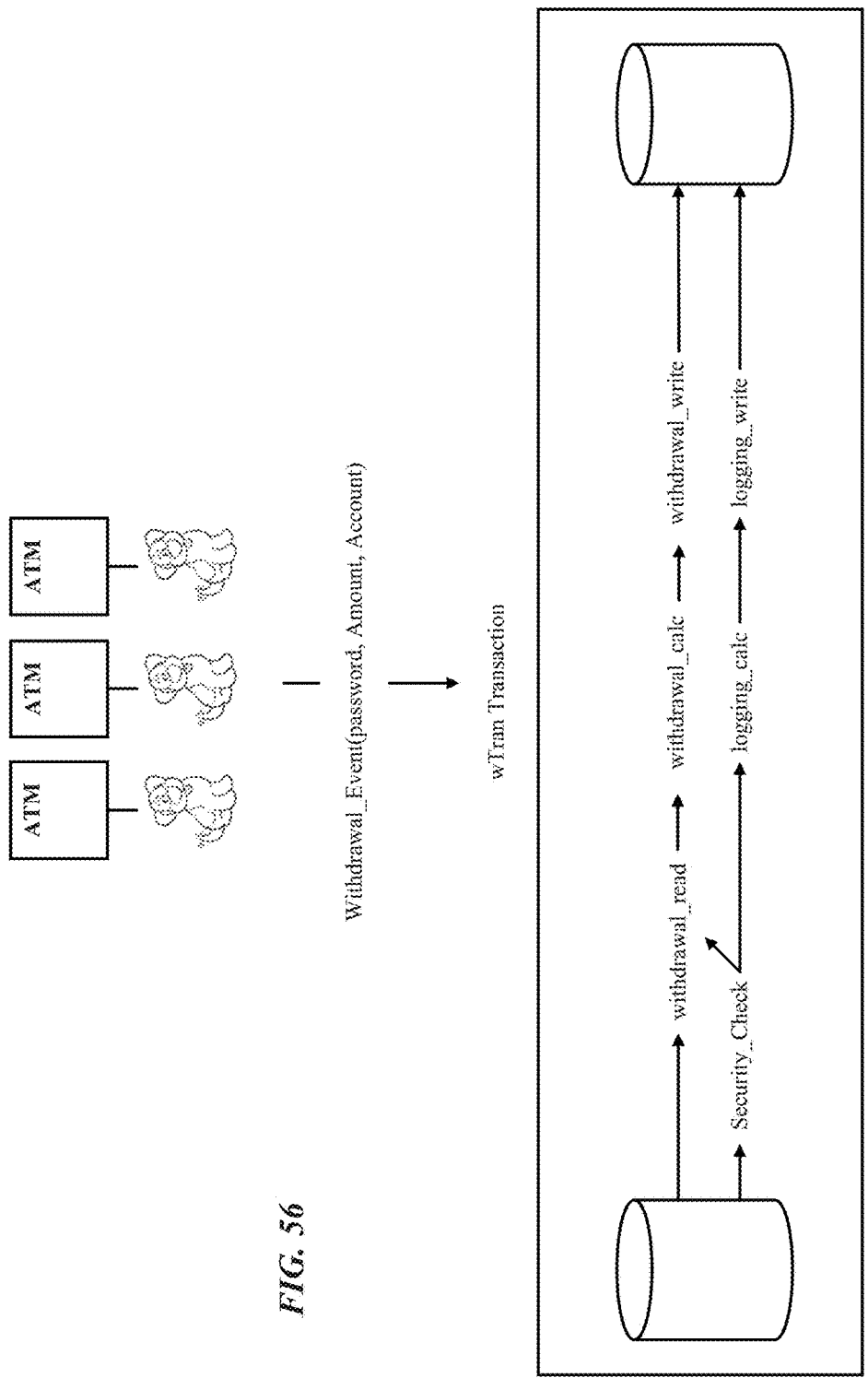
Figure 57:
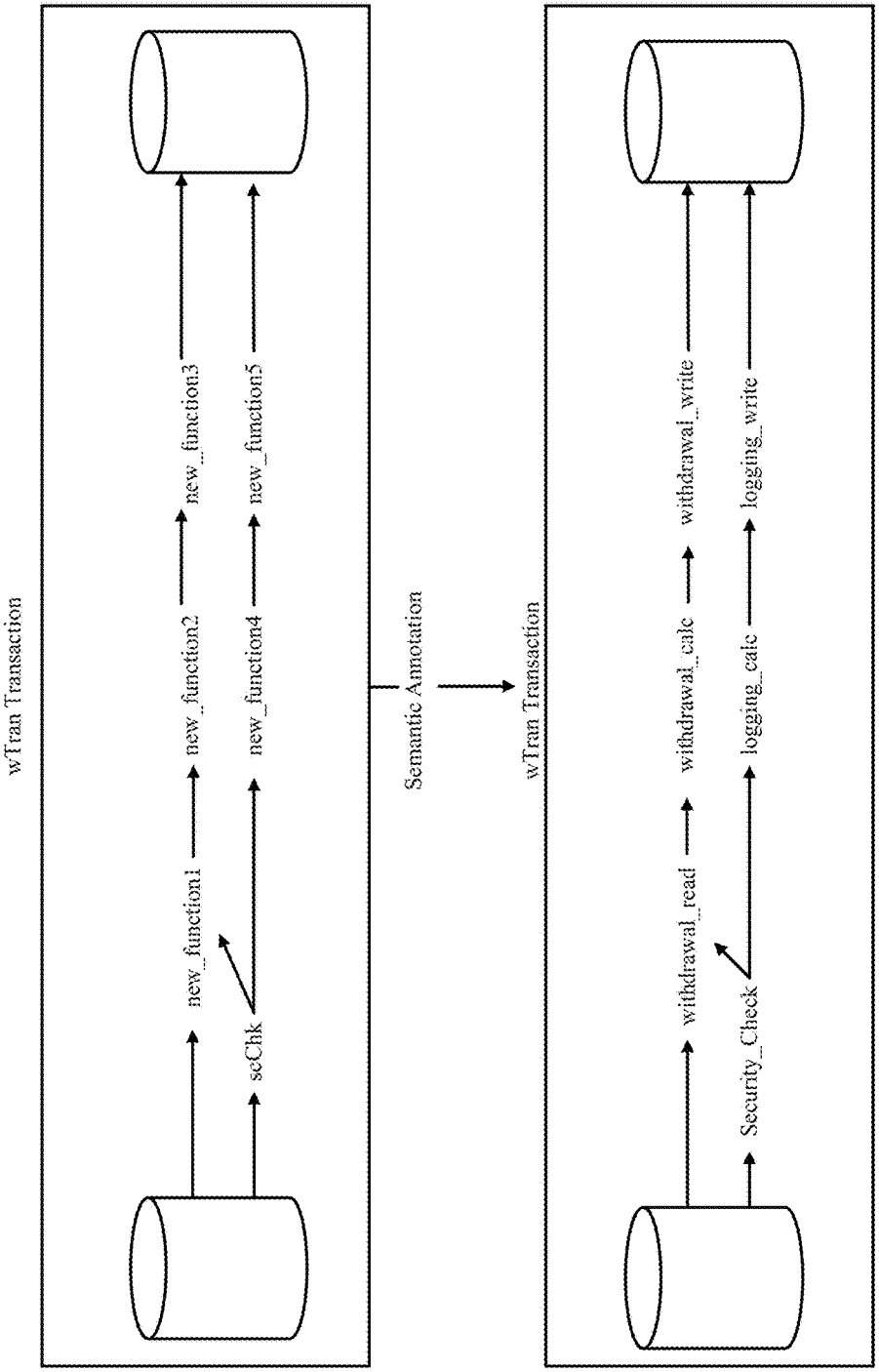
Figure 58:
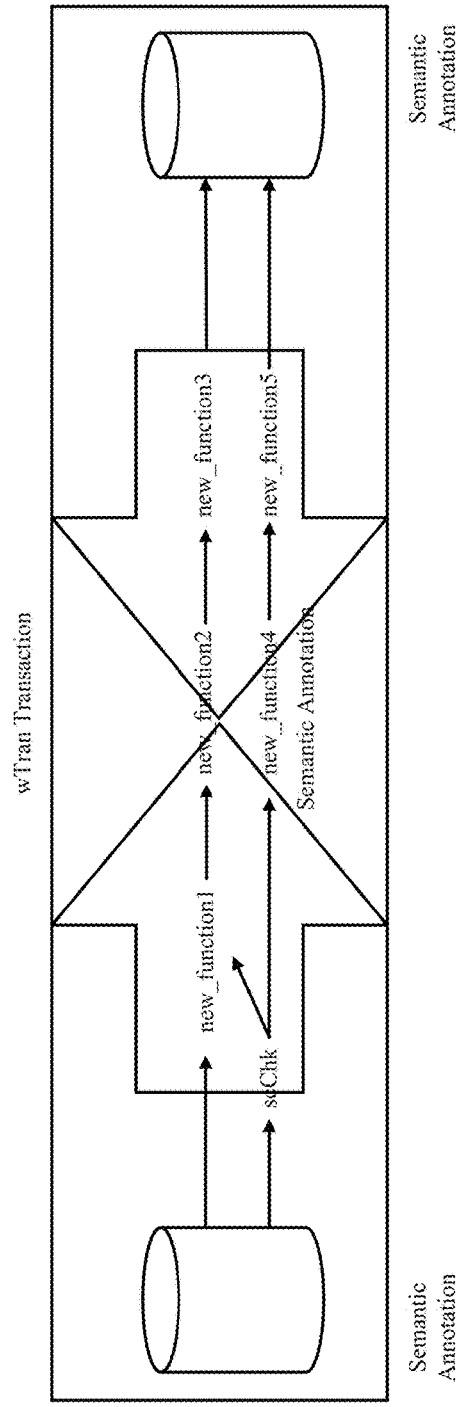
Figure 59:
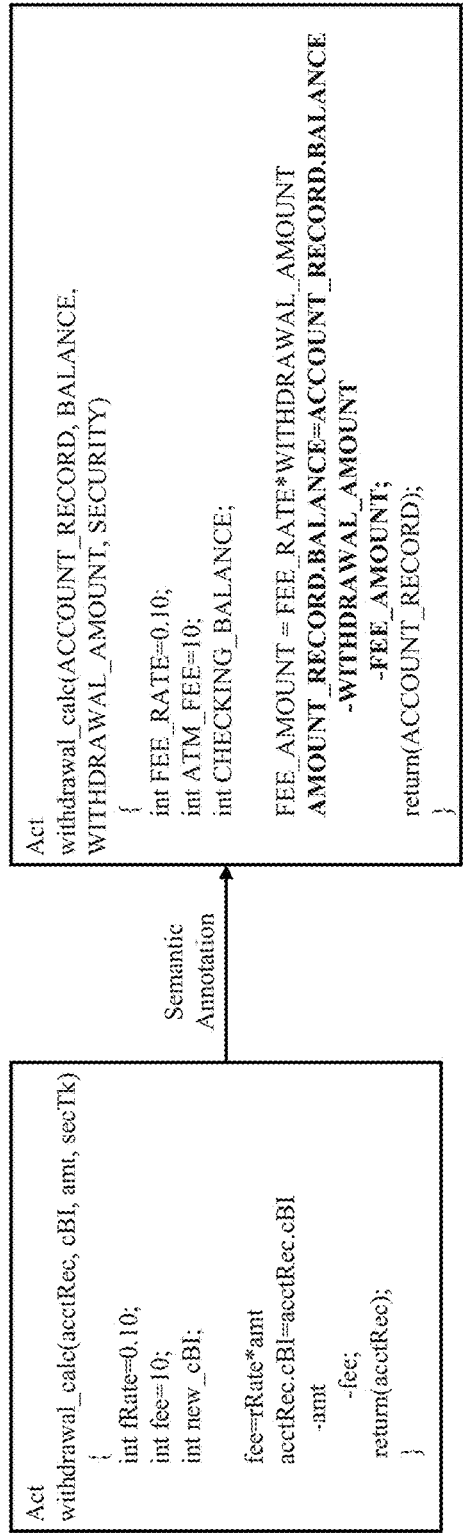
Figure 60A:
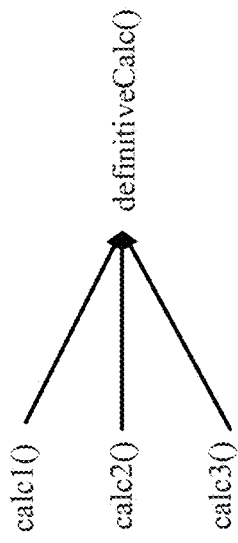
Figure 60B:
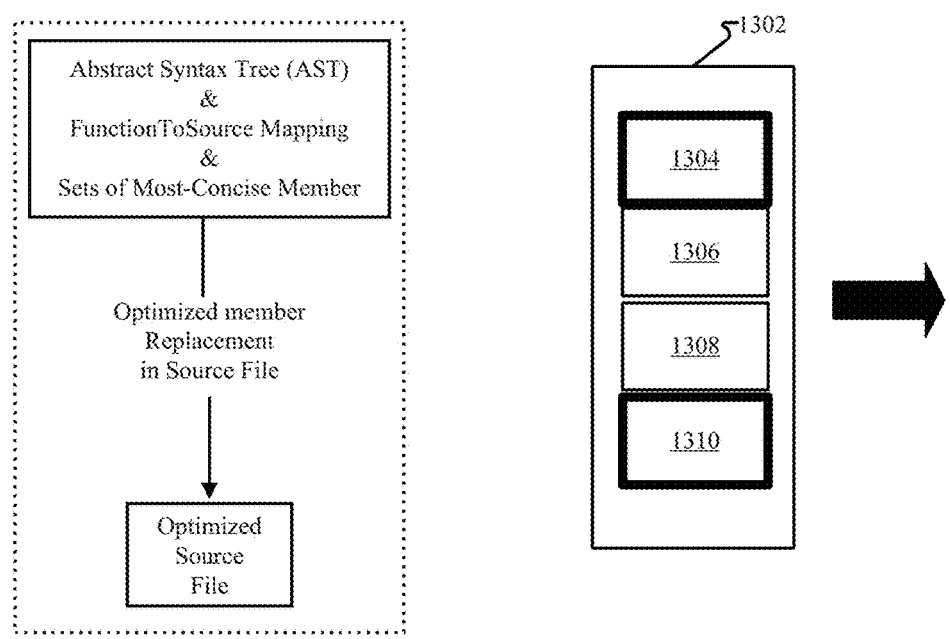
Figure 60C:
Figure 61:
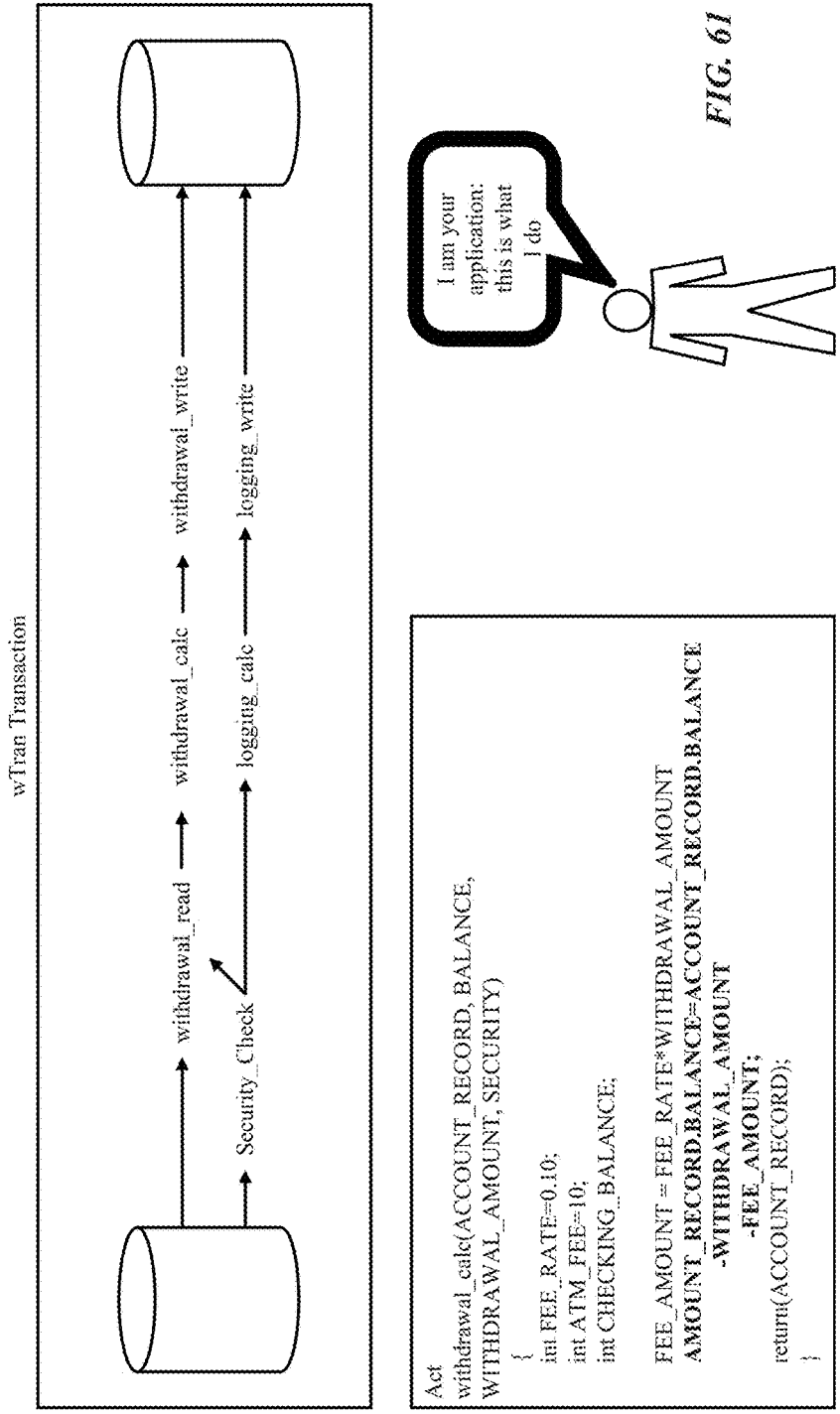
Figure 62A:
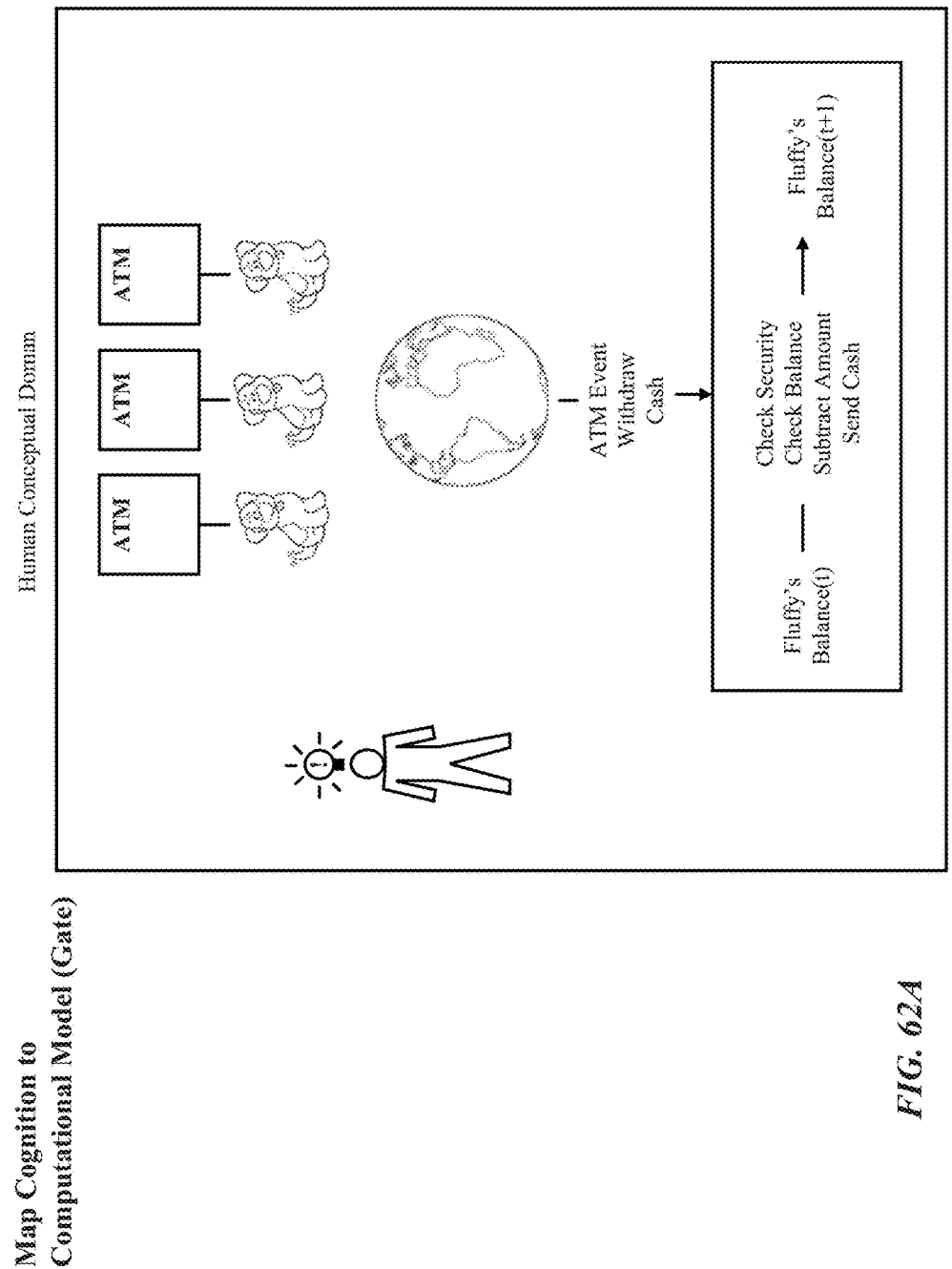
Figure 62B:
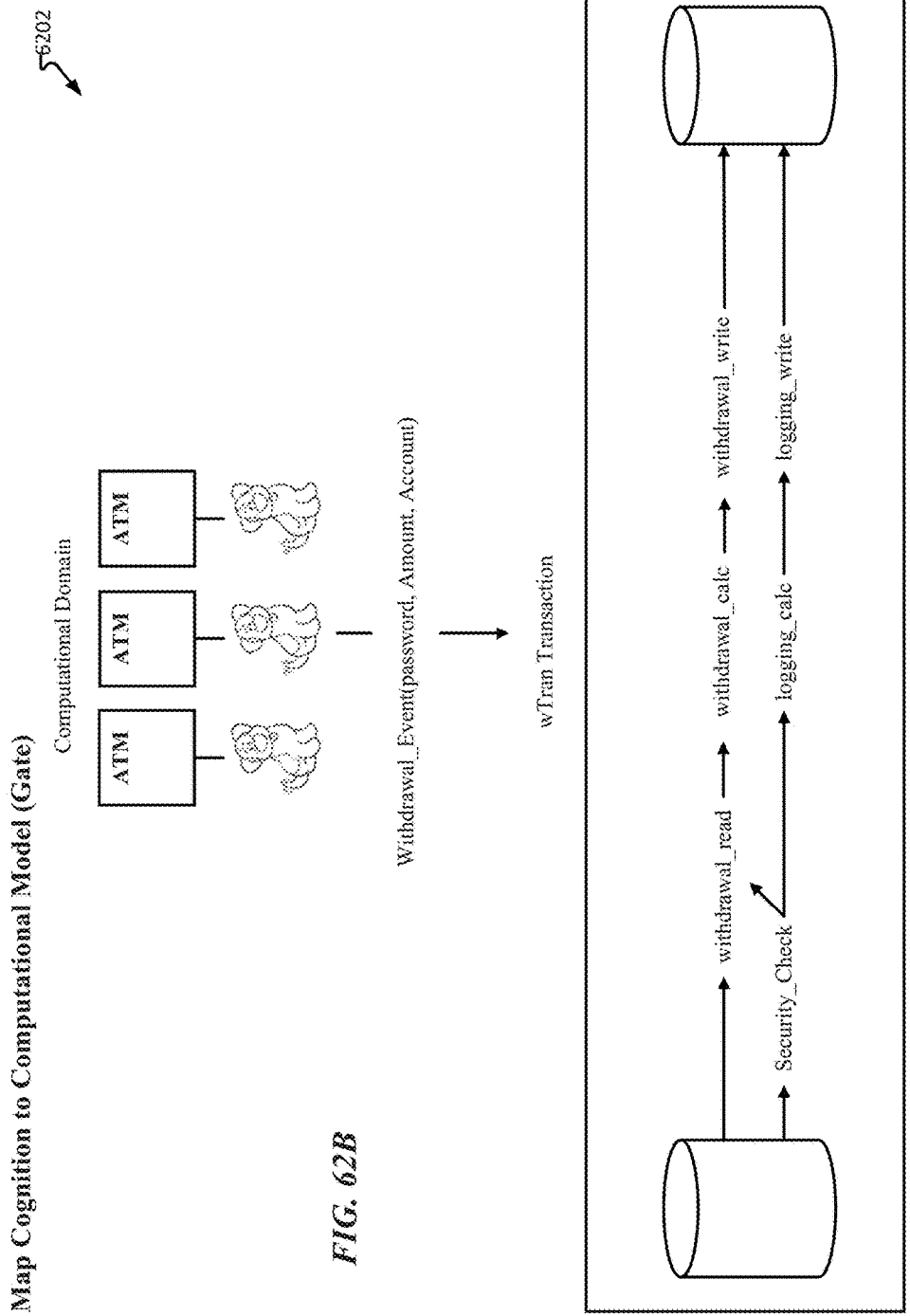
Figure 63A:
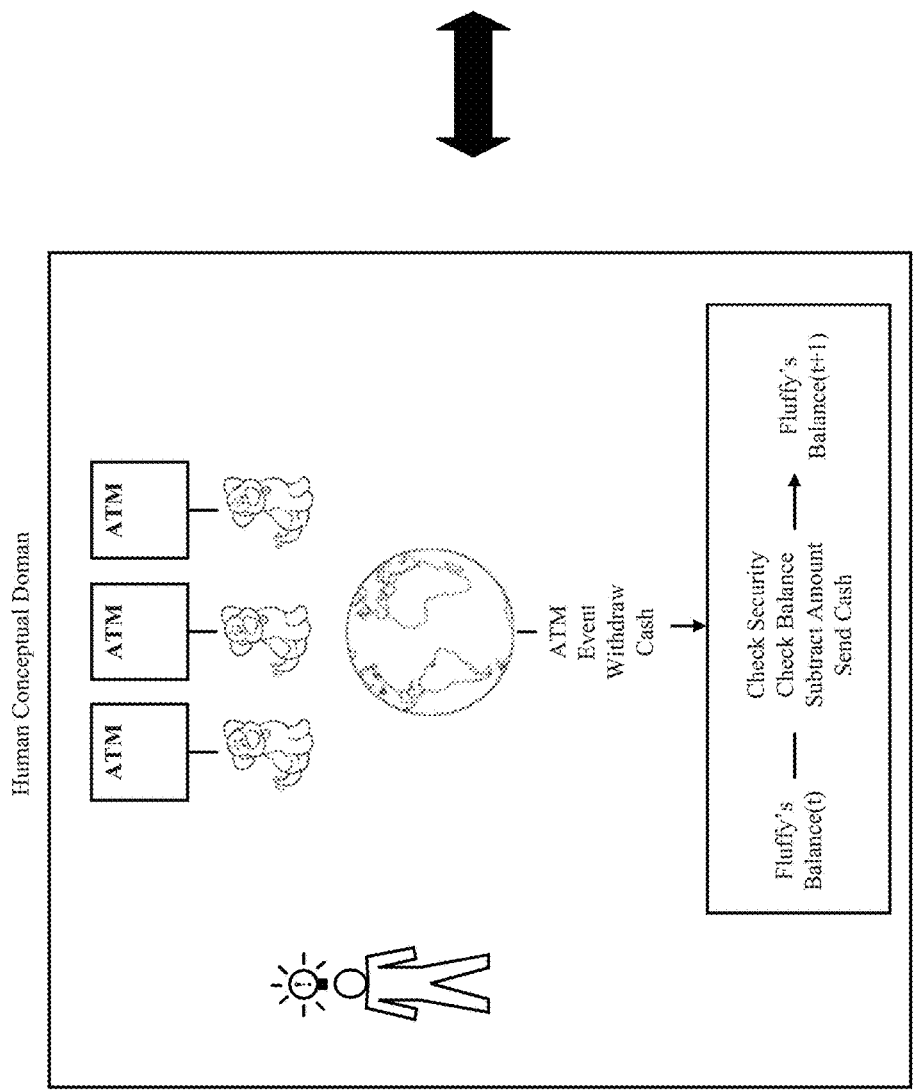
Figure 63B:
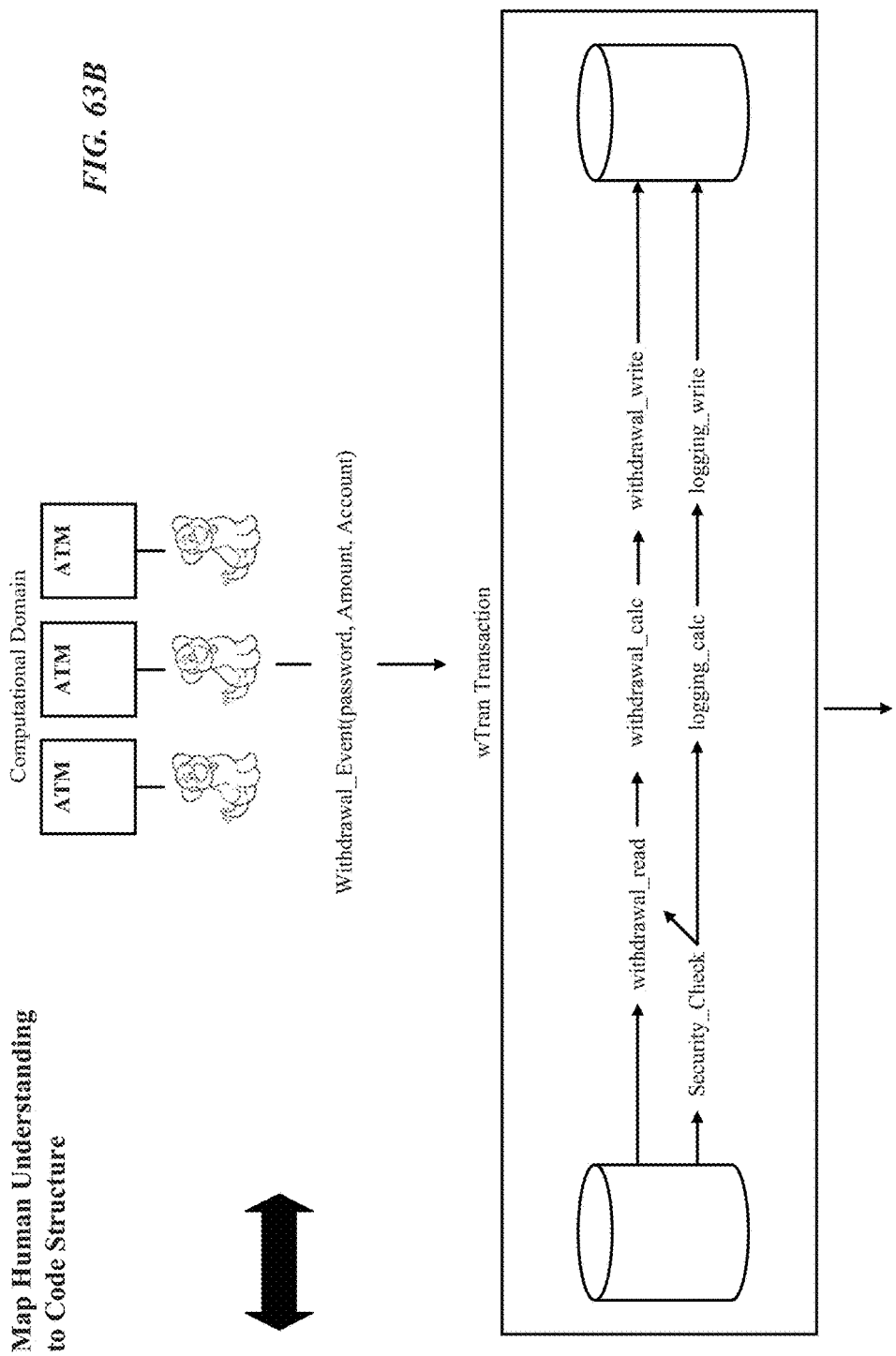
Figure 63C:
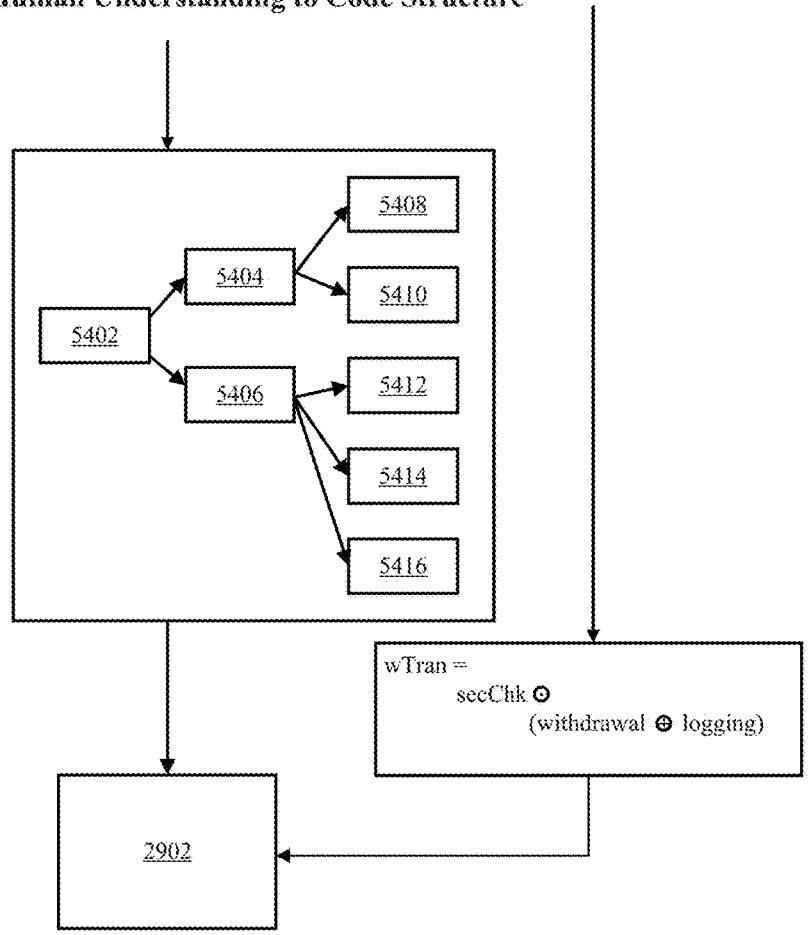
Figure 64:
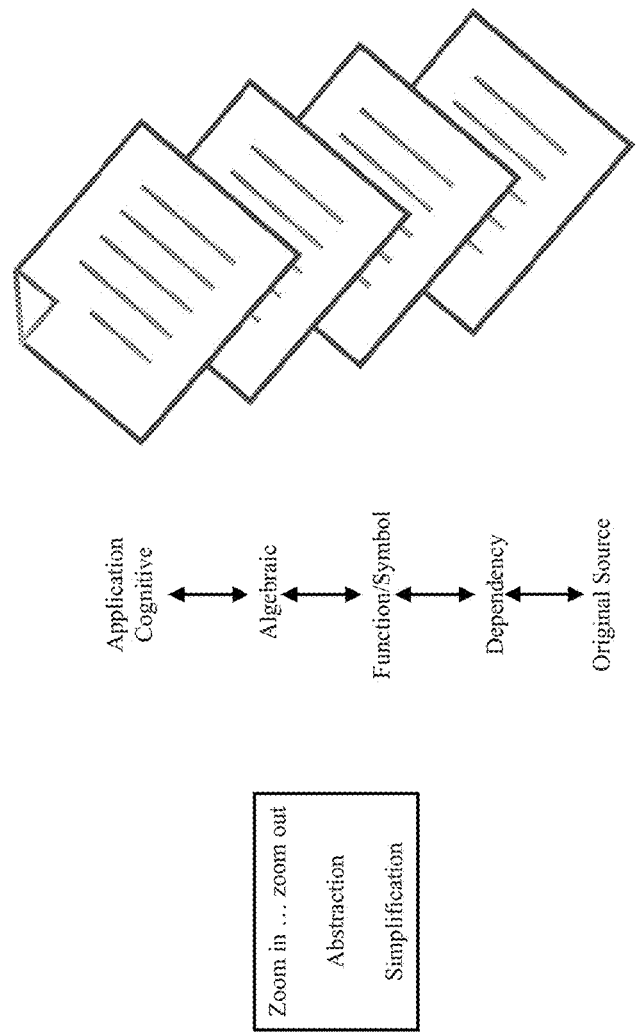
Figure 65:
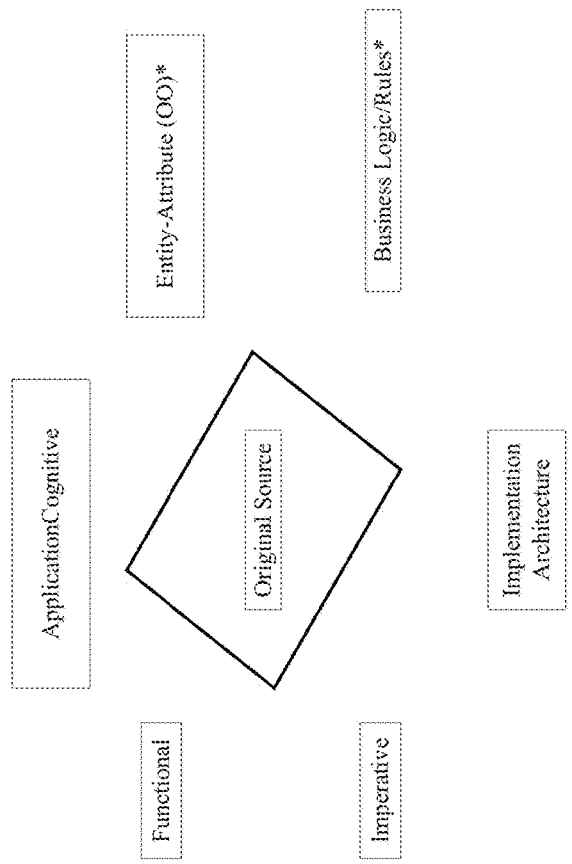
Figure 66:
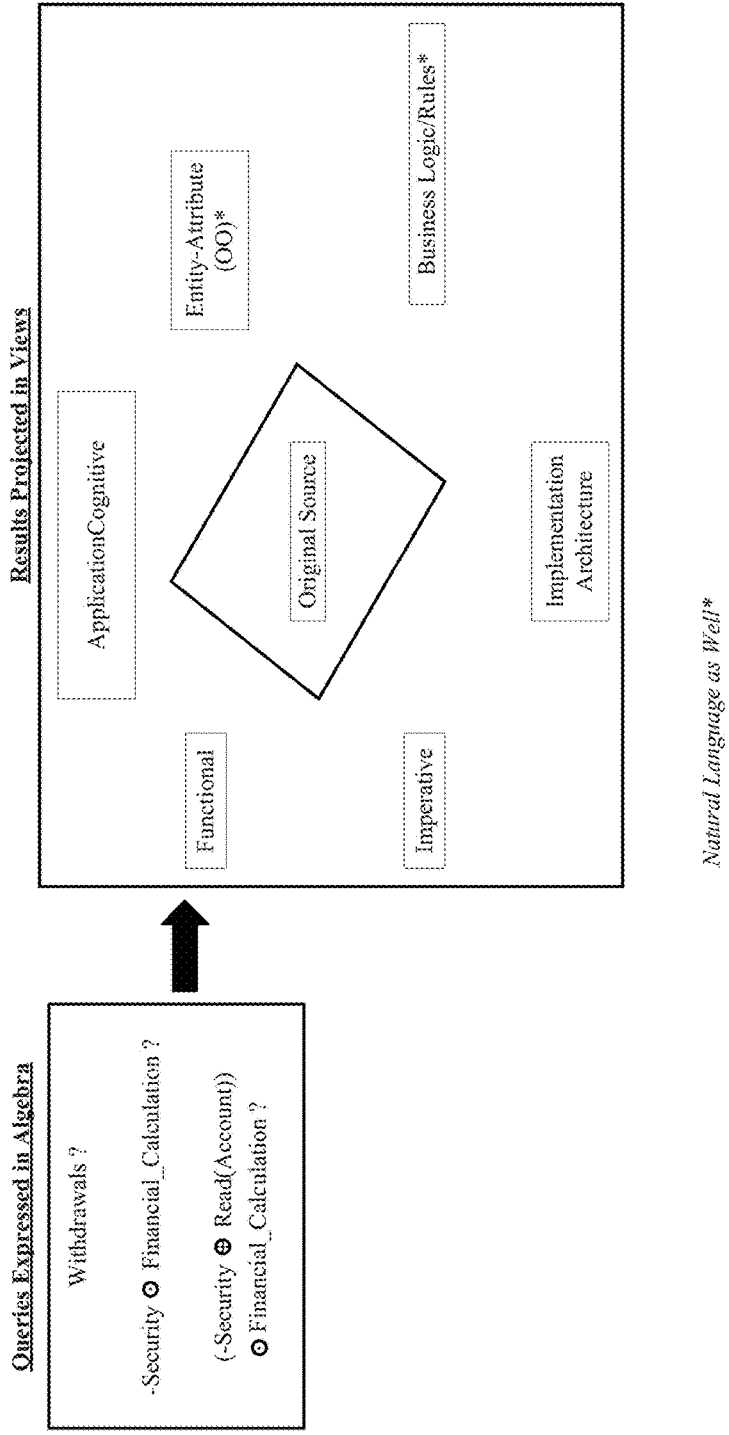
Figure 67:
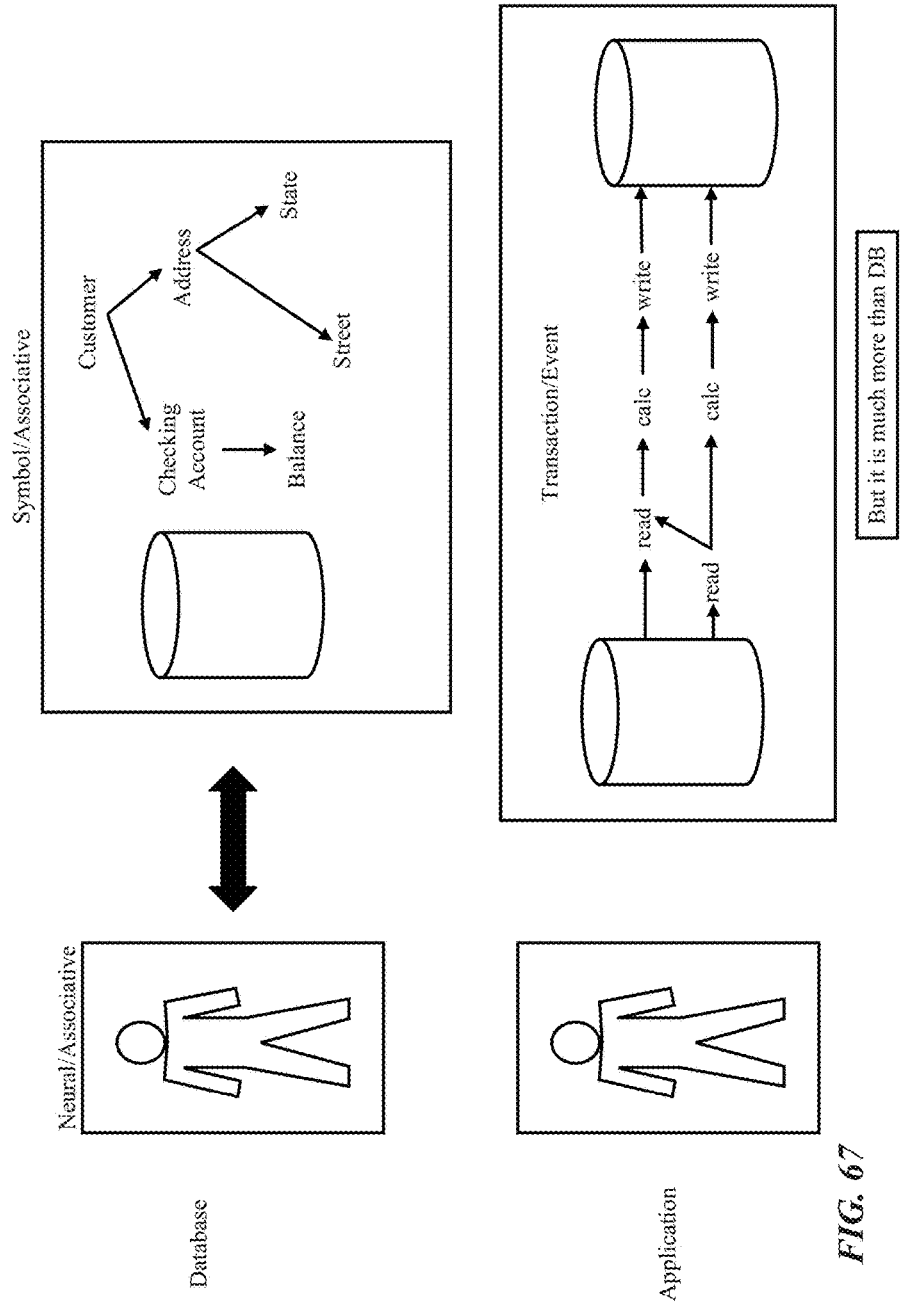
Figure 68:
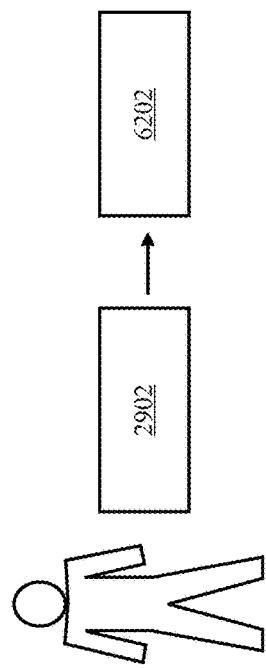
Figure 69A:
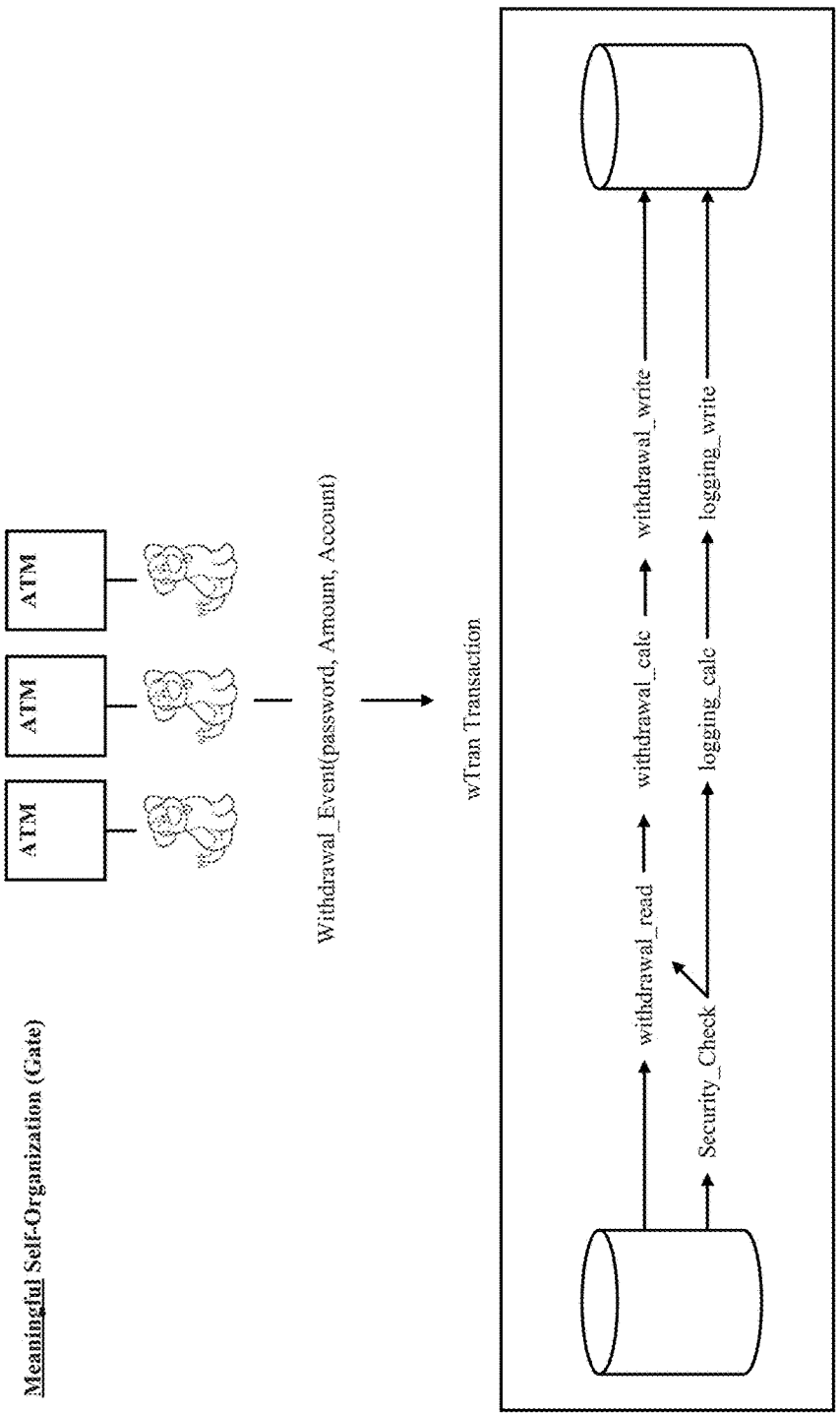
Figure 72:
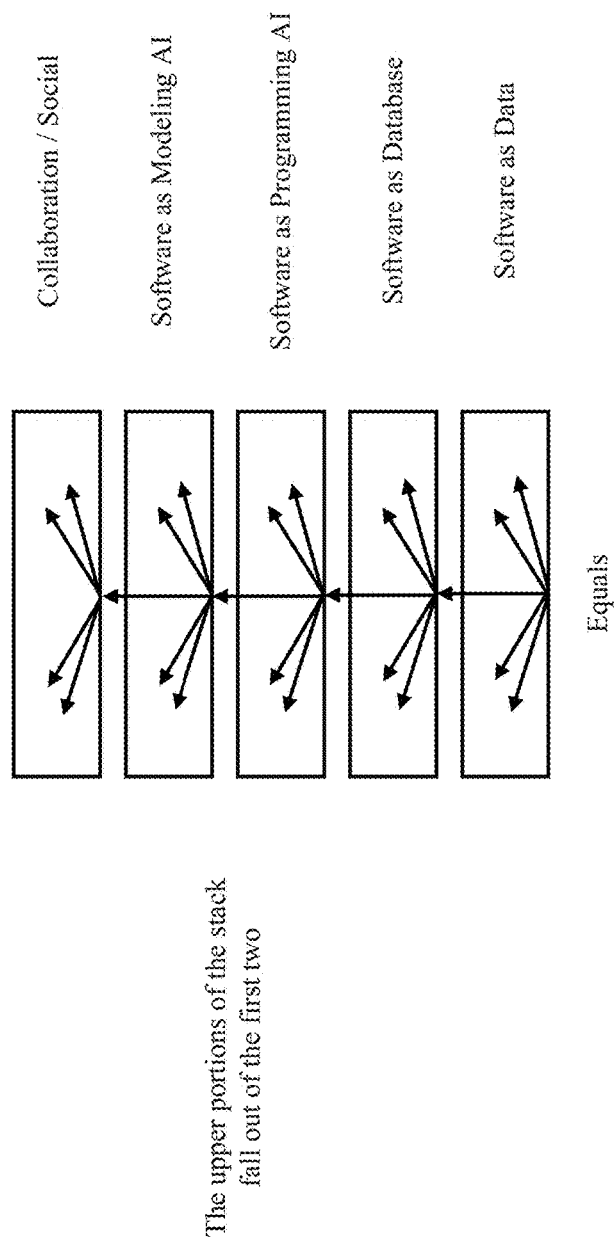
Figure 73:
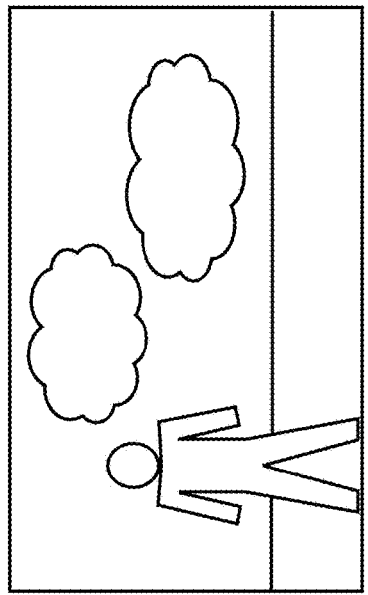

FIGS. 7-74 depict a solution in accordance with embodiments of the present disclosure. FIG. 13 depicts at least one portion of the solution provided by FIGS. 7-74, comprising code 1302 having function 1304, function 1306, function 1308, and function 1310. FIG. 14 depicts at least one portion of the solution provided by FIGS. 7-74, comprising code 1302 having function 1304, function 1306, function 1308, and function 1310. Function 1304 and function 1310 are emphasized. FIG. 16A depicts at least one portion of the solution provided by FIGS. 7-74, comprising code 1302 having function 1304, function 1306, function 1308, and function 1310. Function 1304 and function 1310 are emphasized. FIGS. 16B, 17, 24 each depict at least one portion of the solution provided by FIGS. 7-74, and each comprise code 1602 having function 1304 and function 1310. FIG. 16 is illustrated by FIG. 16A, illustrating the left-hand portion of FIG. 16 and FIG. 16B, illustrating the right-hand portion of FIG. 16. FIG. 29 depicts at least one portion of the solution provided by FIGS. 7-74, comprising code 2902. FIG. 30A depicts at least one portion of the solution provided by FIGS. 7-74, comprising code 3002. FIG. 30 is illustrated by FIG. 30A, illustrating the left-hand portion of FIG. 30, and FIG. 30B, illustrating the right-hand portion of FIG. 30. FIG. 31A depicts at least one portion of the solution provided by FIGS. 7-74, comprising code 3102. FIG. 32A depicts at least one portion of the solution provided by FIGS. 7-74, comprising code 2902. FIG. 31 is illustrated by FIG. 31A, illustrating the left-hand portion of FIG. 31, and FIG. 31B, illustrating the right-hand portion of FIG. 31. FIG. 32 is illustrated by FIG. 32A, illustrating the left-hand portion of FIG. 32, FIG. 32B, illustrating the central portion of FIG. 32, and FIG. 31C illustrating the right-hand portion of FIG. 32. FIG. 32C depicts at least one portion of the solution provided by FIGS. 7-74, comprising function 3202, function 3204, and function 3206. FIG. 37 depicts at least one portion of the solution provided by FIGS. 7-74, comprising code 2902. FIGS. 38, 39, and 40 each depict at least one portion of the solution provided by FIGS. 7-74, and each comprise functions 3202, function 3802, and function 3804. FIG. 41 depicts at least one portion of the solution provided by FIGS. 7-74, comprising functions 3202 and function 3210. FIG. 54 is illustrated by FIG. 54A, illustrating the left-hand portion of FIG. 54, FIG. 54B, illustrating the central portion of FIG. 54, and FIG. 54C illustrating right-hand portion of FIG. 54. FIG. 53 depicts at least one portion of the solution provided by FIGS. 7-74, comprising code 2902. FIG. 54A depicts at least one portion of the solution provided by FIGS. 7-74, comprising code 2902, functions 3202, function 3802, and function 3804. FIG. 54B depicts at least one portion of the solution provided by FIGS. 7-74, comprising function 5402, function 5404, and function 5406. FIG. 54C depicts at least one portion of the solution provided by FIGS. 7-74, comprising function 5408, function 5410, function 5412, function 5414, and function 5416. FIG. 55 depicts at least one portion of the solution provided by FIGS. 7-74, comprising function 5502, function 5404, function 5406, and function 5408. FIG. 60B depicts at least one portion of the solution provided by FIGS. 7-74, comprising code 1302 having function 1304, function 1306, function 1308, and function 1310. Function 1304 and function 1310 are emphasized. FIG. 60C depicts at least one portion of the solution provided by FIGS. 7-74, comprising function 6002. FIG. 60 is illustrated by FIG. 60A, illustrating a top portion FIG. 60 and the bottom portion of FIG. 60 being illustrated by FIG. 60B, illustrating the left-bottom portion of FIG. 60, and FIG. 60C, illustrating the right-bottom portion of FIG. 60. 54, FIG. 54B, illustrating the central portion of FIG. 54, and FIG. 54C illustrating right-hand portion of FIG. 54. FIG. 62B depicts at least one portion of the solution provided by FIGS. 7-74, comprising interaction 6202. FIG. 62 is illustrated by FIG. 62A, illustrating the left-hand portion of FIG. 62, FIG. 62B, illustrating right-hand portion of FIG. 62. FIG. 63C depicts at least one portion of the solution provided by FIGS. 7-74, comprising code 2902 and function 5402, function 5404, function 5406, function 5408, function 5410, function 5412, function 5414, and function 5416. FIG. 63 is illustrated by FIG. 63A, illustrating the left-hand portion of FIG. 63 and FIG. 63B, illustrating the top-right portion of FIG. 63 and FIG. 63C illustrating the bottom-right portion of FIG. 63. FIG. 68 depicts at least one portion of the solution provided by FIGS. 7-74, comprising code 2902 and interaction 6202.

Exemplary aspects can be directed to any one or more of the following:

A method, comprising: retrieving, by a processor from a data repository, a candidate source code, having a candidate function, and comprising a first human-readable machine instruction; accessing, by the processor from a data repository, a preferred function comprising a second human-readable machine instruction and has been previously identified as an authorized source code; automatically determining, by the processor, equivalence between the candidate function and the preferred function; upon equivalence being determined, automatically providing, by the processor, indicia of equivalence associated with the candidate function and the preferred function; upon the indicia being provided, automatically transforming, by the processor, the candidate source code comprising replacing the candidate function with the preferred function; and outputting the transformed candidate source code.

Any one or more of the above aspects wherein the step of providing the indicia comprises the steps of transforming and outputting.

Any one or more of the above aspects wherein the preferred function comprises human-readable elements not associated with the second human-readable machine instruction.

Any one or more of the above aspects wherein the step of determining equivalence fails upon determining that a number of input/output parameters differ between the candidate function and the preferred function.

Any one or more of the above aspects wherein the step of determining equivalence fails upon:
determining at least one input/output parameters differs between the candidate function and
the preferred function; and wherein the difference comprises a difference of equivalence classes.

Any one or more of the above aspects further comprising,
providing a first machine-readable translation of the candidate function;
providing a second machine-readable translation of the preferred function;
executing both the first machine-readable translation and the second machine-readable translation with ones of a finite set of inputs; and
determining equivalence upon the step of executing both the first machine-readable translation and the second machine-readable translation each outputting equivalent values from each of the first machine-readable translation and the second machine-readable translation of the candidate function.

Any one or more of the above aspects wherein the step of determining equivalence further comprises:
deriving a logic equation for the candidate function;
accessing a logic equation for the preferred function; and
wherein equivalence is failed to be determined upon the logic equation for the candidate function being determined to be different from the logic equation for the preferred function.
Wherein the determination of whether the logic equation of the candidate function is determined to be equivalent to the logic equation of the preferred function further comprises:
providing the logic equation for the candidate function and the logic equation for the preferred function to an automated theorem prover; and
receiving indicia from the automated theorem prover indicating equivalence.

Any one or more of the above aspects wherein the preferred function comprises a set of instructions, that when converted to machine code, cause a machine to perform the preferred function in a previously identified optimal manner.

Any one or more of the above aspects wherein the previously identified optimal manner comprises an identified manner compliant with at least one security objective.

Any one or more of the above aspects wherein the machine comprises a processor and the previously identified optimal manner comprises an identified number of processor operations.

Any one or more of the above aspects wherein the machine comprises a memory and the previously identified optimal manner comprises an identified size of the memory required to store the machine code.

Any one or more of the above aspects wherein the preferred function comprises a set of instructions previously identified as a concise source code.

Any one or more of the above aspects wherein the step of determining equivalence further comprises:
generating, from the candidate function, a set of equivalence classes for the candidate function, the equivalence classes comprising a set of equivalent functions, each element of the set having a function-to-source mapping.

Any one or more of the above aspects wherein the preferred function comprises a most-concise member selected in accordance with an abstract syntax tree (AST) determination of equivalence between the candidate function and the preferred function.

A system comprising:
a data repository;
a processor; and
wherein the processor:
retrieve a candidate source code from the data repository, having a candidate function, and comprising a first human-readable machine instruction;
accesses from a data repository a preferred function, wherein the preferred function comprises second human-readable machine instructions and has been previously identified as an authorized source code;
automatically determines, equivalence between the candidate function and the preferred function;
upon determining equivalence, automatically provides indicia of equivalence associated with the candidate function and the preferred function;
upon the indicia being provided, automatically transforms the candidate source code comprising replacing the candidate function with the preferred function; and
outputs the transformed candidate source code.

Any one or more of the above aspects wherein the processor provides the indicia comprising replacing the candidate function with the preferred function in the candidate source code and saving the result as a preferred source code.

Any one or more of the above aspects wherein the processor fails to determine equivalence upon at least one of (a) determining that a number of input/output parameters differ between the candidate function and the preferred function and (b) determining at least one input/output parameter differs between the candidate function and the preferred function and wherein the difference comprises a difference of equivalence classes.

A system for automatically editing an instruction, comprising:
  means for retrieving a candidate source code from a data repository, having a function, and comprising a first human-readable machine instruction;
  means for accessing a preferred function from a data repository comprising a second human-readable machine instruction, wherein the second human-readable machine instructions and has been previously identified as an authorized source code;
  means for automatically determining equivalence between the candidate function and the preferred function;
  means for, upon equivalence being determined, automatically providing, by the processor, indicia of equivalence associated with the candidate function and the preferred function;
  means for, upon the indicia being provided, automatically transforming, by the processor, the candidate source code comprising replacing the candidate function with the preferred function; and
  means for, outputting the transformed candidate source code.

Any one or more of the above aspects wherein the system for providing the indicia comprises the means for transforming and outputting.

A method, comprising: retrieving, by a processor from a data repository, a candidate code, having a candidate function, and comprising a first human-readable machine instruction; accessing, by the processor from a data repository, a preferred function comprising a second human-readable machine instruction and has been previously identified as an authorized code; automatically determining, by the processor, equivalence between the candidate function and the preferred function; upon equivalence being determined, automatically providing, by the processor, indicia of equivalence associated with the candidate function and the preferred function; upon the indicia being provided, automatically transforming, by the processor, the candidate code comprising replacing the candidate function with the preferred function; and outputting the transformed candidate code.

Any one or more of the above aspects wherein the preferred function comprises a set of instructions, that when converted to machine code, cause a machine to perform the preferred function in a previously identified optimal manner.

Any one or more of the above aspects wherein the machine comprises a memory and the previously identified optimal manner comprises an identified size of the memory required to store the machine code.

Any one or more of the above aspects wherein the preferred function comprises a set of instructions previously identified as a concise code.

Any one or more of the above aspects wherein the preferred function comprises a most-concise member selected in accordance with an abstract syntax tree (AST) determination of equivalence between the candidate function and the preferred function.

A system comprising:
  a data repository;
  a processor; and
  wherein the processor:
  retrieve a candidate code from the data repository, having a candidate function, and comprising a first human-readable machine instruction;
  accesses from a data repository a preferred function, wherein the preferred function comprises second human-readable machine instructions and has been previously identified as an authorized code;
  automatically determines, equivalence between the candidate function and the preferred function;
  upon determining equivalence, automatically provides indicia of equivalence associated with the candidate function and the preferred function;
  upon the indicia being provided, automatically transforms the candidate code comprising replacing the candidate function with the preferred function; and
  outputs the transformed candidate code.

Any one or more of the above aspects wherein the processor provides the indicia comprising replacing the candidate function with the preferred function in the candidate code and saving the result as a preferred code.

A system for automatically editing an instruction, comprising:
  means for retrieving a candidate code from a data repository, having a function, and comprising a first human-readable machine instruction;
  means for accessing a preferred function from a data repository comprising a second human-readable machine instruction, wherein the second human-readable machine instructions and has been previously identified as an authorized code;
  means for automatically determining equivalence between the candidate function and the preferred function;
  means for, upon equivalence being determined, automatically providing, by the processor, indicia of equivalence associated with the candidate function and the preferred function;
  means for, upon the indicia being provided, automatically transforming, by the processor, the candidate code comprising replacing the candidate function with the preferred function; and
  means for, outputting the transformed candidate code.

Any one or more of the above aspects, further comprising one or more of a candidate source code, a non-source code, a machine code, or circuitry implemented instruction being compared to a similar or different candidate source code, a non-source code, or a circuitry implemented instruction.

Any one or more of the above aspects, further comprising a processor or a number of processors accessing a candidate function and determining a functional equivalence to a preferred function and, if so determined, identifying, substituting, indicating a substitution should be made in the future, or indicating a non-preferred function in a program or system utilizing the candidate function and/or preferred function.

Any one or more of the above aspects, further comprising utilization of one or more symbols to represent an element, operation, portion, or entirety of a logic equation which may be process instance unique, system unique, globally unique, and may further be temporarily or indefinitely unique.

Any one or more of the above aspects, further comprising equivalence determined with an abstract syntactic structure, an Abstract Syntax Tree (AST), logic equation, first-order logic, second-order logic, etc.

Any one or more of the above aspects, further comprising, at least one of the preferred function and the candidate function comprises a subroutine; method; procedure; predicate; sequence of instructions or rules within a larger computer program; or a relation associated with an input to a single output according to the rule.

In addition to the forgoing, other embodiments are also contemplated by the embodiments disclosed herein. For example, a function may be a preferred function based upon comments (e.g., internal documentation). In another embodiment, a function may be preferred based upon being vetted and approved, and therefore a known function, versus an unvetted and/or unapproved, and therefore an unknown function.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (GPU or CPU), or logic circuits programmed with the instructions to perform the methods (FPGA). These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process, which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Additionally, the systems, methods and protocols can be implemented to improve one or more of a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a modem, a transmitter/receiver, any comparable means, or the like. In general, any device capable of implementing a state machine that is in turn capable of implementing the methodology illustrated herein can benefit from the various communication methods, protocols and techniques according to the disclosure provided herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, Broadcom® AirForce BCM4704/BCM4703 wireless networking processors, the AR7100 Wireless Network Processing Unit, other industry-equivalent processors, and may perform computational functions using any known or future-developed standard, instruction set, libraries, and/or architecture.

Furthermore, the disclosed methods may be readily implemented in software using objects of a object-oriented software language that provide portable source code that can be used on a variety of computer or workstation platforms. Alternatively, the disclosed system may be implemented partially or fully in hardware using standard logic circuits or VLSI design. Whether software or hardware is used to implement the systems in accordance with the embodiments is dependent on the speed and/or efficiency requirements of the system, the particular function, and the particular software or hardware systems or microprocessor or microcomputer systems being utilized. The communication systems, methods, and protocols illustrated herein can be readily implemented in hardware and/or software using any known or later developed systems or structures, devices and/or software by those of ordinary skill in the applicable art from the functional description provided herein and with a general basic knowledge of the computer and telecommunications arts.

Moreover, the disclosed methods may be readily implemented in software and/or firmware that can be stored on a storage medium to improve the performance of: a programmed general-purpose computer with the cooperation of a controller and memory, a special purpose computer, a microprocessor, or the like. In these instances, the systems and methods can be implemented as program embedded on personal computer such as an applet, JAVA.® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications transceiver.

Various embodiments may also or alternatively be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

Provided herein are exemplary systems and methods for spatial reuse in a communications environment. While the embodiments have been described in conjunction with a number of embodiments, it is evident that many alternatives, modifications, and variations would be or are apparent to those of ordinary skill in the applicable arts. Accordingly, this disclosure is intended to embrace all such alternatives, modifications, equivalents and variations that are within the spirit and scope of this disclosure.

What is claimed is:

1. A method, comprising:
retrieving, by a processor from a memory, a candidate source code, having a candidate function, and comprising a first human-readable machine instruction;
accessing, by the processor from the memory, a preferred function comprising a second human-readable machine instruction which has been previously identified, wherein the preferred function comprises a set of instructions, that when converted to machine code, cause a machine to perform the preferred function in a previously identified optimal manner;
automatically determining, by the processor, equivalence between the candidate function and the preferred function, wherein the equivalence determination:
derives a logic equation for the candidate function,
accesses a logic equation for the preferred function,
determines whether the logic equation for the candidate function and the logic equation for preferred function are logically equivalent by providing the logic equation for the candidate function and the logic equation for the preferred function to an automated theorem prover, and
assesses whether given any input to the candidate function and the same input to the preferred function, the output value of the candidate function and output value for the preferred function are equal;
upon equivalence being determined, automatically providing, by the processor, indicia of equivalence associated with the candidate function and the preferred function;
upon the indicia being provided, automatically transforming, by the processor, the candidate source code comprising replacing the candidate function with the preferred function; and
outputting the transformed candidate source code.

2. The method of claim 1, wherein the step of providing the indicia comprises the steps of transforming and outputting.

3. The method of claim 1, wherein the preferred function comprises human-readable elements not associated with the second human-readable machine instruction.

4. The method of claim 1, wherein the step of determining equivalence fails upon determining that a number of input/output parameters differ between the candidate function and the preferred function.

5. The method of claim 1, wherein the step of determining equivalence fails upon:
determining at least one input/output parameters differs between the candidate function and the preferred function; and
wherein the difference comprises a difference of equivalence classes.

6. The method of claim 1,
providing a first machine-readable translation of the candidate function;
providing a second machine-readable translation of the preferred function;
executing both the first machine-readable translation and the second machine-readable translation with ones of a finite set of inputs; and
determining equivalence upon the step of executing both the first machine-readable translation and the second machine-readable translation each outputting equivalent values from each of the first machine-readable translation and the second machine-readable translation of the candidate function.

7. The method of claim 1, wherein the step of determining equivalence further comprises:
wherein equivalence is failed to be determined upon the logic equation for the candidate function being determined to be different from the logic equation for the preferred function.

8. The method of claim 7, wherein the determination of whether the logic equation of the candidate function is determined to be equivalent to the logic equation of the preferred function further comprises:
receiving indicia from the automated theorem prover indicating equivalence.

9. The method of claim 1, wherein the previously identified optimal manner comprises an identified manner compliant with at least one security objective.

10. The method of claim 1, wherein the machine comprises a processor and the previously identified optimal manner comprises an identified number of processor operations.

11. The method of claim 1, wherein the machine comprises a memory and the previously identified optimal manner comprises an identified size of the memory required to store the machine code.

12. The method of claim 1, wherein the preferred function comprises a set of instructions previously identified as a concise source code.

13. The method of claim 1, wherein the step of determining equivalence further comprises:
generating, from the candidate function, a set of equivalence classes for the candidate function, the equivalence classes comprising a set of equivalent functions, each element of the set having a function-to-source mapping.

14. The method of claim 1,
wherein the preferred function comprises a most-concise member selected in accordance with an abstract syntactic structure determination of equivalence between the candidate function and the preferred function.

15. The method of claim 1, wherein the abstract syntactic structure comprises an abstract syntax tree (AST).

16. The method of claim 1, wherein:
one of the candidate function and the preferred function is represented with a first symbol; and
automatically determining, by the processor, equivalence between the candidate function and the preferred function, further comprises, determining equivalence between the other of the candidate function and the preferred function with the first symbol.

17. The method of claim 16, wherein:
the other of the candidate function and the preferred function is represented with a second symbol; and
automatically determining, by the processor, equivalence between the candidate function and the preferred function, further comprises, determining equivalence between the first symbol and the second symbol.

18. The method of claim 1, wherein at least one of the preferred function and the candidate function comprises a subroutine or a method or a procedure or a predicate.

19. The method of claim 1, wherein at least one of the preferred function and the candidate function comprises a sequence of instructions or rules within a larger computer program.

20. The method of claim 1, wherein at least one of the preferred function and the candidate function comprises a relation associated with an input to a single output according to the rule.

21. A system comprising:
a memory;
a processor; and
wherein the processor:
retrieves, from the memory, a candidate source code, having a candidate function, and comprising a first human-readable e machine instruction;
accesses, from the memory, a preferred function comprising a second human-readable machine instruction which has been previously identified, wherein the preferred function comprises a set of instructions, that when converted to machine code, cause a machine to perform the preferred function in a previously identified optimal manner;
automatically determines equivalence between the candidate function and the preferred function, wherein the equivalence determination;
derives a logic equation for the candidate function,
accesses a logic equation for the preferred function,
determines whether the logic equation for the candidate function and the logic equation for preferred function are logically equivalent by providing the logic equation for the candidate function and the logic equation for the preferred function to an automated theorem prover, and
assesses whether given any input to the candidate function and the same input to the preferred function, the output value of the candidate function and output value for the preferred function are equal;
upon equivalence being determined, automatically providing, by the processor, indicia of equivalence associated with the candidate function and the preferred function;
upon the indicia being provided, automatically transforming by the processor, the candidate source code comprising replacing the candidate function with the preferred function; and
outputting the transformed candidate source code.

22. The system of claim 21, wherein the processor provides the indicia comprising replacing the candidate function with the preferred function in the candidate source code and saving the result as a preferred source code.

23. The system of claim 21, wherein the processor fails to determine equivalence upon at least one of (a) determining that a number of input/output parameters differ between the candidate function and the preferred function and (b) determining at least one input/output parameter differs between the candidate function and the preferred function and wherein the difference comprises a difference of equivalence classes.

24. The system of claim 21, wherein, the processor determines equivalence between the candidate function and the preferred function comprising, determining equivalence between a first symbol representing one of the candidate function and the preferred function with the other of the candidate function and the preferred function.

25. The system of claim 24, wherein, the processor determines equivalence between the candidate function and the preferred function comprising, determining equivalence between a first symbol representing one of the candidate function and the preferred function with a second symbol representing the other of the candidate function and the preferred function.

26. The system of claim 21, wherein at least one of the preferred function and the candidate function comprises a subroutine or a method of a procedure or a predicate.

27. The system of claim 21, wherein at least one of the preferred function and the candidate function comprises a sequence of instructions or rules within a larger computer program.

28. The system of claim 21, wherein at least one of the preferred function and the candidate function comprises a relation associated with an input to a single output according to the rule.

* * * * *